(12) United States Patent
Fujiwara et al.

(10) Patent No.: US 10,070,112 B2
(45) Date of Patent: Sep. 4, 2018

(54) IMAGE PROCESSING DEVICE, IMAGING DEVICE, IMAGE PROCESSING METHOD, PROGRAM, AND RECORDING MEDIUM

(71) Applicant: FUJIFILM Corporation, Tokyo (JP)

(72) Inventors: Shinya Fujiwara, Saitama (JP); Tooru Ueda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/185,368

(22) Filed: Jun. 17, 2016

(65) Prior Publication Data

US 2016/0295189 A1 Oct. 6, 2016

Related U.S. Application Data

(63) Continuation of application No. PCT/JP2014/084072, filed on Dec. 24, 2014.

(30) Foreign Application Priority Data

Feb. 7, 2014 (JP) ................................. 2014-022615

(51) Int. Cl.
*H04N 9/73* (2006.01)
*H04N 5/235* (2006.01)
(Continued)

(52) U.S. Cl.
CPC ............. *H04N 9/735* (2013.01); *H04N 5/232* (2013.01); *H04N 5/2356* (2013.01); *H04N 9/04* (2013.01); *H04N 9/07* (2013.01)

(58) Field of Classification Search
CPC ........ G03B 15/05; G03B 7/16; H04N 5/2256; H04N 5/2354; H04N 1/2112; H04N 1/60; H04N 1/646; H04N 9/73; Y10S 358/906
See application file for complete search history.

(56) References Cited

U.S. PATENT DOCUMENTS

2001/0030694 A1* 10/2001 Abe .................. H04N 9/735
348/223.1
2002/0044685 A1 4/2002 Takahashi
(Continued)

FOREIGN PATENT DOCUMENTS

JP 2001-333432 A 11/2001
JP 2002-51250 A 2/2002
(Continued)

OTHER PUBLICATIONS

International Search Report for PCT/JP2014/084072 (PCT/ISA/210) dated Mar. 24, 2015.
(Continued)

*Primary Examiner* — Trung Diep
(74) *Attorney, Agent, or Firm* — Birch, Stewart, Kolasch & Birch, LLP

(57) ABSTRACT

Provided are an image processing device, an imaging device, an image processing method, a program, and a recording medium that perform white balance bracketing according to image characteristics. An image processing unit 31 acquires a white balance gain which is applied to original image data in order to obtain a base image and a bracket image. The image processing unit 31 includes a color distribution acquisition unit 46, a first gain acquisition unit 41, and a second gain acquisition unit 42. The color distribution acquisition unit 46 acquires color distribution information of input image data. The first gain acquisition unit 41 acquires a base image white balance gain for obtaining the base image. The second gain acquisition unit 42 acquires a bracket image white balance gain for obtaining the bracket image on the basis of the color distribution information and the base image white balance gain.

20 Claims, 38 Drawing Sheets

(51) Int. Cl.
     *H04N 9/07*         (2006.01)
     *H04N 5/232*      (2006.01)
     *H04N 9/04*        (2006.01)

(56) References Cited

U.S. PATENT DOCUMENTS

| | | | |
|---|---|---|---|
| 2004/0085459 A1* | 5/2004 | Hoshuyama | H04N 1/60 348/223.1 |
| 2006/0085459 A1* | 4/2006 | Noble | G06F 17/30371 |
| 2008/0043108 A1* | 2/2008 | Jung | H04N 5/232 348/207.1 |
| 2009/0207279 A1 | 8/2009 | Ochi et al. | |
| 2011/0187891 A1* | 8/2011 | Zhang | H04N 9/73 348/223.1 |

FOREIGN PATENT DOCUMENTS

| | | |
|---|---|---|
| JP | 2002-152772 A | 5/2002 |
| JP | 2002-305750 A | 10/2002 |
| JP | 2006-20194 A | 1/2006 |
| JP | 2009-213150 A | 9/2009 |
| JP | 2010-187113 A | 8/2010 |

OTHER PUBLICATIONS

Written Opinion of the International Searching Authority for PCT/JP2014/084072 (PCT/ISA/237) dated Mar. 24, 2015.

\* cited by examiner

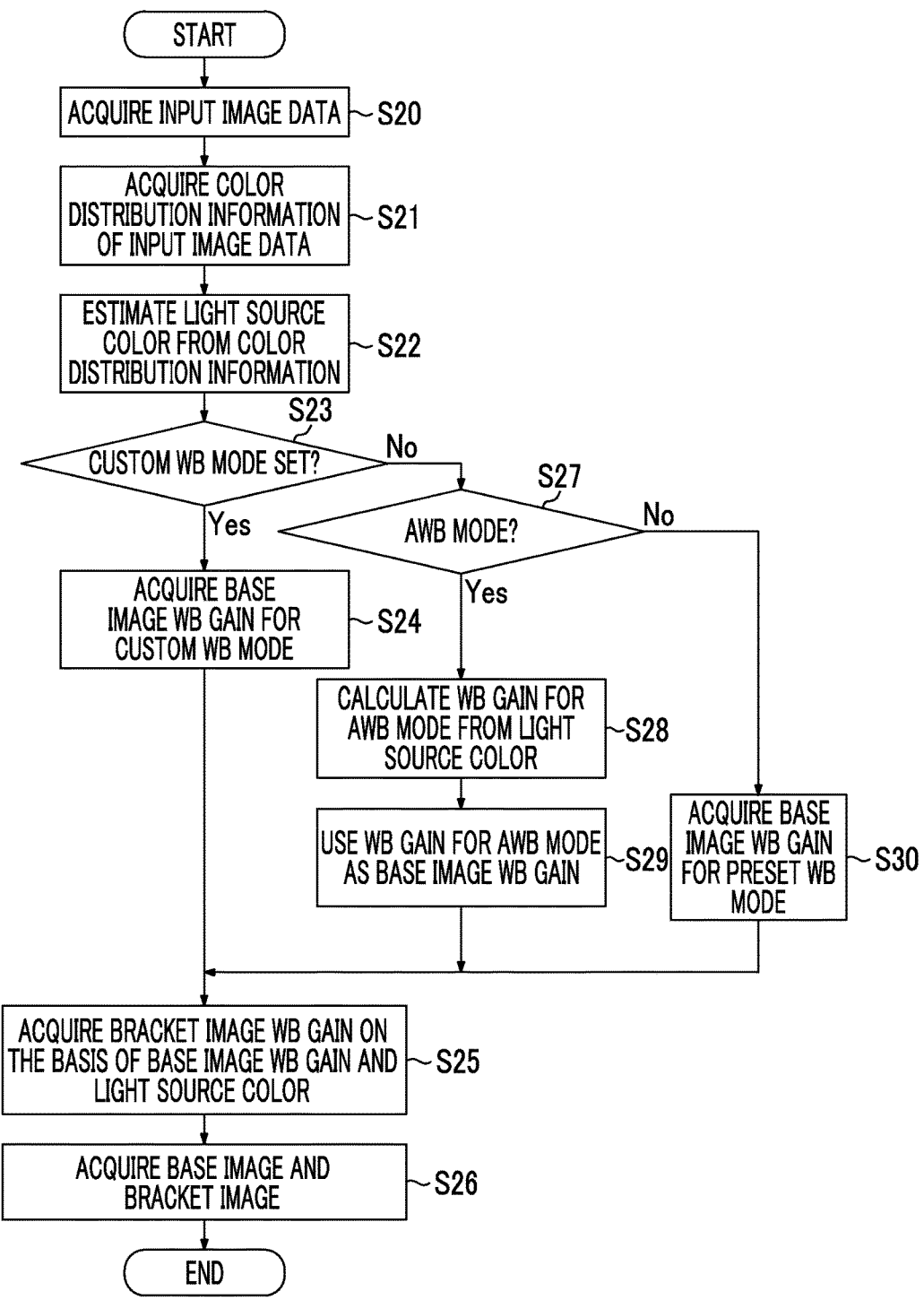

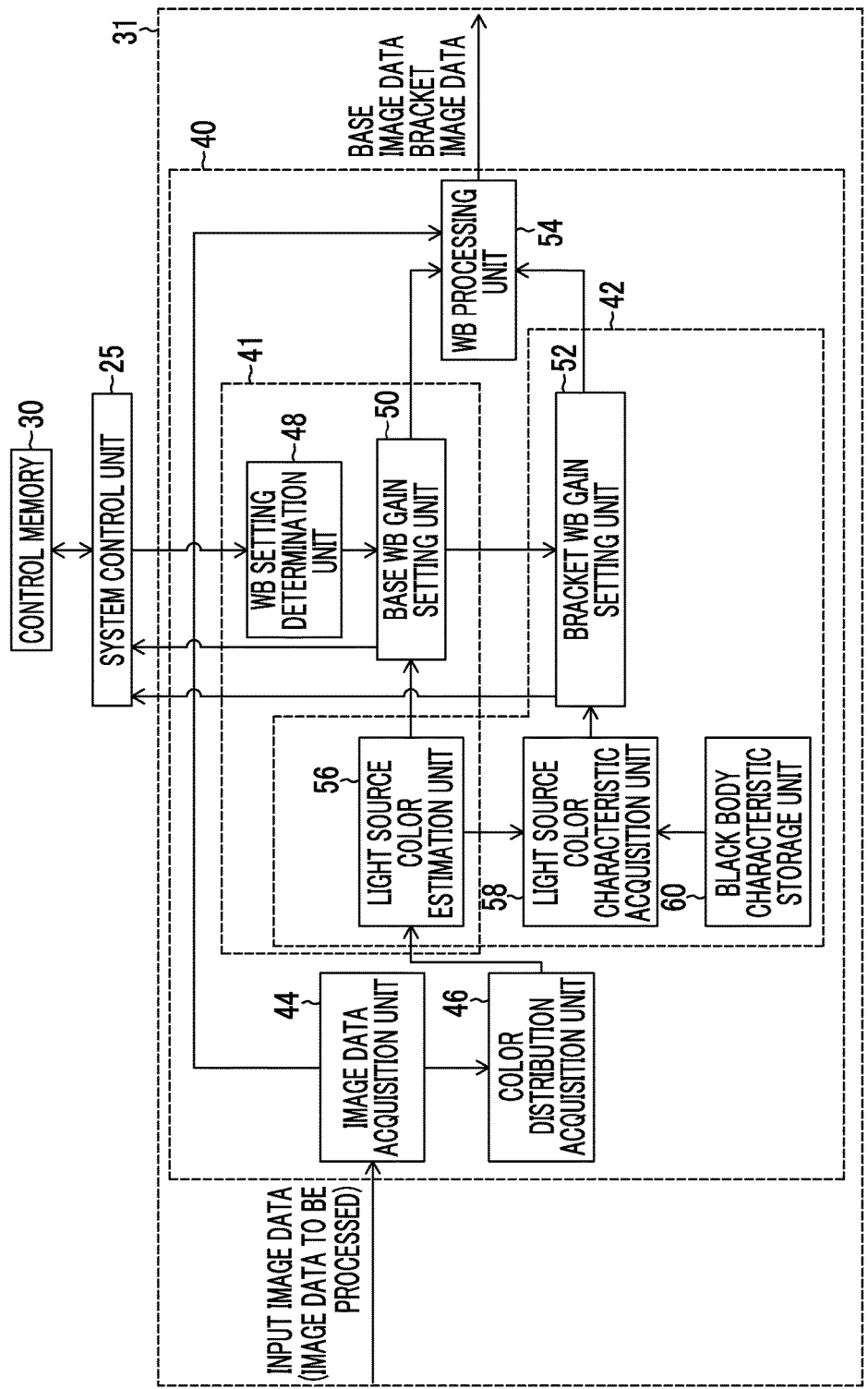

IMAGE PROCESSING DEVICE, IMAGING DEVICE, IMAGE PROCESSING METHOD, PROGRAM, AND RECORDING MEDIUM

CROSS-REFERENCE TO RELATED APPLICATIONS

This application is a Continuation of PCT International Application No. PCT/JP2014/084072 filed on Dec. 24, 2014, which claims priority under 35 U.S.C. § 119(a) to Japanese Patent Application No. 2014-22615 filed on Feb. 7, 2014. Each of the above applications is hereby expressly incorporated by reference, in their entirety, into the present application.

BACKGROUND OF THE INVENTION

1. Field of the Invention

The present invention relates to an image processing device, an imaging device, an image processing method, a program, and a recording medium, and more particularly, to a white balance bracketing technique.

2. Description of the Related Art

In imaging devices, such as digital cameras, white balance bracketing which is a kind of automatic bracketing function is known. White balance bracketing is a function that applies different white balance gains to an image to be processed and obtains a plurality of images with different white balances using one imaging operation. For example, a total of three images, that is, a "base image", "a first bracket image having a color closer to blue than the base image" and "a second bracket image having a color closer to umber than the base image" can be acquired by the white balance bracketing function. A user can reliably obtain an image subjected to appropriate white balance processing from the base image and the bracket image.

In general white balance processing, in some cases, a color failure, such as over-correction or under-correction, occurs depending on imaging conditions or object characteristics. However, according to white balance bracketing, even if imaging is performed under an environment in which a color failure occurs, a plurality of images with different white balances are acquired. The user selects a desired image from a plurality of images with different white balances. In this way, an image in which a color failure is removed or reduced is obtained.

For white balance bracketing, JP2002-51250A discloses an electronic camera that can perform bracket imaging on the basis of two imaging conditions. The electronic camera performs bracket imaging while changing each of a first imaging condition (exposure) and a second imaging condition (color balance). "A plurality of images captured under the same first imaging condition and under different second imaging conditions" are arranged in the vertical direction on a captured bracket image display screen and "a plurality of images captured under different first imaging conditions and under the same second imaging condition" are arranged in the horizontal direction on the captured bracket image display screen.

JP2006-20194A discloses an imaging device which enables a user to intuitively recognize the amount of correction in each direction. In the imaging device, on a rear display unit, the coordinate axis of a blue direction and an umber direction is displayed in the horizontal direction, the coordinate axis of a green direction and a magenta direction are displayed in the vertical direction, and the amount of correction is displayed on a coordinate system having the two axes, with a correction value being zero at the origin.

JP2002-305750A discloses a camera which can continuously capture images while changing a white balance control gain for various colors. The camera performs white balance processing on the basis of an arbitrary number of colors set by a photographer.

SUMMARY OF THE INVENTION

Problems Caused by Fixed Correction Direction

For example, in the electronic camera disclosed in JP2002-51250A, imaging is performed under predetermined conditions while an exposure and a color balance are being changed and an image is created by bracket imaging, regardless of the environment (captured scene) in which image data is captured and acquired. Therefore, in some cases, an "image subjected to appropriate white balance processing corresponding to a captured scene" is not present in the image created by bracket imaging, depending on a captured scene.

In particular, in an auto white balance mode (AWB mode), the color of an image tends to be shifted by white balance processing, depending on a correction direction. For example, in a case in which white balance processing is performed for an image that is captured in the shade or in a tungsten light environment in the auto white balance mode, the color of the image tends to shift in an umber-blue direction. In contrast, in a case in which white balance processing is performed for an image that is captured in a white fluorescent light environment or an image having the green of trees as a main color in the auto white balance mode, the color of the image tends to shift in a green-magenta direction.

Therefore, in some cases, when a "color correction direction due to white balance processing" is predetermined to be the umber-blue direction, it is difficult to obtain an image having appropriate colors in white balance processing for, for example, an image that is captured in a white fluorescent light environment or an image having the green of trees as a main color.

As such, in a case in which the white balance correction direction is fixed in advance, an image (a base image and a bracket image) having appropriate colors is not necessarily obtained.

Problems Caused by Determination of Processing Parameters by User

In the imaging device disclosed in JP2006-20194A, the user operates a multi-directional input stick or a sub-electronic dial to set a white balance correction and a white balance bracket. In the camera disclosed in JP2002-305750A, when the user selects the type of bracket and then selects a desired color during photographing, monochromatic white balance bracketing or multi-color white balance bracketing is performed.

As such, in a case in which the user needs to select white balance processing parameters, it takes a lot of time and effort for the user to perform the selection operation and the selection operation is a burden on the user. In addition, it is difficult for the user to accurately determine the processing parameters. In particular, it is difficult for a user who does not appropriately understand the principles of white balance to appropriately select the white balance processing parameters.

Problems Caused by Execution of White Balance Bracketing in a Plurality of Directions In the electronic camera disclosed in JP2002-51250A, bracket imaging is performed while changing an exposure and a color balance to capture nine images and the nine acquired images are arranged on a screen at the same time. Therefore, in the electronic camera, nine images related to the same scene are captured and acquired by one imaging operation and are then stored in a memory. Therefore, the number of scenes which can be captured is reduced to one-ninth of the number of scenes which can be captured in normal imaging in which white balance bracketing is not performed.

Similarly, in addition to the base image, even in a case in which a bracket image related to two directions among, for example, an umber direction, a blue direction, a green direction, a magenta direction, and an umber-blue direction and a green-magenta direction is created, a total of nine images are created for the same scene. Basically, since the user feels one of the nine images to be appropriate, the remaining eight images are originally unnecessary images and are wasted.

As such, as the number of bracket images created by white balance bracketing increases, the waste of the memory capacity of an image recording memory increases and the number of scenes which can be captured is reduced. In addition, it takes a lot of time and effort for the user to select a desired image since the number of options increases.

Problems Related to the Amount of Correction in White Balance Bracketing

In white balance bracketing, in general, a difference (the amount of bracket) in white balance between the base image and the bracket image is constant, without depending on a captured scene. For example, in a case in which white balance processing that shifts an image to be processed which is formed by R, G, and B pixel values in the umber direction by a distance corresponding to one step is performed, a white balance gain in which an R gain is 1.2 times the R gain of the base image and a B gain is 0.8 times the B gain of the base image is applied to the image to be processed, regardless of a captured scene.

The visual impression of an image varies depending on the chroma of the image, particularly, the chroma of the image of an "object of which the original color is white" (MacAdam's law). Therefore, even if the white balance gain in which an R gain is 1.2 times the R gain of the base image white balance gain and a B gain is 0.8 times the B gain of the base image white balance gain and which is changed at the same rate is applied to a plurality of images to be processed in different captured scenes, the visual impression of the image subjected to white balance processing varies depending on a captured scene. For example, for a base image created from the image to be processed which is acquired in a tungsten light environment, there are the following base images: a "base image which is subjected to white balance processing such that the color of an object image having gray (achromatic color) as the original chroma is perfect gray"; and a "warm and high-chroma base image which is subjected to white balance processing such that the color of an object image having gray (achromatic color) as the original chroma is close to umber". A case in which bracket images having the same bracket direction and the same amount of bracket as the base images having different chromas are created is assumed. In this case, as the visual impression, a difference in white balance between the bracket image of the "base image which is subjected to white balance processing such that the color of an object image having gray as the original chroma is perfect gray" and the base image seems to be larger than a difference in white balance between the bracket image of the "warm and high-chroma base image which is subjected to white balance processing such that the color of an object image having gray as the original chroma is close to umber" and the base image.

As such, in the white balance bracketing according to the related art, image characteristics are not sufficiently reflected in the bracket direction and/or the amount of bracket, which makes it difficult to provide an image (a base image and a bracket image) in which a defect, such as a color cast, has been removed to the user.

The invention has been made in view of the above-mentioned problems and an object of the invention is to provide a method which creates a white balance bracket image corresponding to image characteristics.

An aspect of the invention relates to an image processing device that acquires a white balance gain which is applied to original image data in order to obtain a base image and a bracket image. The image processing device comprises: a color distribution acquisition unit that acquires color distribution information of input image data; a first gain acquisition unit that acquires a base image white balance gain for obtaining the base image; and a second gain acquisition unit that acquires a bracket image white balance gain for obtaining the bracket image on the basis of the color distribution information and the base image white balance gain.

According to this aspect, the bracket image white balance gain corresponding to the color distribution information of the input image data is acquired. Therefore, it is possible to obtain a bracket image based on "white balance processing characteristics corresponding to the color distribution information of the input image data".

Here, the "color distribution information" is not particularly limited as long as it is information indicating the color distribution of the input image data. For example, the "color distribution information" may be determined on the basis of the distribution ratio between red, green, and blue (R, G, and B) in the input image data.

The "original image data" to which the white balance gain is applied and the "input image data" may be the same data or different data items. For example, the "original image data" and the "input image data" are the same data in a case in which the white balance gain is not stored in advance and a "white balance gain acquisition process" and a "base image and bracket image acquisition process" are performed as a series of processes at the same time, as in an auto white balance mode which will be described below. In contrast, the "original image data" and the "input image data" are different data items in a case in which the white balance gain is stored in advance and the "white balance gain acquisition process" and the "base image and bracket image acquisition process" are performed as individual processes as in a custom white balance mode which will be described below.

Preferably, the second gain acquisition unit determines a bracket direction in a color space on the basis of the color distribution information and acquires the bracket image white balance gain on the basis of the base image white balance gain and the bracket direction.

According to this aspect, since the bracket direction is determined on the basis of the color distribution information of the input image data, it is possible to obtain a bracket image in an appropriate bracket direction. In addition, in this aspect, since the bracket direction is limited on the basis of the color distribution information of the input image data, it is possible to prevent a bracket image from being created in an inappropriate bracket direction.

The "bracket direction in the color space" is a direction from the position of the base image to the position of the bracket image in the color space. The positions of the base image and the bracket image in the color space are represented by arbitrary data indicating the color distribution of the base image and the bracket image. For example, the positions of the base image and the bracket image in the color space may be determined on the basis of a representative color which is derived from the color distribution of the base image and the bracket image.

The "color space" is not particularly limited and may be, for example, an RGB color space, an xyY color space, an XYZ color space, an L*u*v* color space, an L*a*b* color space, or a YCrCb color space.

The second gain acquisition unit may determine the ratio between the colors of the bracket image white balance gain to determine the bracket direction.

Preferably, the second gain acquisition unit determines an absolute value of an amount of bracket on the basis of the color distribution information and acquires the bracket image white balance gain on the basis of the base image white balance gain and the absolute value of the amount of bracket.

According to this aspect, since the absolute value of the amount of bracket is determined on the basis of the color distribution information of the input image data, it is possible to obtain a bracket image with an appropriate amount of bracket.

The "amount of bracket" corresponds to the distance from the position of the base image to the position of the bracket image in the color space and indicates a variation in the white balance of the bracket image with respect to the white balance of the base image.

The second gain acquisition unit may determine the absolute value of the amount of bracket of each color on the basis of the color distribution information and calculate the bracket image white balance gain on the basis of the base image white balance gain and the absolute value of the amount of bracket of each color.

Preferably, the second gain acquisition unit estimates a light source color from the color distribution information and acquires the bracket image white balance gain on the basis of the light source color estimated from the color distribution information.

According to this aspect, since the bracket image white balance gain is acquired on the basis of the light source color estimated from the color distribution information of the input image data, it is possible to obtain a bracket image corresponding to the characteristics of the light source color.

The "light source color" is determined on the basis of the color characteristics of light which illuminates an object or light which is emitted from an object when input image data is captured and acquired.

Preferably, the second gain acquisition unit acquires the bracket image white balance gain on the basis of a correlated color temperature of the light source color estimated from the color distribution information.

According to this aspect, since the bracket image white balance gain is acquired on the basis of the correlated color temperature of the estimated light source color, it is possible to create a bracket image in which white balance characteristics based on the correlated color temperature are reflected.

The "correlated color temperature" is represented by a color (temperature) with black-body radiation characteristics (black-body radiation locus) which appears in a color closest to the light source color and can be used as an index indicating light color.

Preferably, the second gain acquisition unit determines the absolute value of the amount of bracket on the basis of the correlated color temperature of the light source color estimated from the color distribution information and acquires the bracket image white balance gain on the basis of the absolute value of the amount of bracket.

According to this aspect, since the absolute value of the amount of bracket is determined on the basis of the correlated color temperature of the estimated light source color, it is possible to create a bracket image in which the characteristics of a variation in white balance based on the correlated color temperature are reflected.

Preferably, the second gain acquisition unit acquires the bracket image white balance gain on the basis of a distance between black-body radiation characteristics in the color space and the light source color estimated from the color distribution information.

According to this aspect, it is possible to create a bracket image in which white balance characteristics based on the distance between the black-body radiation characteristics (black-body radiation locus) and the light source color are reflected.

The "distance between the black-body radiation characteristics and the light source color estimated from the color distribution information" means the "distance between the light source color and a black-body radiation locus on a normal line that passes through the estimated light source color among lines normal to the black-body radiation locus indicating the black-body radiation characteristics in the color space". The light source colors on the same line normal to the black-body radiation locus have the same correlated color temperature.

Preferably, the second gain acquisition unit adjusts the bracket direction in the color space such that it becomes closer to an umber-blue direction as the distance between the black-body radiation characteristics and the light source color estimated from the color distribution information decreases and it becomes closer to a green-magenta direction as the distance increases, thereby acquiring the bracket image white balance gain.

According to this aspect, since the bracket direction is determined on the basis of the distance between the black-body radiation characteristics (black-body radiation locus) and the light source color, it is possible to obtain a bracket image in an appropriate bracket direction.

The black-body radiation characteristics (black-body radiation locus) extend in the umber-blue direction in the color space. Therefore, as the light source color becomes closer to the black-body radiation characteristics, the base image subjected to white balance processing is more likely to shift in the umber-blue direction. In addition, as the light source color is further away from the black-body radiation characteristics, the base image subjected to white balance processing is more likely to shift in the green-magenta direction. Therefore, according to this aspect, the bracket direction is determined according to color shift characteristics based on the light source color of the base image.

Preferably, the second gain acquisition unit acquires chroma information of the base image on the basis of the light source color estimated from the color distribution information and the base image white balance gain and acquires the bracket image white balance gain on the basis of the chroma information.

According to this aspect, since the bracket image white balance gain is acquired on the basis of the chroma information of the base image, it is possible to obtain a bracket image in which white balance characteristics based on a chroma are reflected.

Preferably, the second gain acquisition unit acquires the chroma information on the basis of a chroma of the base image relative to an achromatic color, determines the absolute value of the amount of bracket on the basis of the chroma information, and acquires the bracket image white balance gain on the basis of the base image white balance gain and the absolute value of the amount of bracket.

Preferably, the image processing device further comprises a display characteristic acquisition unit that acquires display characteristic information of a display unit which displays at least one of the base image or the bracket image. Preferably, the second gain acquisition unit acquires display achromatic color information on the basis of the display characteristics information acquired from the display characteristic acquisition unit. Preferably, the second gain acquisition unit acquires the chroma information on the basis of a chroma of the base image relative to a display achromatic color obtained from the display achromatic color information. Preferably, the second gain acquisition unit determines the absolute value of the amount of bracket on the basis of the chroma information and acquires the bracket image white balance gain on the basis of the base image white balance gain and the absolute value of the amount of bracket.

Preferably, the second gain acquisition unit increases the absolute value of the amount of bracket as a difference in chroma between the achromatic color and the base image increases, on the basis of the chroma information, thereby acquiring the bracket image white balance gain.

According to these aspects, since the absolute value of the amount of bracket is determined on the basis of the chroma of the base image relative to the achromatic color (display achromatic color), it is possible to obtain a bracket image in which the characteristics of the amount of bracket of the white balance based on a chroma are reflected.

In general, due to the human visual characteristics, the human eye is sensitive to a change in a color close to achromatic color and is insensitive to a change in a high-chroma color (MacAdam's law). Therefore, in a case in which the chroma of the base image is low and the color of the base image is close to an achromatic color (display achromatic color), the absolute value of the amount of bracket is set to a small value. In a case in which the chroma of the base image is high and the color of the base image is further away from the achromatic color (display achromatic color), the absolute value of the amount of bracket is set to a large value. Therefore, it is possible to remove a visual difference in chroma between the base image and the bracket image.

The "display characteristic information" is information about the display characteristics (for example, color display reproducibility) of the display unit. In addition, the "display achromatic color information" is color information considering the display characteristics (for example, color temperature) of the display unit and is color information which is used by the display unit to display and reproduce an achromatic color.

Another aspect of the invention relates to an image processing device that acquires a white balance gain which is applied to original image data in order to obtain a base image and a bracket image. The image processing device comprises: a first gain acquisition unit that acquires a base image white balance gain for obtaining the base image; a second gain acquisition unit that acquires a bracket image white balance gain for obtaining the bracket image; and a flash specifying unit that acquires a degree of influence of a flash indicating a degree of influence of a flash in input image data. The first gain acquisition unit acquires the base image white balance gain on the basis of the degree of influence of the flash, and the second gain acquisition unit acquires the bracket image white balance gain on the basis of a degree of influence of a flash that is different from the degree of influence of the flash used to acquire the base image white balance gain.

According to this aspect, since the base image white balance gain and the bracket image white balance gain are acquired on the basis of different degrees of influence of a flash, it is possible to create a bracket image which compensates for a variation in the degree of influence of a flash in an image.

The input image data is captured and acquired while flash light is emitted and it is preferable that the flash specifying unit calculates the degree of influence of the flash from the input image data and reference image data which is captured and acquired without emitting flash light. The use of a flash light emission image (input image data) and a flash light non-emission image (reference image data) makes it possible to simply calculate the degree of influence of the flash. It is preferable that the input image data and the reference image data are the same as a captured object image or are as close to the captured object as possible. Therefore, it is preferable that the reference image data is data which is captured and acquired immediately before or immediately after the input image data is captured and acquired. For example, the reference image data may be acquired on the basis of a live view image.

In a case in which the white balance setting mode is the auto white balance mode, the process of "acquiring the base image white balance gain and the bracket image white balance gain on the basis of the degree of influence of the flash" may be performed.

Preferably, the second gain acquisition unit determines whether the bracket image needs to be created on the basis of the color distribution information of the input image data, with reference to data indicating whether bracketing is required which defines a relationship between the color distribution information and whether the bracket image needs to be created, acquires the bracket image white balance gain in a case in which it is determined that the bracket image needs to be created, and does not acquire the bracket image white balance gain in a case in which it is determined that the bracket image does not need to be created.

According to this aspect, it is determined whether the bracket image needs to be created on the basis of the data indicating whether bracketing is required. Only in a case in which the bracket image needs to be created, the bracket image white balance gain is acquired and a bracket image can be created.

The color distribution information and whether the bracket image needs to be created are appropriately determined on the basis of the data indicating whether bracketing is required. Therefore, it is possible to effectively perform white balance bracketing.

Preferably, the data indicating whether bracketing is required defines that the bracket image needs to be created for color distribution information in which the base image white balance gain is likely to be inappropriate.

According to this aspect, only in a case in which the white balance of the base image to be created is likely to be inappropriate, the bracket image white balance gain is acquired and a bracket image can be created. The case in which "the base image white balance gain is likely to be inappropriate" is not particularly limited. For example, the data indicating whether bracketing is required may define that the "base image white balance gain is likely to be inappropriate" for the color distribution information implemented by a plurality of types of light source color.

Therefore, the data indicating whether bracketing is required may define that a bracket image needs to be created for the color distribution information of at least green or red. In general, the proportion of a green component is high in both image data which is captured under sunlight and includes a large amount of data for, for example, the green of a tree and image data which is captured under an artificial light source that emits light having a high proportion of green components. In addition, the proportion of a red component is high in both sunset image data which is captured under sunlight and image data which is captured under an artificial light source that emits light having a high proportion of red components. Therefore, in a case in which the color distribution information of the input image data indicates green or red, it is difficult to limit the number of light source colors to 1. For this reason, the data indicating whether bracketing is required may define that the "base image white balance gain is likely to be inappropriate" for these color distribution information items.

In a case in which the white balance setting mode is the auto white balance mode, the process of "acquiring the bracket image white balance gain on the basis of the data indicating whether bracketing is required" may be performed.

Preferably, the image processing device further comprises a white balance processing unit that applies the base image white balance gain to the original image data to obtain the base image and applies the bracket image white balance gain to the original image data to obtain the bracket image.

According to this aspect, a base image and a bracket image are obtained.

The input image data and the original image data may be the same data or different data items.

The white balance processing unit may add classification information indicating a main image to the base image and may add classification information indicating a sub-image to the bracket image. In addition, the white balance processing unit may add the classification information indicating a sub-image to the base image and may add the classification information indicating a main image to one of the bracket images.

According to these aspects, it is possible to classify the base image and the bracket images as the main image and the sub-image.

Preferably, the image processing device further comprises a display unit and a display control unit that controls the display unit such that at least one of the base image or the bracket image is displayed on the display unit.

According to this aspect, at least one of the obtained base image or the obtained bracket image is displayed on the display unit and the user can check the image displayed on the display unit.

Preferably, the display control unit displays at least one of the base image or the bracket image, to which the main image classification information is added, on the display unit.

According to this aspect, the user can check the image, to which the main image classification information with high priority is added, through the display unit.

Preferably, the image processing device further comprises: an instruction receiving unit that receives an instruction to decide the classification information to be added to the base image and the bracket image from a user; and a classification information rewriting unit that can rewrite the classification information added to the base image and the bracket image on the basis of the decision instruction input to the instruction receiving unit.

According to this aspect, it is possible to rewrite the classification information added to the base image and the bracket image in response to the determination instruction from the user and to switch the image to which the main image classification information is added.

The instruction receiving unit may receive a decision instruction to designate an image to be used as the main image among the base image and the bracket images from the user and the classification information rewriting unit may set the classification information of an image which is designated by the decision instruction input to the instruction receiving unit among the base image and the bracket images so as to indicate the main image and may set the classification information of the other images so as to indicate the sub-image.

The display unit may be configured such that the user can select one image as an image of interest from one or a plurality of images among the base image and the bracket images. When the user inputs a decision instruction indicating the selection of the image of interest to the instruction receiving unit, the classification information rewriting unit may set the classification information of the image of interest, which is designated by the decision instruction input to the instruction receiving unit, so as to indicate the main image.

In a case in which the classification information rewriting unit rewrites the classification information of at least one of the base image or the bracket image, the display control unit may display one or a plurality of images among the base image and the bracket images on the display unit on the basis of the rewritten classification information.

Preferably, the image processing device further comprises an image storage unit that stores the base image and the bracket image so as to be associated with each other.

According to this aspect, it is possible to store the base image and the bracket image in the image storage unit while maintaining the relationship between the base image and the bracket image.

The image processing device may comprise a group information addition unit that adds group information data indicating the association between the base and bracket images and other images to each of the base image and the bracket image and the image storage unit may store the base and bracket images and the group information data added to the base and bracket images. In this case, the relationship between the base image and the bracket image is maintained on the basis of the group information data.

Preferably, the image processing device further comprises: an image storage unit that stores the base image and the bracket image so as to be associated with each other; and a storage control unit that deletes one of the base image and the bracket image, to which sub-image classification information is added, from the image storage unit in a case in which a time elapsed since the creation of the base image is longer than a first time.

Preferably, the image processing device further comprises: an image storage unit that stores the base image and the bracket image so as to be associated with each other; and a storage control unit that deletes one of the base image and the bracket image, to which the sub-image classification information is added, from the image storage unit in a case in which the classification information of at least one of the base image or the bracket image is rewritten by the classification information rewriting unit and a time elapsed since the rewriting of the classification information is longer than a second time.

According to these aspects, since one of the base image and the bracket image, to which the sub-image classification information is added, is deleted from the image storage unit over time, it is possible to prevent a reduction in the number of scenes which can be captured and stored in the image storage unit. The number of scenes which can be captured corresponds to the number of types of original image data used to create the base image and the bracket image.

The image processing device may further comprise a clock device that provides date and time information and a date and time information addition unit that adds editing date and time information to the base image and the bracket image. The storage control unit may delete the image, to which the sub-image classification information is added, from the image storage unit on the basis of the date and time information obtained from the clock device and the editing date and time information (image creation date and time information and/or classification information rewriting latest date and time information) of the images, to which the main image classification information and/or the sub-image classification information are added among the base image and the bracket images.

Preferably, the display control unit displays a color coordinate system on the display unit and displays the color distribution information of at least one of the base image or the bracket image, which is to be displayed on the display unit, on the color coordinate system displayed on the display unit.

According to this aspect, the user can easily check the position of the base image and/or the bracket image on the color coordinate system displayed on the display unit.

Preferably, the display control unit displays the color distribution information of one of the base image and the bracket image, to which main image classification information is added, on the color coordinate system displayed on the display unit.

According to this aspect, the user can easily check the position of the image, to which the main image classification information with high priority is added, on the color coordinate system.

The display control unit may display the color distribution information of the base image at the origin of the color coordinate system.

Preferably, the display control unit sequentially displays each of the base image and the bracket image in the same region of the display unit over time.

According to this aspect, since the base image and the bracket image are displayed in the same region of the display unit, the user can easily check the difference between the base image and the bracket image.

The image processing device may further comprise an image switching receiving unit that receives an instruction to switch an image to be displayed on the display unit from the user. The display control unit may switch the images to be displayed in the same region of the display unit among the base image and the bracket images in response to the image switching instruction input to the image switching receiving unit.

Preferably, the first gain acquisition unit acquires the base image white balance gain on the basis of a set mode.

Preferably, the set mode is at least one of a preset white balance mode in which the base image white balance gain is predetermined, an auto white balance mode in which the base image white balance gain to be applied to the input image data is determined on the basis of the color distribution information of the input image data, or a custom white balance mode in which the base image white balance gain to be applied to the original image data that is different from the input image data is determined on the basis of the color distribution information of the input image data.

Preferably, in a case in which the set mode is the auto white balance mode in which the base image white balance gain to be applied to the input image data is determined on the basis of the color distribution information of the input image data, the first gain acquisition unit acquires the base image white balance gain on the basis of the color distribution information of the input image data and the second gain acquisition unit acquires the bracket image white balance gain on the basis of the color distribution information which is used by the first gain acquisition unit to acquire the base image white balance gain.

According to this aspect, in the auto white balance mode, it is possible to accurately acquire the base image white balance gain and the bracket image white balance gain on the basis of the same color distribution information.

The first gain calculation unit may calculate the base image white balance gain on the basis of image data different from the input image data.

Still another aspect of the invention relates to an imaging device comprising: an imaging element that receives an object image and generates image data; and the above-mentioned image processing device that uses the image data generated by the imaging element as input image data.

The imaging device may further comprise an imaging instruction unit that receives an imaging instruction from the user. The first gain calculation unit may calculate the base image white balance gain and the second gain calculation unit may calculate the bracket image white balance gain, in response to one imaging instruction received by the imaging instruction unit.

Yet another aspect of the invention relates to an image processing method that acquires a white balance gain which is applied to original image data in order to obtain a base image and a bracket image. The image processing method comprises: acquiring color distribution information of input image data; acquiring a base image white balance gain for obtaining the base image; and acquiring a bracket image white balance gain for obtaining the bracket image on the basis of the color distribution information and the base image white balance gain.

Still yet another aspect of the invention relates to a program that acquires a white balance gain applied to original image data in order to obtain a base image and a bracket image and causes a computer to perform: a step of acquiring color distribution information of input image data; a step of acquiring a base image white balance gain for obtaining the base image; and a step of acquiring a bracket image white balance gain for obtaining the bracket image on the basis of the color distribution information and the base image white balance gain.

Yet still another aspect of the invention relates to a non-transitory computer-readable recording medium storing a program that acquires a white balance gain applied to original image data in order to obtain a base image and a bracket image and causes a computer to perform: a step of acquiring color distribution information of input image data; a step of acquiring a base image white balance gain for obtaining the base image; and a step of acquiring a bracket image white balance gain for obtaining the bracket image on the basis of the color distribution information and the base image white balance gain.

According to the invention, the bracket image white balance gain is acquired on the basis of the color distribution information of the input image data or the degree of influence of the flash. The bracket image white balance gain is applied to the original image data, which is an image to be processed, and white balance processing is performed to create an appropriate bracket image.

BRIEF DESCRIPTION OF THE DRAWINGS

FIG. 8 is a flowchart illustrating white balance processing according to the second embodiment.

FIG. 10 is a functional block diagram illustrating an example of the structure of a white balance image processing unit according to a third embodiment.

DESCRIPTION OF THE PREFERRED EMBODIMENTS

Embodiments of the invention will be described with reference to the drawings. In the following embodiments, an example in which the invention is applied to a digital camera (imaging device) will be described. However, the invention can be applied to an image processing device, an imaging device, an image processing method, a program, and a recording medium, in addition to the digital camera.

In the following description and the drawings, "WB" means "white balance".

Figure 1:
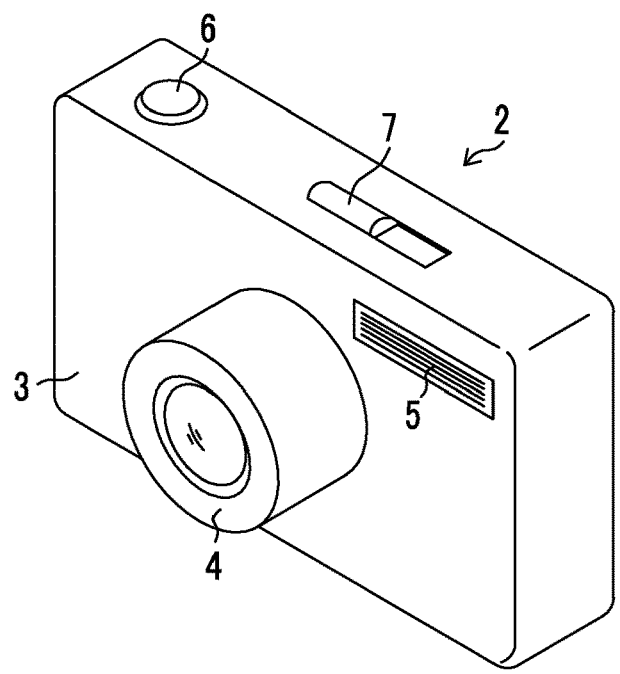
FIG. 1 is a front perspective view illustrating a digital camera.
Figure 2:
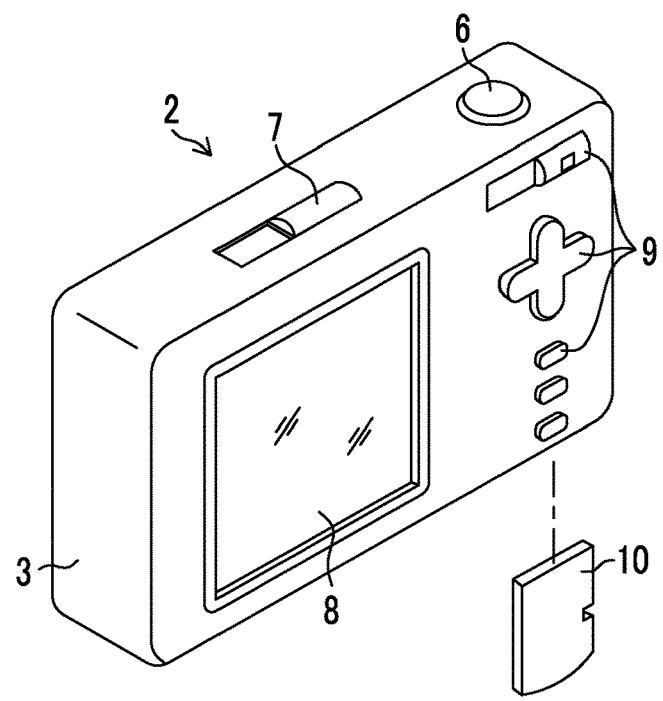
FIG. 2 is a rear perspective view illustrating the digital camera.

FIG. 1 is a front perspective view illustrating a digital camera 2 and FIG. 2 is a rear perspective view illustrating the digital camera 2.

The digital camera 2 comprises a camera body 3 and a lens barrel 4 that is attached to a front surface of the camera body 3. The lens barrel 4 and the camera body 3 may be integrally provided or may be detachably provided as an interchangeable lens camera.

In addition to the lens barrel 4, a flash light emitting unit 5 is provided on the front surface of the camera body 3. A shutter button 6 and a power switch 7 are provided on an upper surface of the camera body 3. The shutter button 6 is an imaging instruction unit that receives an imaging instruction from a user. The power switch 7 is a power switching unit that receives an instruction to turn on and off the digital camera 2 from the user.

A display unit 8 and an operating unit 9 are provided on a rear surface of the camera body 3. The display unit 8 displays a live view image (through image) in an imaging standby state to function as an electronic viewfinder and functions as a reproduction image display unit when a captured image or a memory-recorded image is reproduced.

The operating unit 9 is an arbitrary operating device, such as a mode switch, a cross key, or an execution key. For example, the mode switch is operated by the user to switch the operation mode of the digital camera 2. Examples of the operation mode of the digital camera 2 include an imaging mode in which an image of an object is captured to obtain a captured image and a playback mode in which an image is reproduced and displayed. Examples of the imaging mode includes an auto focus (AF) mode in which auto focus is performed and a manual focus (MF) mode in which a manual focus operation is performed. The cross key and the execution key are operated by the user to display a menu screen or a setting screen on the display unit 8, to move a cursor displayed on the menu screen or the setting screen, or to confirm various types of settings of the digital camera 2. In addition, the user can operate the operating unit 9 to switch the mode between a white balance bracketing mode, which will be described below, and a general white balance mode.

A memory slot into which a main memory 10 is inserted and a cover that opens and closes an opening of the memory slot are provided at the bottom (not illustrated) of the camera body 3. The main memory 10 is detachably provided in the camera body 3. When the main memory 10 is inserted into the camera body 3, it is electrically connected to a storage control unit 33 provided in the camera body 3. The main memory 10 can be generally a semiconductor memory, such as a card-type flash memory. The main memory 10 is not particularly limited. For example, a recording medium using an arbitrary recording method, such as a magnetic medium, can be used as the main memory 10.

Figure 3:
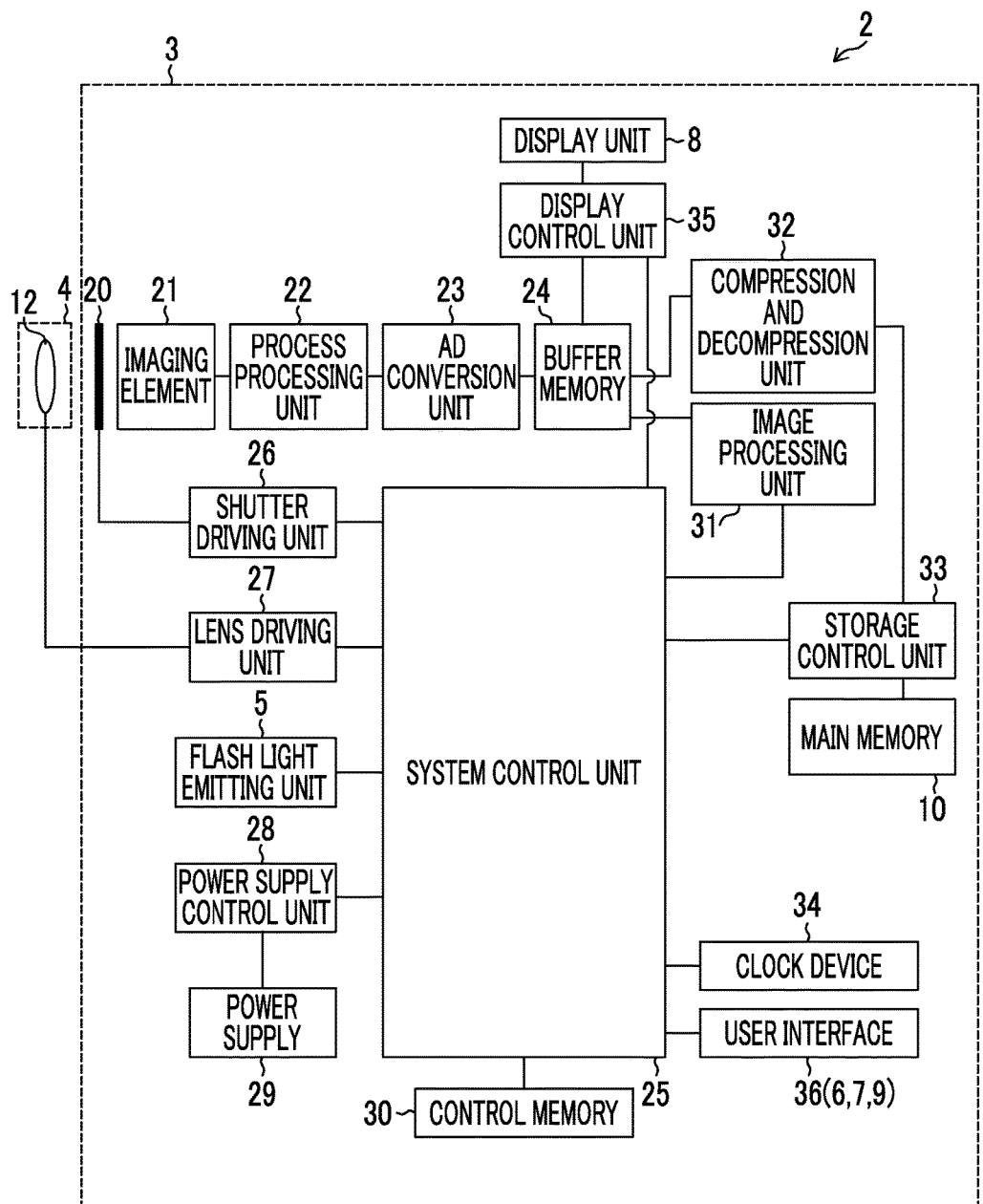
FIG. 3 is a block diagram illustrating a control processing system of the digital camera.

FIG. 3 is a block diagram illustrating a control processing system of the digital camera 2.

Object light passes through a lens unit 12 that is provided in the lens barrel 4 and a mechanical shutter 20 that is provided in the camera body 3 and is received by an imaging element 21. The imaging element 21 is an element that receives the object image and generates image data and includes color filters, such as red, green, and blue (R, G, and B) filters, and an image sensor, such as a charge coupled device (CCD) or a complementary metal oxide semiconductor (CMOS), which converts an optical image into an electric signal. For example, an automatic gain control (AGC) circuit of a process processing unit 22 performs process processing for image data that is output from the imaging element 21 and an AD conversion unit 23 converts analog image data into digital image data. The digital image data is stored in a buffer memory 24.

The buffer memory 24 is an area that temporarily stores the image data and is, for example, a dynamic random access memory (DRAM). The image data that has been transmitted from the AD conversion unit 23 and then stored in the buffer memory 24 is read by an image processing unit (image processing device) 31 which is controlled by a system control unit 25. The image processing unit 31 performs various types of imaging processing, such as white balance processing, a gamma correction process, and a demosaic process, using the image data generated by the imaging element 21 as input image data, and stores the image data subjected image processing in the buffer memory 24 again.

The image data which has been subjected to the image processing by the image processing unit 31 and then stored in the buffer memory 24 is read by a display control unit 35 and a compression and decompression unit 32. The display control unit 35 controls the display unit 8 such that the image data read from the buffer memory 24 is displayed on the display unit 8. As such, the image data which has been output from the imaging element 21 and then subjected to the image processing by the image processing unit 31 is displayed as an imaging check image and a post-view image on the display unit 8.

The compression and decompression unit 32 compresses the image data read from the buffer memory 24 to create image data with an arbitrary compression format, such as Joint Photographic Experts Group (JPEG) or Tagged Image File Format (TIFF). The compressed image data is recorded in the main memory 10 by the storage control unit 33 that controls a process of recording data in the main memory 10 and a process of reading data from the main memory 10. In a case in which a data type, such as image data, is recorded in the main memory 10, the storage control unit 33 adds imaging information, such as editing date and time information, or other kinds of related information to the data type (update date and time information), on the basis of date and time information acquired from a clock device 34 which will be described below. The imaging information is added to the image data in any format. For example, an exchangeable image file format (Exif) can be used.

In the playback mode in which the image data stored in the main memory 10 is played back, the image data stored in the main memory 10 is read by the storage control unit 33 that is controlled by the system control unit 25, is decompressed by the compression and decompression unit 32, and is then stored in the buffer memory 24. The image data is read from the buffer memory 24 by the display control unit 35 and is reproduced and displayed on the display unit 8 in the same order as that in which a captured image is checked and displayed.

As described above, the system control unit 25 controls the buffer memory 24, the image processing unit 31, and the storage control unit 33. In addition, the system control unit 25 controls other units in the digital camera 2. For example, the system control unit 25 controls a lens driving unit 27 to control the driving of the lens unit 12 and controls a shutter driving unit 26 to control the driving of the mechanical shutter 20. In addition, the system control unit 25 controls the flash light emitting unit 5 to control the emission of non-emission of flash light and controls a power control unit 28 to detect, for example, whether a battery is mounted on a power supply 29, the type of battery, and a remaining battery level. Furthermore, the system control unit 25 acquires date and time information which is counted by the clock device 34 and uses the date and time information in various types of processes. The system control unit 25 controls various processing units forming the image processing unit 31.

In addition, the system control unit 25 acquires an operation signal from a user interface 36 including the shutter button 6, the power switch 7, and the operating unit 9 and performs various types of processes and device control corresponding to the operation signal. For example, the system control unit 25 controls the shutter driving unit 26 to control the opening and closing of the mechanical shutter 20 in response to a release signal received from the shutter button 6. Furthermore, the system control unit 25 controls the power control unit 28 to control the turn-on and tune-off of the power supply 29 in response to a power on/off signal received from the power switch 7.

Programs or data types required for various types of processes and device control performed by the system control unit 25 are stored in a control memory 30. The system control unit 25 can read the programs or the data types stored in the control memory 30, if necessary. In addition, the system control unit 25 can store a new program or a new data type in the control memory 30. For example, the system control unit 25 can write condition data, such as the type of set white balance mode or a white balance gain, to the control memory 30. The system control unit 25 can control the display control unit 35 such that various kinds of information acquired from each unit are displayed on the display unit 8. In addition, the system control unit 25 can change various kinds of information to be displayed on the display unit 8, in response to an operation signal which is input from the user through the user interface 36.

Next, the white balance processing of the image processing unit 31 will be described.

Figure 4:
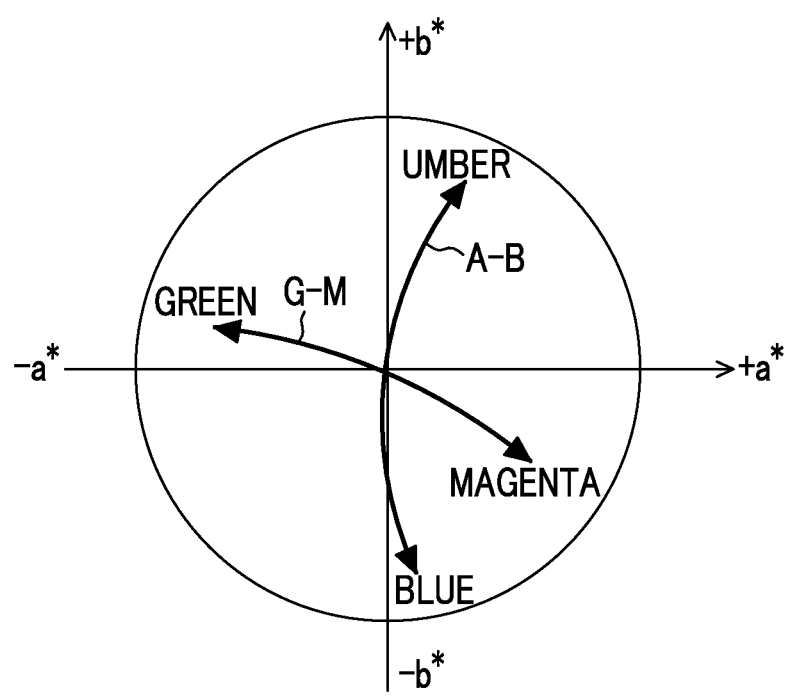
FIG. 4 is a chromaticity diagram illustrating an L*a*b* color system.

FIG. 4 is a chromaticity diagram illustrating an L*a*b* color system.

In the L*a*b* color system, an umber-blue direction is represented by an arrow "A-B" in FIG. 4 and a green-magenta direction is represented by an arrow "G-M" in FIG. 4. Therefore, a representative color of an image in which colors are biased to the umber-blue direction is plotted at a position that deviates from the origin of the coordinate system illustrated in FIG. 4 in the direction of the arrow "A-B". In contrast, a representative color of an image in which colors are biased to the green-magenta direction is plotted at a position that deviates from the center of the coordinate system illustrated in FIG. 4 in the direction of the arrow "G-M".

The "representative color of an image" is determined by any method. For example, the representative color may be determined on the basis of the statistics of a chromaticity distribution of an image. Alternatively, the representative color may be determined by, for example, a color space linear segmentation method that divides only a region in which the colors of an image are distributed in a color space into segments and determines a representative color. In addition, "color distribution information" of image data and a "light source color" may be determined on the basis of the "representative color of an image".

General white balance processing is a process for removing the color unevenness of an image and returning the representative color of the image to the origin of the chromaticity diagram illustrated in FIG. 4.

Hereinafter, embodiments of the white balance processing will be described.

In each of the following embodiments, the white balance processing is performed by the image processing unit 31 (see FIG. 3). The image processing unit 31 performs image processing (for example, a gamma correction process and a demosaic process) in addition to the white balance processing. Therefore, before and/or after the white balance processing according to each embodiment, other types of image processing may be performed. In addition, one or more bracket images may be created by white balance bracketing. In each of the following embodiments, an example of a white balance bracketing process which creates two bracket images in addition to one base image will be described.

First Embodiment

In this embodiment, in a white balance bracketing process which acquires a plurality of images (a base image and a bracket image) with different white balances using one release operation through the shutter button 6, a bracket image white balance gain is automatically calculated according to a color distribution of input image data.

Figure 5:
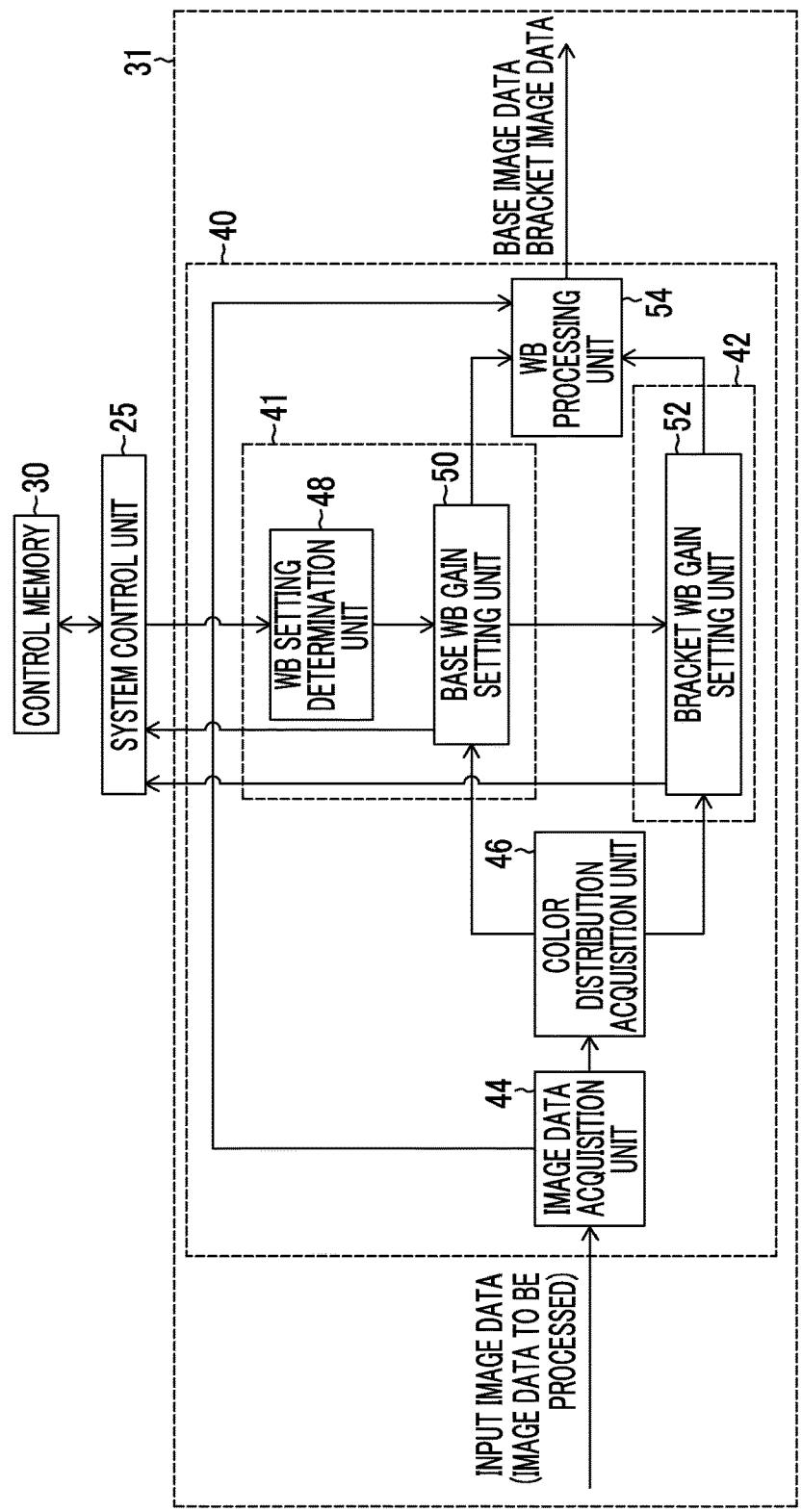
FIG. 5 is a functional block diagram illustrating an example of the structure of a white balance image processing unit (image processing device) according to a first embodiment.

FIG. 5 is a functional block diagram illustrating an example of the structure of a white balance image processing unit 40 (image processing device) according to a first embodiment.

The white balance image processing unit 40 in the image processing unit 31 includes an image data acquisition unit 44, a color distribution acquisition unit 46, a first gain acquisition unit 41, a second gain acquisition unit 42, and a white balance processing unit (hereinafter, referred to as a "WB processing unit") 54. The white balance image processing unit 40 is an image processing device that acquires a white balance gain which is applied to the original image data (image data to be processed) in order to obtain a base image and a bracket image and applies the white balance gain to the original image data (image data to be processed).

The image data acquisition unit 44 receives input image data transmitted to the white balance image processing unit 40 and transmits the received input image data to the color distribution acquisition unit 46 and the WB processing unit 54.

The color distribution acquisition unit 46 analyzes the input image data transmitted from the image data acquisition unit 44 and acquires color distribution information of the input image data. The color distribution information is determined by any method as long as it is based on the input image data. For example, a representative color of the input image data may be the color distribution information, or data that is based on an integrated value of pixel values forming the image data which is transmitted from the imaging element 21 by a release operation through the shutter button 6 may be used as the color distribution information.

The first gain acquisition unit 41 includes a white balance setting determination unit (hereinafter, referred to as a "WB setting determination unit") 48 and a base white balance gain setting unit (hereinafter, referred to as a "base WB gain setting unit") 50 and acquires a base image white balance gain for obtaining a base image according to a white balance setting mode.

The WB setting determination unit 48 receives information data related to the white balance setting mode from the system control unit 25 and acknowledges the white balance setting mode. The information data related to the white balance setting mode is stored in the control memory 30 and the system control unit 25 can read and rewrite the information data. The white balance setting mode may be predetermined or the user can set the white balance setting mode to any mode through the user interface 36 (see FIG. 3).

For example, the user may select any one of a preset white balance mode, an auto white balance mode, and a custom white balance mode as the white balance setting mode. In the preset white balance mode, the base image white balance gain is predetermined. The base image white balance gain is stored in the control memory 30. In the auto white balance mode, the base image white balance gain which is to be applied to the input image data is determined on the basis of the color distribution information of the input image data. In the custom white balance mode, a base image white balance gain to be applied to image data to be processed, which is different from the input image data, is determined on the basis of the color distribution information of the input image data.

That is, in the custom white balance mode, when the user takes a picture of an achromatic (white or gray) object, image data is output from the imaging element 21 and is acquired as the input image data. Then, a white balance gain required to represent an appropriate achromatic color of the object is calculated and is set as the base image white balance gain. Therefore, in the custom white balance mode, the base image white balance gain determined on the basis of the color distribution information of the input image data is stored in the control memory 30. Then, in the white balance processing for creating a base image, the base image white balance gain read from the control memory 30 is applied to the image data to be processed. Therefore, in the custom white balance mode, the "input image data used to determine the base image white balance gain" is different from the "image data to be processed which is applied to the base image white balance gain in order to obtain a base image". In the auto white balance mode, the "input image data used to determine the base image white balance gain" can be the same as the "image data to be processed which is applied to the base image white balance gain in order to obtain a base image".

In the preset white balance mode and the custom white balance mode, the system control unit 25 transmits the base image white balance gain stored in the control memory 30 and the information data related to the white balance setting mode to the WB setting determination unit 48.

FIG. 5 illustrates an example in which the WB setting determination unit 48 is provided in the white balance image processing unit 40. However, the WB setting determination unit 48 may be provided as a portion of the system control unit 25. Alternatively, the system control unit 25 may perform the functions of the WB setting determination unit 48 and the WB setting determination unit 48 may be omitted.

The base WB gain setting unit 50 acquires the information data related to the white balance setting mode acknowledged by the WB setting determination unit 48 and acquires a base image white balance gain according to the white balance setting mode.

In a case in which a mode in which the base image white balance gain is predetermined, such as the preset white balance mode or the custom white balance mode, is used as the set mode, the base image white balance gain stored in the control memory 30 is supplied to the base WB gain setting unit 50 through the system control unit 25 and the WB setting determination unit 48.

In contrast, in a case in which a mode in which the base image white balance gain is not predetermined, such as the auto white balance mode, is used as the set mode, the base WB gain setting unit 50 acquires the base image white balance gain on the basis of the color distribution information of the input image data transmitted from the color distribution acquisition unit 46. A detailed method for calculating the base image white balance gain is not particularly limited. For example, a white balance gain required to setting the representative color of the input image data to an achromatic color which is indicated by the origin of the coordinate system in the chromaticity diagram of FIG. 4 illustrating the L*a*b* color system may be used as the base image white balance gain.

Then, the base WB gain setting unit 50 transmits the acquired base image white balance gain to the system control unit 25, the WB processing unit 54, and the second gain acquisition unit 42 (bracket WB gain setting unit 52).

The second gain acquisition unit 42 includes a bracket white balance gain setting unit (hereinafter, referred to as a "bracket WB gain setting unit") 52 and acquires the bracket image white balance gain. The bracket image white balance gain is transmitted from the bracket WB gain setting unit 52 to the WB processing unit 54 and is also transmitted from the bracket WB gain setting unit 52 to the system control unit 25.

The bracket image white balance gain defines the direction (a correction direction: a bracket direction) of the bracket image relative to the base image in the color space and the absolute distance (the amount of correction: the amount of bracket) of the bracket image relative to the base image in the color space.

The bracket WB gain setting unit 52 (second gain acquisition unit 42) determines a bracket direction in the color space on the basis of the color distribution information of the input image data transmitted from the color distribution acquisition unit 46 and acquires the bracket image white balance gain on the basis of the bracket direction and the base image white balance gain. The bracket direction is determined by the ratio of colors in the bracket image white balance gain. Therefore, the bracket WB gain setting unit 52 can set the ratio of colors in the bracket image white balance gain on the basis of the color distribution information of the input image data to determine the bracket direction.

In addition, the bracket WB gain setting unit 52 (second gain acquisition unit 42) determines the absolute value of the amount of bracket on the basis of the color distribution information of the input image data and acquires the bracket image white balance gain on the basis of the absolute value of the amount of bracket and the base image white balance gain. Therefore, the bracket WB gain setting unit 52 can determine the absolute value of the amount of bracket for each color on the basis of the color distribution information and calculate the bracket image white balance gain on the basis of the absolute value of the amount of bracket for each color and the base image white balance gain.

The bracket WB gain setting unit 52 may determine the bracket direction and the amount of bracket separately or at the same time. For example, in a case in which the amount of bracket for each color is predetermined according to the color distribution information of the input image data, the bracket WB gain setting unit 52 acquires a predetermined "amount of bracket for each color" corresponding to the color distribution information from the color distribution acquisition unit 46. In this way, it is possible to determine the bracket direction and the amount of bracket substantially at the same time.

As described above, the bracket WB gain setting unit 52 acquires the bracket image white balance gain for obtaining the bracket image on the basis of the color distribution information of the input image data and the base image white balance gain. Therefore, in the auto white balance mode, the second gain acquisition unit 42 (bracket WB gain setting unit 52) acquires the bracket image white balance gain on the basis of the same information as the color distribution information which is used by the first gain acquisition unit 41 (the WB setting determination unit 48 and the base WB gain setting unit 50) to acquire the base image white balance gain.

Next, an example of a method for acquiring the bracket image white balance gain will be described in detail in other embodiments which will be described below.

The WB processing unit 54 applies the base image white balance gain to the input image data (original image data) transmitted from the image data acquisition unit 44 to obtain a base image. In addition, the WB processing unit 54 applies the bracket image white balance gain to the input image data (original image data) transmitted from the image data acquisition unit 44 to obtain a bracket image. Data of the base image and the bracket image created by the WB processing unit 54 is transmitted to a processing unit in the subsequent stage.

The base image white balance gain and the bracket image white balance gain transmitted to the system control unit 25 are stored in the control memory 30 by the system control unit 25.

In the white balance image processing unit 40, the units (for example, the image data acquisition unit 44, the color distribution acquisition unit 46, and the WB processing unit 54) other than the first gain acquisition unit 41 (the WB setting determination unit 48 and the base WB gain setting unit 50) and the second gain acquisition unit 42 (bracket WB gain setting unit 52) are also controlled by the system control unit 25, which is not illustrated in FIG. 5.

Figure 6:
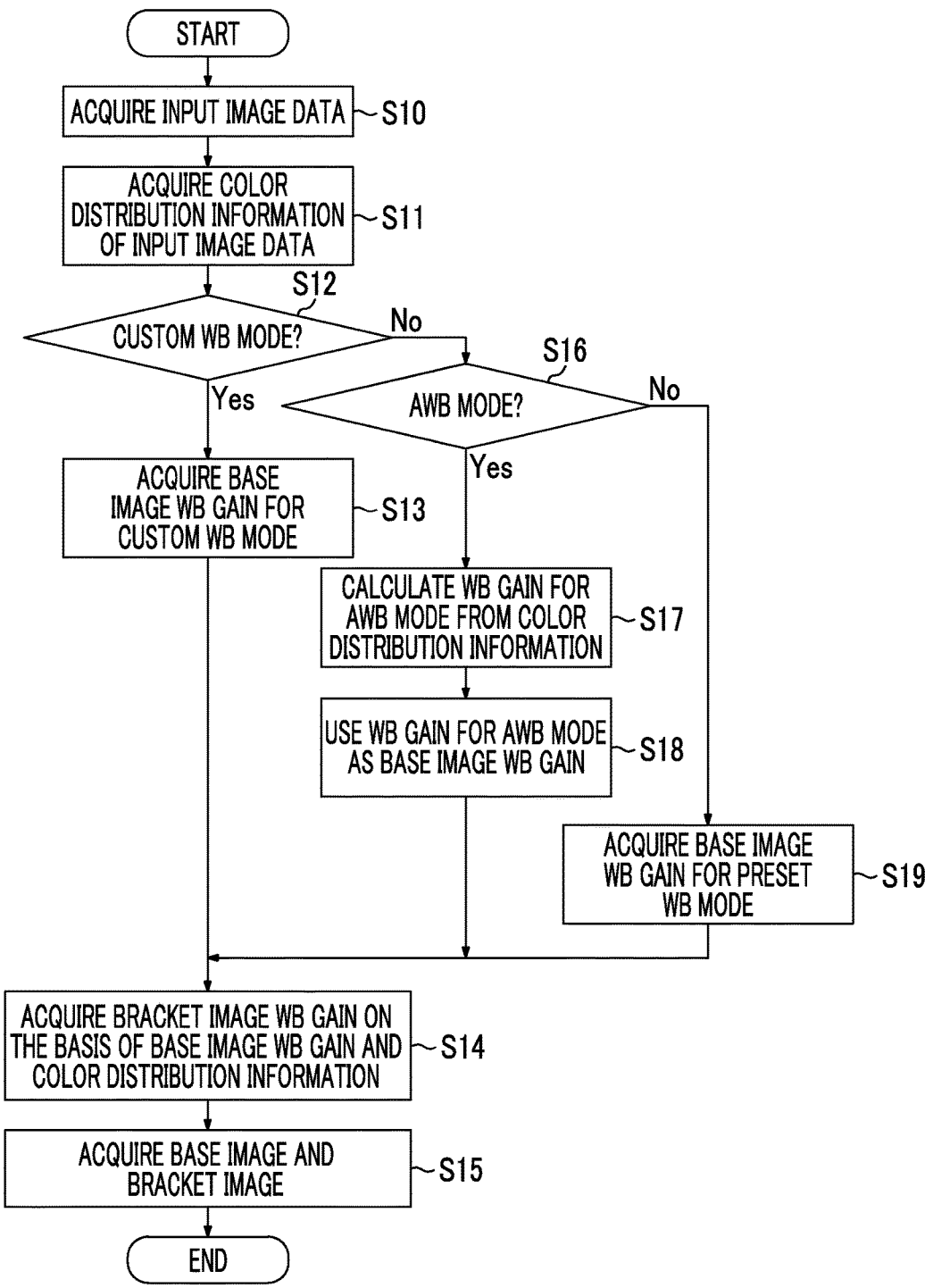
FIG. 6 is a flowchart illustrating white balance processing according to the first embodiment.

FIG. 6 is a flowchart illustrating the white balance processing according to the first embodiment.

In an image processing method according to this example, a color distribution information of input image data is acquired, a base image white balance gain is acquired according to the set mode, and a bracket image white balance gain is acquired on the basis of the color distribution information and the base image white balance gain.

That is, first, the image data acquisition unit 44 acquires input image data (S10 in FIG. 6) and the color distribution acquisition unit 46 acquires the color distribution information of the input image data (S11).

Then, the WB setting determination unit 48 determines the white balance setting mode from the "information data related to the white balance setting mode" transmitted through the control memory 30 and the system control unit 25. In the example illustrated in FIG. 6, the white balance setting mode is selected from three types of modes, that is, the custom white balance mode, the auto white balance mode, and the preset white balance mode.

In a case in which the WB setting determination unit 48 determines that the set mode is the custom white balance mode (Yes in S12), the base WB gain setting unit 50 acquires a base image white balance gain for the custom white balance mode which is transmitted through the control memory 30, the system control unit 25, and the WB setting determination unit 48 (S13).

In contrast, in a case in which the WB setting determination unit 48 determines that the set mode is not the custom white balance mode, but is the auto white balance mode (No in S12; Yes in S16), the base WB gain setting unit 50 calculates a white balance gain for the auto white balance mode on the basis of the color distribution information transmitted from the color distribution acquisition unit 46 (S17). Then, the white balance gain for the auto white balance mode is used as the base image white balance gain (S18).

In a case in which it is determined that the set mode is neither the custom white balance mode nor the auto white balance mode (No in S16), the white balance setting mode is presumed to be the preset white balance mode. In this case, the base WB gain setting unit 50 acquires the base image white balance gain for the preset white balance mode which is transmitted through the control memory 30, the system control unit 25, and the WB setting determination unit 48 (S19).

Then, the bracket WB gain setting unit 52 acquires the bracket image white balance gain on the basis of the base image white balance gain transmitted from the base WB gain setting unit 50 and the color distribution information transmitted from the color distribution acquisition unit 46 (S14).

Then, the WB processing unit 54 acquires a base image on the basis of the base image white balance gain and the input image data and acquires a bracket image on the basis of the bracket image white balance gain and the input image data (S15).

Base image data and Bracket image data which are output from the WB processing unit 54 are subjected to other types of image processing (for example, a gamma correction process and a demosaic process), if necessary, are transmitted to the storage control unit 33 through the buffer memory 24 and the compression and decompression unit 32, and are then stored in the main memory 10. A method for storing the base image and the bracket image in the main memory 10 will be described in detail in a tenth embodiment and an eleventh embodiment which will be described below.

As described above, in the digital camera 2 according to this example, in response to an imaging instruction received through the shutter button 6, the first gain acquisition unit 41 acquires the base image white balance gain, the second gain acquisition unit 42 acquires the bracket image white balance gain, and the WB processing unit 54 creates the base image and the bracket image.

As described above, according to this embodiment, since the bracket image white balance gain is set on the basis of the color distribution information of the input image data, it is possible to create a bracket image in which a direction in which the white balance of the base image is likely to deviate in a color space and the amount of shift are reflected. Therefore, the white balance image processing unit 40 according to this embodiment determines the direction in which the white balance of the base image is likely to deviate in the color space, on the basis of the color distribution information of the input image data, and acquires the bracket image white balance gain and the bracket image. For example, even in image data of a "scene in which a white balance is likely to deviate in the umber-blue direction" or a "scene in which a white balance is likely to deviate in the green-magenta direction", it is possible to obtain a bracket image having an appropriate bracket direction and an appropriate amount of bracket corresponding to a captured scene.

In this embodiment, an appropriate bracket direction and an appropriate amount of bracket are automatically determined on the basis of the color distribution information of input image data and a bracket image white balance gain is acquired. Therefore, the user does not need to perform, for example, an operation of designating a bracket direction and it is possible to simply create a base image and a bracket image, without any difficulty in setting the bracket direction or the amount of bracket. Since the bracket direction is appropriately determined, it is possible to reduce the number of images recorded and to prevent the waste of memory capacity, as compared to a case in which a bracket image is created in many bracket directions, regardless of the color distribution information of the input image data. In addition, the user can simply select an image subjected to appropriate white balance processing from a small image (a base image and a bracket image).

In the auto white balance mode, the "base image white balance gain" and the "bracket image white balance gain" are acquired on the basis of the color distribution information of the same input image data. In this case, the influence of view angle hunting (destabilization of the angle of view) caused by a difference in the imaging and acquisition time of the input image data is removed and it is possible to calculate the base image white balance gain and the bracket image white balance gain with high accuracy.

In the auto white balance mode, the color distribution information of the image data used to acquire the "base image white balance gain" may be different from the color distribution information of the image data used to acquire the "bracket image white balance gain". That is, in the auto white balance mode, the base WB gain setting unit 50 may calculate the base image white balance gain on the basis of image data different from the input image data. For example, the base WB gain setting unit 50 may acquire the base image white balance gain on the basis of color distribution information of live view image data which is acquired before (immediately before) a captured image (input image data) is acquired. The bracket WB gain setting unit 52 may acquire the bracket image white balance gain on the basis of the color distribution information of the captured image (input image data). In this case, the process of acquiring the base image white balance gain is processed rapidly and it is possible to reduce the total processing time of the white balance bracketing process.

Second Embodiment

In this embodiment, the detailed description of the same or similar structures and operations as those in the above-described embodiment will not be repeated.

In this embodiment, the configuration of the process according to the first embodiment is embodied. A light source color of input image data is estimated from color distribution information of the input image data and a bracket image white balance gain is acquired on the basis of the estimated light source color. Here, the "light source color" is a color balance when an imaging element receives (senses) light which is emitted from a light source illuminating an object and/or light which is emitted from the object during the acquisition of input image data. The color balance can be represented by, for example, an RGB ratio or a CrCb ratio (color difference ratio).

Figure 7:
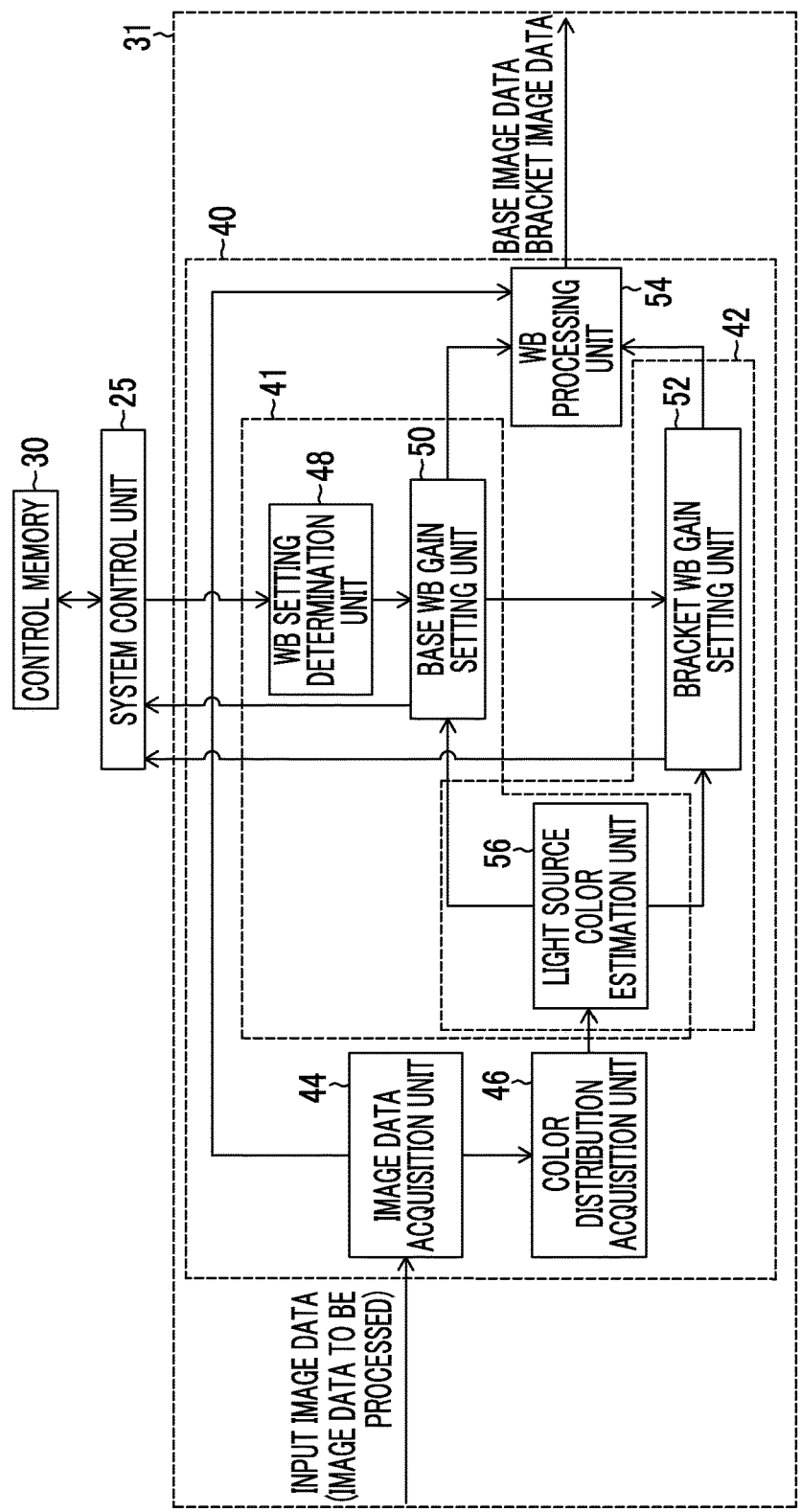
FIG. 7 is a functional block diagram illustrating an example of the structure of a white balance image processing unit according to a second embodiment.

FIG. 7 is a functional block diagram illustrating an example of the structure of a white balance image processing unit 40 according to the second embodiment.

The white balance image processing unit 40 according to this embodiment further includes a light source color estimation unit 56. The light source color estimation unit 56 estimates the light source color of the input image data on the basis of the color distribution information transmitted from a color distribution acquisition unit 46. A method for estimating the light source color is not particularly limited. For example, the light source color may be estimated on the basis of the average of the color distributions of the input image data. Light source color data indicating the estimated light source color is transmitted from the light source color estimation unit 56 to a base WB gain setting unit 50 and a bracket WB gain setting unit 52.

In a case in which the white balance setting mode is the auto white balance mode, the base WB gain setting unit 50 acquires a base image white balance gain on the basis of the light source color data transmitted from the light source color estimation unit 56. A "method for acquiring a white balance gain on the basis of a light source color estimated from color distribution information" is not particularly limited. For example, a white balance gain for reducing the influence of the estimated light source color on the basis of a known method is referred to as the base image white balance gain.

A second gain acquisition unit 42 (the light source color estimation unit 56 and the bracket WB gain setting unit 52) estimates a light source color from the color distribution information of the input image data and acquires a bracket image white balance gain according to the light source color estimated from the color distribution information. That is, the bracket WB gain setting unit 52 acquires the bracket image white balance gain on the basis of the light source color data transmitted from the light source color estimation unit 56 and the base image white balance gain transmitted from the base WB gain setting unit 50. An example of a "method for acquiring the bracket image white balance gain on the basis of the light source color estimated from the color distribution information" will be described in detail in third to seventh embodiments which will be described below.

As such, the light source color estimation unit 56 functions as a portion of the first gain acquisition unit 41 which acquires the base image white balance gain and also functions as a portion of the second gain acquisition unit 42 that acquires the bracket image white balance gain.

The other functional structures of the white balance image processing unit 40 illustrated in FIG. 7 are the same as those in the first embodiment.

FIG. 8 is a flowchart illustrating white balance processing according to the second embodiment.

In this embodiment, input image data is acquired by the same process as that in the first embodiment (see S10 and S11 in FIG. 6) (S20 in FIG. 8) and color distribution information of the input image data is acquired (S21). However, in this embodiment, the light source color estimation unit 56 estimates the light source color of the input image data from the color distribution information of the input image data (S22).

Then, in a case in which the white balance setting mode is the custom white balance mode (Yes in S23) and in a case in which the white balance setting mode is the preset white balance mode (No in S27), a base image white balance gain for the custom white balance mode is acquired (S24) and a base image white balance gain for the preset white balance mode is acquired (S30) by the same process as that in the first embodiment (see S12 to S13 and S19 in FIG. 6).

In contrast, in a case in which the white balance setting mode is the auto white balance mode (Yes in S27), the base WB gain setting unit 50 calculates a white balance gain for the auto white balance mode on the basis of the light source color data transmitted from the light source color estimation unit 56 (S28). Then, the white balance gain for the auto white balance mode is used as the base image white balance gain (S29).

When the base image white balance gain is acquired in each of the above-mentioned steps (S24, S29, and S30), the bracket WB gain setting unit 52 acquires a bracket image white balance gain on the basis of the base image white balance gain transmitted from the base WB gain setting unit 50 and the light source color data transmitted from the light source color estimation unit 56 (S25).

Then, the WB processing unit 54 acquires a base image on the basis of the base image white balance gain and the input image data and acquires a bracket image on the basis of the bracket image white balance gain and the input image data (S26).

As described above, according to this embodiment, the bracket image white balance gain is acquired on the basis of the light source color estimated from the color distribution information of the input image data. Therefore, it is possible to simply acquire the base image white balance gain and the bracket image white balance gain with high accuracy and to obtain a base image and a bracket image on which the influence of the light source color is reduced.

In particular, the light source color data in the auto white balance mode is information which is used in the process of calculating the base image white balance gain and the bracket image white balance gain and is an element for determining a bracket direction and the amount of bracket. Therefore, the bracket WB gain setting unit 52 can determine a "direction in which over-correction or under-correction is likely to occur in white balance processing due to a light source color in the color space" in the base image in the auto white balance mode and create a bracket image in which the "direction in which over-correction or under-correction is likely to occur in white balance processing due to a light source color in the color space" is reflected.

Third Embodiment

In this embodiment, the detailed description of the same or similar structures and operations as those in the above-described embodiments will not be repeated.

In this embodiment, the configuration of the process according to the second embodiment is embodied. A distance between a light source color (light source color characteristics) and a black-body radiation locus (black-body radiation characteristics) is calculated and a bracket image white balance gain is calculated on the basis of the distance.

Figure 9A:
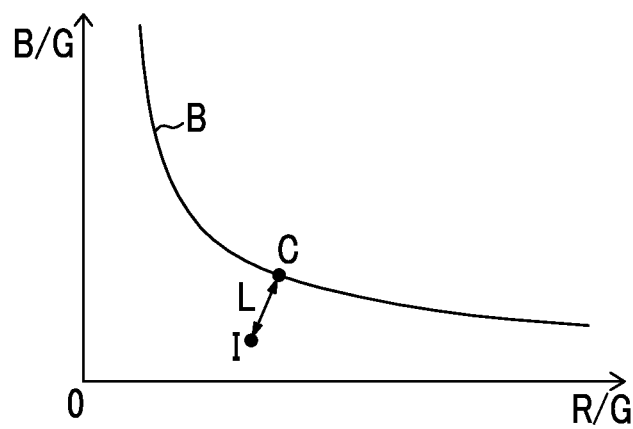
FIG. 9A illustrates a two-dimensional color coordinate system of an RGB color system having a black-body radiation locus represented therein and illustrates the relationship between a light source color and the black-body radiation locus.
Figure 9B:
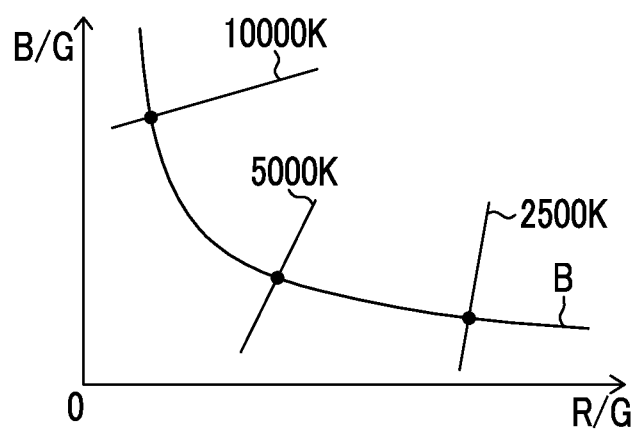
FIG. 9B illustrates a two-dimensional color coordinate system of the RGB color system having the black-body radiation locus represented therein and illustrates the relationship between the black-body radiation locus and a correlated color temperature.
Figure 9C:
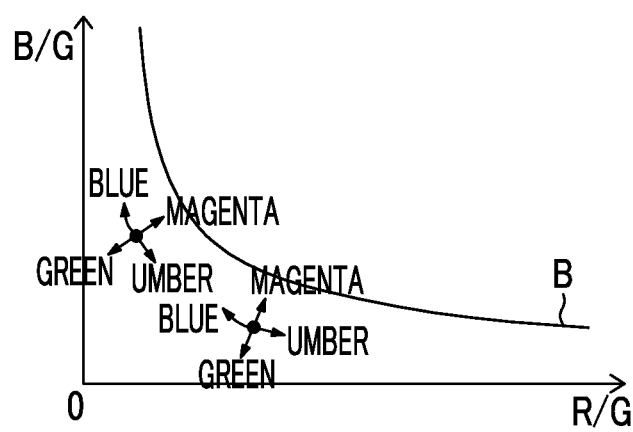
FIG. 9C illustrates a two-dimensional color coordinate system of the RGB color system having the black-body radiation locus represented therein and illustrates the relationship between the black-body radiation locus and the directions of blue, magenta, umber, and green.

FIGS. 9A to 9C illustrate a two-dimensional color space coordinate system of an RGB color system having a black-body radiation locus (black-body radiation curve) represented therein, in which the origin is "0", the vertical axis indicates "blue/green (B/G)", and the horizontal axis indicates "red/green (R/G)". FIG. 9A illustrates the relationship between the light source color and the black-body radiation locus. FIG. 9B illustrates the relationship between the black-body radiation locus and a correlated color temperature. FIG. 9C illustrates the relationship between the black-body radiation locus and the directions of blue, magenta, umber, and green. In FIGS. 9A to 9C, the black-body radiation locus is represented by a letter "B", the light source color is represented by a letter "I", and the distance between the black-body radiation locus B and the light source color I is represented by a letter "L".

The black-body radiation locus B indicates the radiation locus of a black body (full radiator). The distance L between the black-body radiation locus B and the light source color I in the color space corresponds to the "length (distance) between the light source color I and the black-body radiation locus B" on a line which is normal to the black-body radiation locus B and passes through the light source color I.

A color temperature at a position (letter "C" in FIG. 9A) that is closest to the light source color on the black-body radiation locus is referred to as the correlated color temperature of the light source color. The correlated color temperature indicates the color (temperature) of black-body radiation which seems to be a color closest to the light source color. The light source colors which are not present on the black-body radiation locus and are located on the same line normal to the black-body radiation locus have the same correlated color temperature. For example, a light source color on a normal line of 10000 K (Kelvin), a light source color on a normal line of 5000 K, and a light source color on a normal line of 2500 K in FIG. 9B have the same correlated color temperature.

The "umber-blue direction" and the "green-magenta direction" in the chromaticity diagram of FIG. 4 illustrating the L*a*b* color system are the directions illustrated in FIG. 9C in a color space coordinate system which is represented by "B/G" and "R/G". As can be seen from FIG. 9C, the black-body radiation locus B is a curve along the umber-blue direction and the green-magenta direction perpendicular to the umber-blue direction is aligned with the direction of the line normal to the black-body radiation locus B.

A color space for representing the distance between the black-body radiation locus and the light source color is not particularly limited. For example, the distance between the black-body radiation locus and the light source color may be represented on the basis of an xyY color space, an XYZ color space, an L*u*v* color space, an L*a*b* color space, or a YCrCb color space.

FIG. 10 is a functional block diagram illustrating an example of the structure of a white balance image processing unit 40 according to the third embodiment.

In this embodiment, the white balance image processing unit 40 further includes a light source color characteristic acquisition unit 58 and a black body characteristic storage unit 60, in addition to the light source color estimation unit 56, as compared to the above-described embodiments. The black body characteristic storage unit 60 stores black-body radiation characteristics related to the color temperature. Specifically, the black body characteristic storage unit 60 stores the black-body radiation locus illustrated in FIGS. 9A to 9C. The light source color characteristic acquisition unit 58 appropriately read the black-body radiation characteristics (black-body radiation locus). The light source color characteristic acquisition unit 58 acquires the distance L (FIG. 9A) between the black-body radiation locus B and the light source color I on the basis of light source color data transmitted from the light source color estimation unit 56 and black-body radiation characteristic data read from the black body characteristic storage unit 60.

In this embodiment, a second gain acquisition unit 42 acquires a bracket image white balance gain according to the distance L between the "black-body radiation characteristics (black-body radiation locus) B" and the "light source color I estimated from the color distribution information of input image data" in the color space. That is, a bracket WB gain setting unit 52 acquires the bracket image white balance gain on the basis of a "base image white balance gain" transmitted from a base WB gain setting unit 50 and the "distance L between the black-body radiation locus B and the light source color I" transmitted from the light source color characteristic acquisition unit 58. An example of a method for acquiring the bracket image white balance gain will be described in a fourth embodiment which will be described below.

The other functions of the white balance image processing unit 40 illustrated in FIG. 10 are the same as those in the second embodiment.

As described above, the light source color characteristic acquisition unit 58 and the black body characteristic storage unit 60 which acquire the "distance L between the black-body radiation locus B and the light source color I" used to acquire the bracket image white balance gain from the color distribution information and the light source color function as a portion of the second gain acquisition unit 42.

Figure 11:
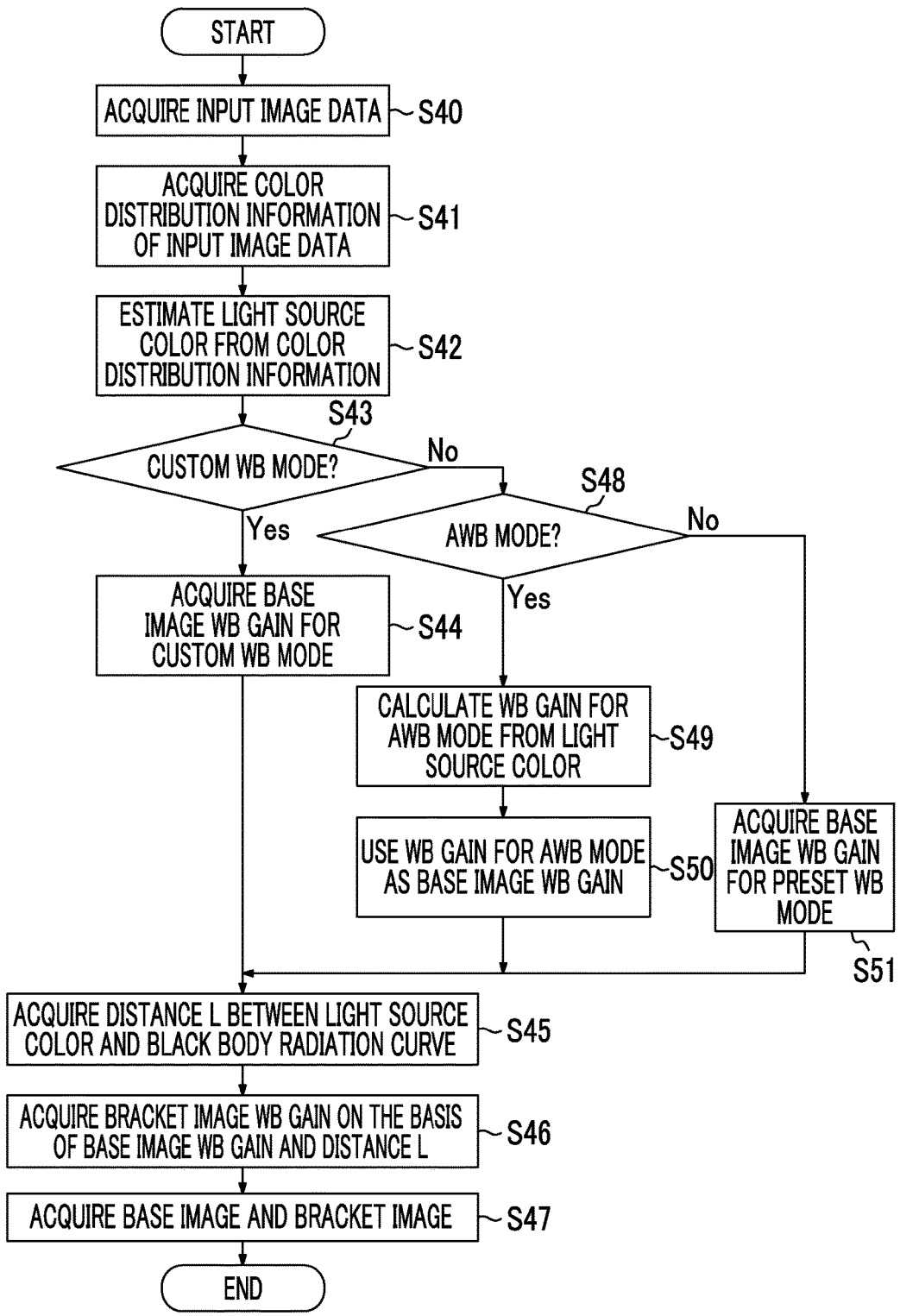
FIG. 11 is a flowchart illustrating white balance processing according to the third embodiment.

FIG. 11 is a flowchart illustrating white balance processing according to the third embodiment.

In this embodiment, input image data is acquired by the same process as that in the second embodiment (see S20 to S24 and S27 to S30 in FIG. 8) (S40 in FIG. 11) and color distribution information of the input image data is acquired (S41). A light source color is acquired from the color distribution information (S42) and a base image white balance gain is acquired according to the set mode (S43, S44, and S48 to S51).

Then, the light source color characteristic acquisition unit 58 acquires the "distance L between the black-body radiation locus B and the light source color I" from the light source color data transmitted from the light source color estimation unit 56 and the black-body radiation characteristic data read from the black body characteristic storage unit 60 (S45). The bracket WB gain setting unit 52 acquires a bracket image white balance gain on the basis of the "base image white balance gain" and the "distance L between the black-body radiation locus B and the light source color I" (S46).

Then, the WB processing unit 54 acquires a base image on the basis of the base image white balance gain and the input image data and acquires a bracket image on the basis of the bracket image white balance gain and the input image data (S47).

As described above, in this embodiment, the bracket image white balance gain is determined on the basis of the distance between the black-body radiation locus and the light source color estimated from the color distribution information of the input image data.

The black-body radiation locus is a curve that extends in the umber-blue direction (FIG. 9C). For example, in a case in which the light source color is present on the black-body radiation locus and the distance between the light source color and the black-body radiation locus is 0, it is preferable that the bracket WB gain setting unit 52 sets a correction direction (bracket direction) using the bracket image white balance gain to the "umber-blue direction". In contrast, in a case in which the distance between the light source color and the black-body radiation locus is large, it is preferable that the bracket WB gain setting unit 52 sets the correction direction (bracket direction) using the bracket image white balance gain to the "green-magenta direction". The setting of the correction direction (bracket direction) using the bracket image white balance gain will be described in detail in the fourth embodiment which will be described below.

As such, the bracket direction with respect to the base image is determined on the basis of "the distance between the light source color and the black-body radiation locus" and the bracket image white balance gain is acquired. Therefore, it is possible to create a bracket image in which the "direction in which over-correction or under-correction is likely to occur in the color space during white balance processing" is the bracket direction.

The bracket image in which the "direction in which over-correction or under-correction is likely to occur in the color space during white balance processing" is the bracket direction is created regardless of the white balance setting mode. For example, in general, the preset white balance gain of a bulb color is set in the range of about 2800 K to 3400 K on the black-body radiation locus. However, the light source color of a "light emitting diode (LED)" or a "fluorescent light" which is actually used as a light source of the bulb color is located at a position that is slightly far away from the black-body radiation locus. During white balance bracketing for image data which is captured under the light source color at the position that is far away from the black-body radiation locus, in many cases, even if the bracket direction is used as the umber-blue direction, an image subjected to appropriate white balance processing is not present in the base image and the bracket image. However, according to this embodiment, even in the preset white balance mode, the bracket direction is determined on the basis of the "distance between the light source color and the black-body radiation locus" and it is possible to create a base image in which the "direction in which over-correction or under-correction is likely to occur in the color space during white balance processing" is the bracket direction.

Fourth Embodiment

In this embodiment, the detailed description of the same or similar structures and operations as those in the above-described embodiments will not be repeated.

In this embodiment, the configuration of the process according to the third embodiment is embodied.

The functional structure of a white balance image processing unit 40 according to this embodiment is the same as that in the third embodiment (FIG. 10). However, a bracket WB gain setting unit 52 (second gain acquisition unit 42) sets a bracket direction such that it is closer to a umber-blue direction in a color space as the distance between a "black-body radiation locus (black-body radiation characteristics)" and a "light source color estimated from color distribution information of input image data" becomes smaller and acquires a bracket image white balance gain. The bracket WB gain setting unit 52 sets the bracket direction such that it is closer to a green-magenta direction as the distance between the "black-body radiation locus (black-body radiation characteristics)" and the "light source color estimated from color distribution information of input image data" becomes larger and acquires a bracket image white balance gain.

Figure 12:
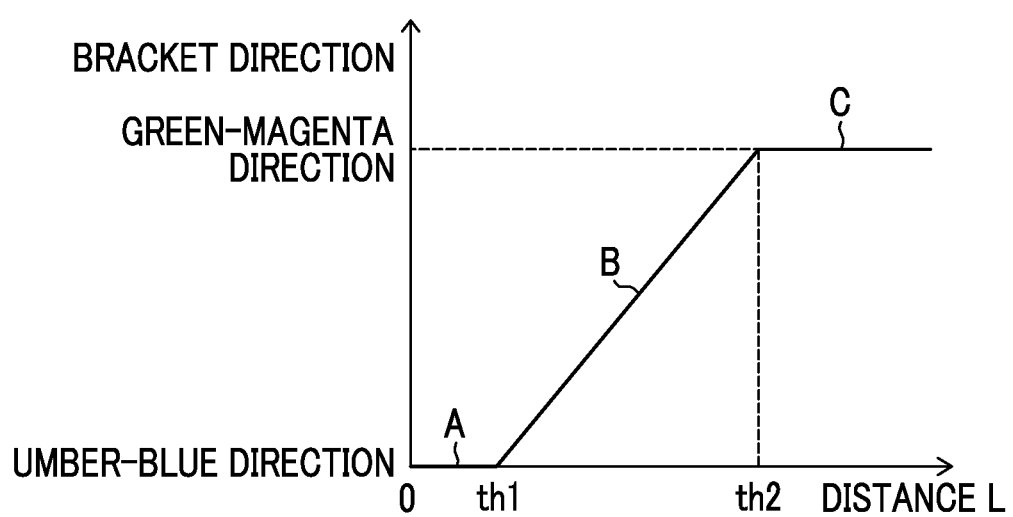
FIG. 12 is a diagram illustrating an example of the relationship between a "distance L between a light source color and a black-body radiation locus" and a "bracket direction" in a fourth embodiment.

FIG. 12 is a diagram illustrating an example of the relationship between a "distance L between the light source color and the black-body radiation locus" and the "bracket direction" in the fourth embodiment. In FIG. 12, the horizontal axis indicates the "distance L between the light source color and the black-body radiation locus" and the origin on the horizontal axis indicates that "distance L is 0". In FIG. 12, the vertical axis indicates the "bracket direction" and the origin on the vertical axis indicates that the "bracket direction is the same as the umber-blue direction". As the distance from the origin increases, the bracket direction is closer to the green-magenta direction.

In the example illustrated in FIG. 12, in a case in which the distance L between the black-body radiation locus and the light source color estimated from the color distribution information of the input image data is less than a first threshold value (reference numeral "th1" in FIG. 12), the bracket WB gain setting unit 52 calculates a bracket image white balance gain at which the bracket direction is the umber-blue direction (letter "A" in FIG. 12). In a case in which the distance L between the light source and the black-body radiation locus is greater than a second threshold value (th2 in FIG. 12) greater than the first threshold value (th1), the bracket WB gain setting unit 52 calculates a bracket image white balance gain at which the bracket direction is the green-magenta direction (letter "C" in FIG. 12). In a case in which the distance L between the light source color and the black-body radiation locus is equal to or greater than the first threshold value (th1) and is equal to or less than the second threshold value (th2), the bracket WB gain setting unit 52 calculates a bracket image white balance gain at which the bracket direction is an intermediate direction between the umber-blue direction and the green-magenta direction (letter "B" in FIG. 12).

In the example illustrated in FIG. 12, in a case in which the distance L between the light source color and the black-body radiation locus is equal to or greater than the first threshold value (th1) and is equal to or less than the second threshold value (th2), the bracket direction changes continuously (proportionally) depending on the distance between the umber-blue direction and the green-magenta direction. However, the invention is not limited thereto. For example, the bracket direction may be determined from the "distance L between the light source color and the black-body radiation locus" on the basis of an arbitrary membership function. In a case in which the bracket direction is based on the membership function, it is preferable that the membership function used is determined according to the correlated color temperature of the light source color estimated by the light source color estimation unit 56. In addition, it is preferable that the "first threshold value (th1)" and the "second threshold value (th2)" for determining the bracket direction are determined according to the correlated color temperature of the light source color estimated by the light source color estimation unit 56.

The bracket WB gain setting unit 52 may set the bracket direction so as to be aligned with the umber-blue direction in a case in which the distance L between the light source color and the black-body radiation locus is equal to or less than a third threshold value and may set the bracket direction so as to be aligned with the green-magenta direction in a case in which the distance L is greater than the third threshold value, instead of the above-mentioned method based on the "first threshold value (th1)" and the "second threshold value (th2)". However, in this case, a bracket image of an appropriate is not necessarily obtained due to, for example, shot hunting. It is preferable to use a method that adopts the "intermediate direction between the umber-blue direction and the green-magenta direction" as the bracket direction using, for example, a membership function in order to obtain a bracket image of an appropriate color.

Figure 13:
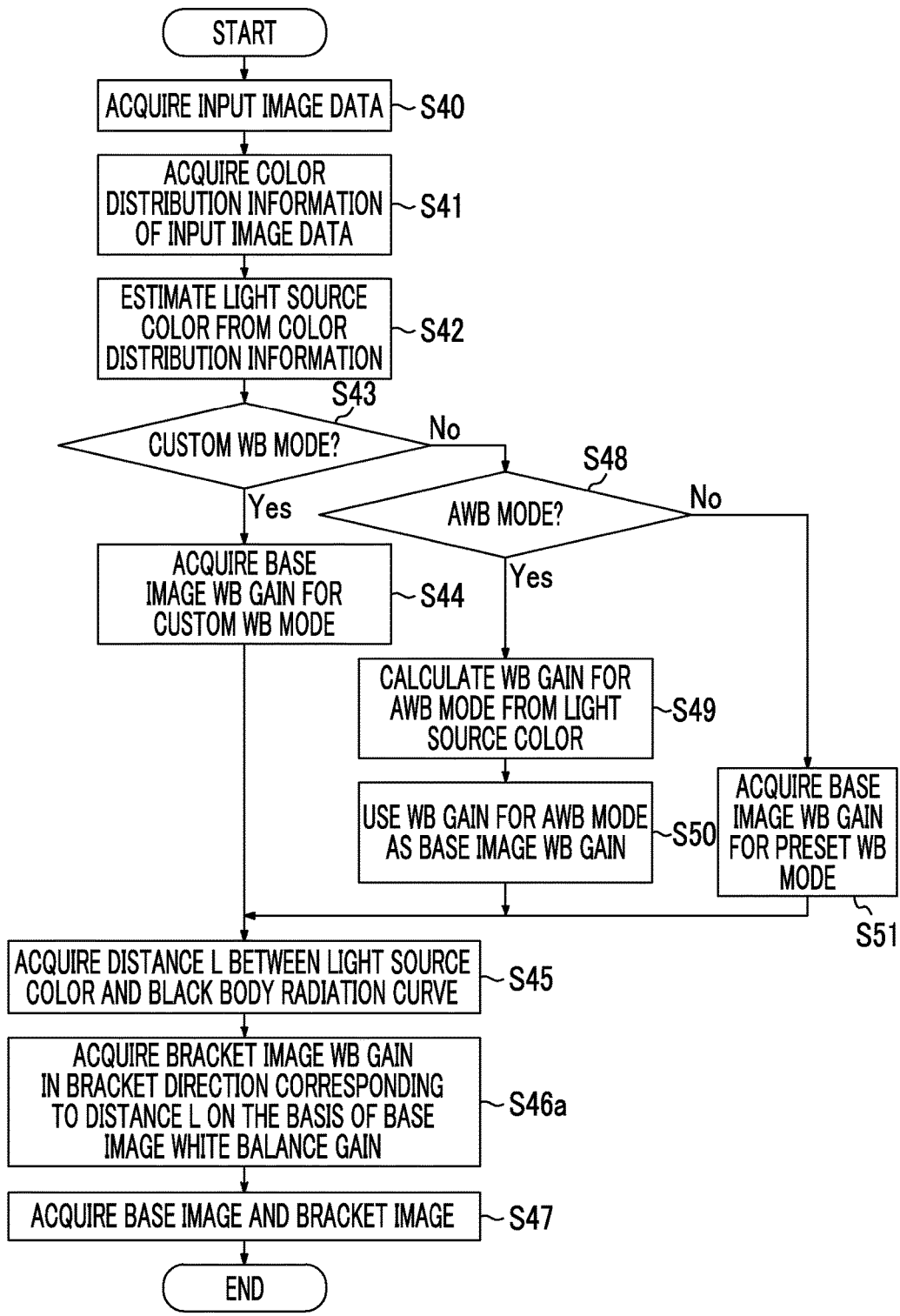
FIG. 13 is a flowchart illustrating white balance processing according to the fourth embodiment.

FIG. 13 is a flowchart illustrating white balance processing according to the fourth embodiment.

In this embodiment, a "base image white balance gain" and a "distance L between a black-body radiation locus B and a light source color I" are acquired by the same process as that in the third embodiment (S40 to S45 and S48 to S51 in FIG. 11) (S40 to S45 and S48 to S51 in FIG. 13).

Then, the bracket WB gain setting unit 52 calculates a bracket image white balance gain in the bracket direction (FIG. 12) corresponding to the "distance L between the black-body radiation locus B and the light source color I", on the basis of the base image white balance gain (S46*a*).

Then, the WB processing unit 54 acquires a base image on the basis of the base image white balance gain and the input image data and acquires a bracket image on the basis of the bracket image white balance gain and the input image data (S47).

As described above, according to this embodiment, a bracket image in an appropriate bracket direction is obtained according to the "distance L between the black-body radiation locus B and the light source color I".

Fifth Embodiment

In this embodiment, the detailed description of the same or similar structures and operations as those in the above-described embodiment will not be repeated.

In this embodiment, a second gain acquisition unit 42 acquires a bracket image white balance gain on the basis of the "correlated color temperature of a light source color, which is estimated from color distribution information of input image data, based on black-body radiation characteristics".

In this embodiment, the functional structure of a white balance image processing unit 40 is the same as that in the third embodiment (FIG. 10). However, a bracket WB gain setting unit 52 (second gain acquisition unit 42) determines the absolute value of the amount of bracket on the basis of the correlated color temperature of the light source color estimated from the color distribution information of the input image data and acquires a bracket image white balance gain on the basis of the absolute value of the amount of bracket.

As illustrated in FIG. 9C, in the same umber-blue direction (or the green-magenta direction), a specific direction indicated by the umber-blue direction (or the green-magenta direction) in a color space varies, depending on the color temperature of the light source color. Therefore, it is preferable that the amount of bracket (absolute value) varies depending on the correlated color temperature of the light source color of the input image data.

For example, in a scene in which the correlated color temperature of the light source color is 10000 K and a scene in which the correlated color temperature is 2500 K, even if the bracket directions are the same and are aligned with the umber-blue direction, specific directions are different from each other in the color space and the rates of changes of "R/G" and "B/G" are different from each other. Therefore, the bracket WB gain setting unit 52 determines the absolute value of the amount of bracket, on the basis of the correlated color temperature of the light source color estimated from the color distribution information, and changes the bracket image white balance gain, depending on the correlated color temperature. For example, in a case in which a white balance gain is applied to only an R pixel value and a B pixel value in image data including R, G, and B pixel values and white balance processing is performed, the bracket WB gain setting unit 52 adjusts the bracket image white balance gain to be applied to the R pixel value or the B pixel value, according to the correlated color temperature of the light source color.

Preferably, the bracket WB gain setting unit 52 determines the bracket image white balance gain such that the absolute value of the amount of bracket gradually increases as the correlated color temperature of the light source color estimated from the color distribution information increases.

Figure 14:
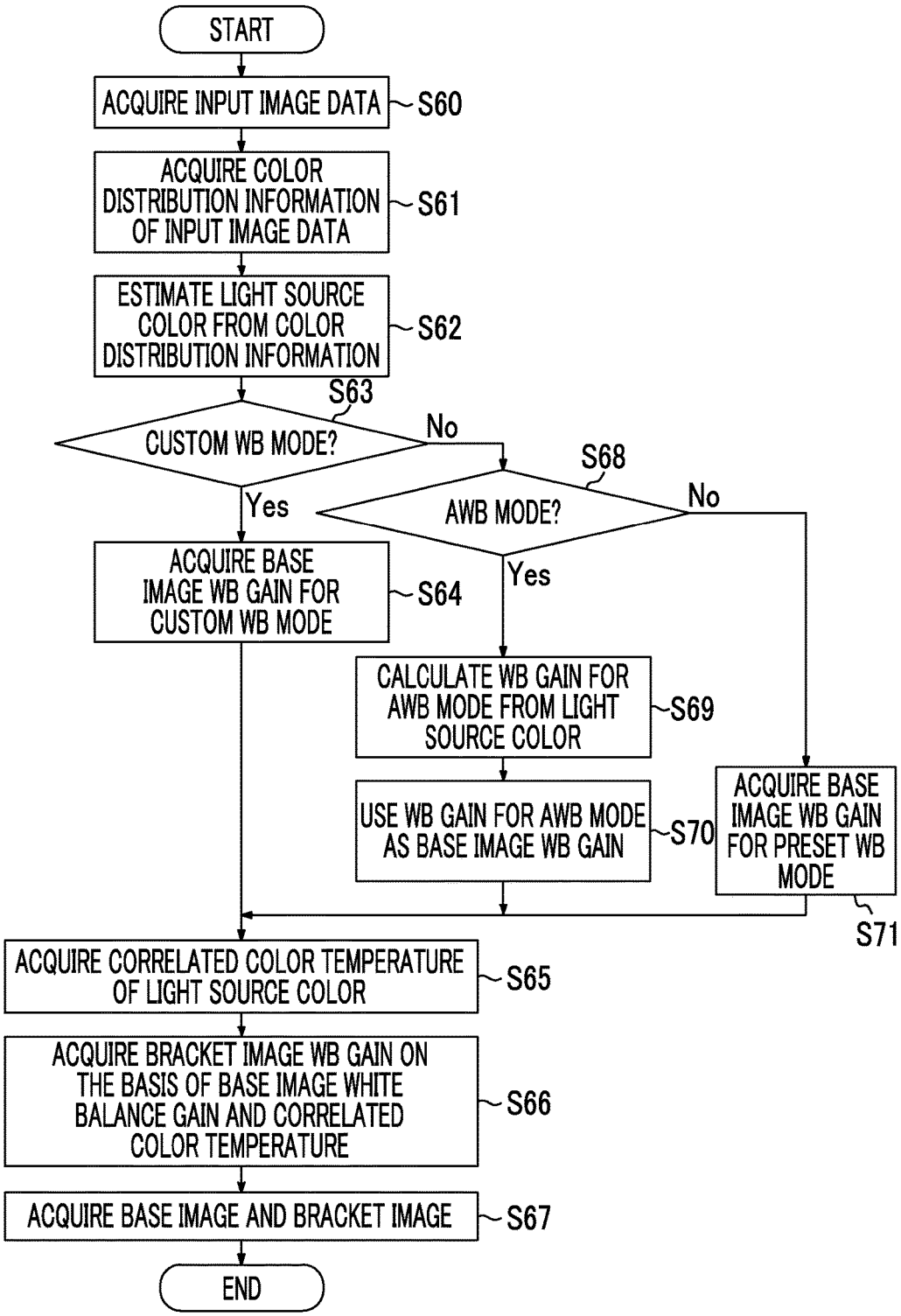
FIG. 14 is a flowchart illustrating white balance processing according to a fifth embodiment.

FIG. 14 is a flowchart illustrating white balance processing according to the fifth embodiment.

In this embodiment, a base image white balance gain is acquired by the same process as that in the third embodiment (S40 to S44 and S48 to S51 in FIG. 11) (S60 to S64 and S68 to S71 in FIG. 14).

Then, a light source color characteristic acquisition unit 58 acquires the correlated color temperature of the light source color, on the basis of the light source color data of the light source color estimated by a light source color estimation unit 56 and black-body radiation characteristic data read from a black body characteristic storage unit 60 (S65).

Then, the bracket WB gain setting unit 52 acquires a bracket image white balance gain, on the basis of the "base image white balance gain" acquired by a base WB gain setting unit 50 and the "correlated color temperature of the light source color" acquired by the light source color characteristic acquisition unit 58 (S66).

Then, the WB processing unit 54 acquires a base image on the basis of the base image white balance gain and the input image data and acquires a bracket image on the basis of the bracket image white balance gain and the input image data (S67).

As described above, according to this embodiment, the bracket image white balance gain is acquired on the basis of the correlated color temperature of the light source color of the input image data. Therefore, it is possible to accurately create an appropriate bracket image.

Figure 15:
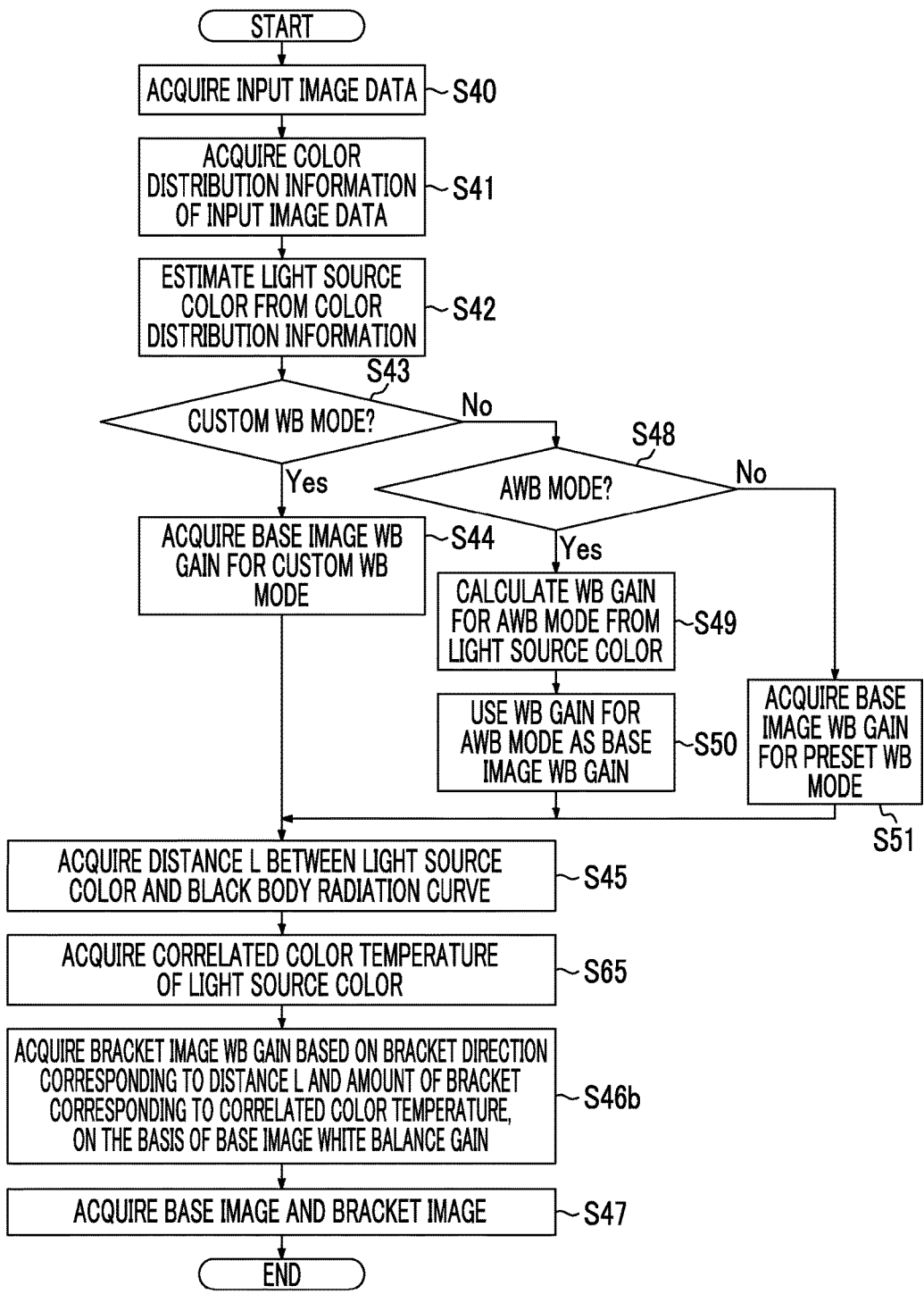
FIG. 15 is a flowchart illustrating an example of a process which is a combination of the white balance processing according to the fourth embodiment and the white balance processing according to the fifth embodiment.

This embodiment may be combined with the third embodiment or the fourth embodiment. FIG. 15 is a flowchart illustrating an example of a process which is a combination of the white balance processing according to the fourth embodiment and the white balance processing according to the fifth embodiment.

In this example, a base image white balance gain is acquired by the same process as that in the fourth embodiment (S40 to S44 and S48 to S51 in FIG. 13) and the fifth embodiment (S60 to S64 and S68 to S71 in FIG. 14) (S40 to S44 and S48 to S51 in FIG. 15). Then, the light source color characteristic acquisition unit 58 acquires the "distance L between the black-body radiation locus and the light source color" and the "correlated color temperature of the light source color" (S45 and S65 in FIG. 15). Then, the bracket WB gain setting unit 52 acquires a bracket image white balance gain, which is based on a "bracket direction corresponding to the distance L between the black-body radiation locus and the light source color" and the "amount of bracket corresponding to the correlated color temperature of the light source color", on the basis of the base image white balance gain (S46*b* in FIG. 15). Then, the WB processing unit 54 acquires a base image on the basis of the base image white balance gain and the input image data and acquires a bracket image on the basis of the bracket image white balance gain and the input image data (S47 in FIG. 15).

As such, since the white balance processing according to each of the third embodiment and the fourth embodiment is combined with the white balance processing according to the fifth embodiment, it is possible to create a bracket image having an appropriate bracket direction and an appropriate amount of bracket.

Sixth Embodiment

In this embodiment, the detailed description of the same or similar structures and operations as those in the second embodiment will not be repeated.

In this embodiment, a base image white balance gain is applied to a light source color to calculate chroma information of a base image and a bracket image white balance gain is calculated on the basis of the chroma information of the base image.

Figure 16:
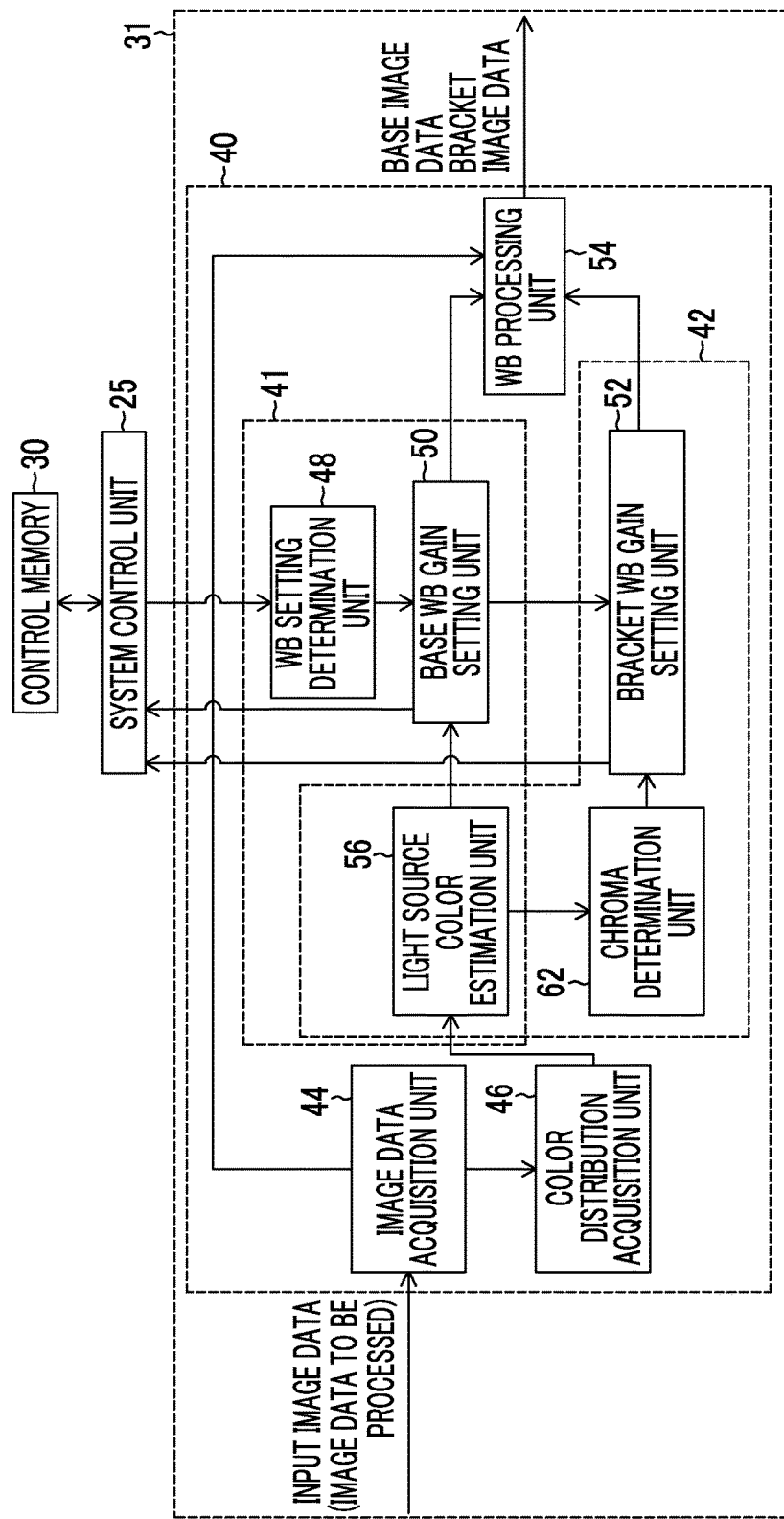
FIG. 16 is a functional block diagram illustrating an example of the structure of a white balance image processing unit according to a sixth embodiment.

FIG. 16 is a functional block diagram illustrating an example of the structure of a white balance image processing unit 40 according to a sixth embodiment.

In this embodiment, a second gain acquisition unit 42 of a white balance image processing unit 40 further includes a chroma specifying unit 62 that acquires the chroma information of the base image.

The chroma specifying unit 62 (second gain acquisition unit 42) acquires the chroma information of the base image, on the basis of "light source color data of a light source color estimated from color distribution information" which is transmitted from a light source color estimation unit 56 and a "base image white balance gain" which is transmitted from a base WB gain setting unit 50. A bracket WB gain setting unit 52 acquires a bracket image white balance gain on the basis of the "chroma information of the base image" which is transmitted from the chroma specifying unit 62.

Specifically, the chroma specifying unit 62 acquires chroma information on the basis of the "chroma of the base image relative" to an achromatic color. The bracket WB gain setting unit 52 determines the absolute value of the amount of bracket on the basis of the chroma information and acquires a bracket image white balance gain on the basis of the absolute value of the amount of bracket and the base image white balance gain.

For example, the light source color of input image data is represented by ($R_L/G_L$, $B_L/G_L$) using R, G, and B values ($R_L$, $G_L$, $B_L$) and white balance gains which are applied to an R pixel value, a G pixel value, and a B pixel value are represented by $BaseWB_R$, $BaseWB_G$, and $BaseWB_B$, respectively. In this case, when the color balance of the base image is represented by ($R_B/G_B$, $B_B/G_B$) using R, G, and B values ($R_B$, $G_B$, $B_B$), the color balance ($R_B/G_B$, $B_B/G_B$) of the base image is represented by the following expression.

$$\left(\frac{R_B}{G_B}, \frac{B_B}{G_B}\right) = \left(\frac{R_L \times BaseWB_R}{G_L \times BaseWB_G}, \frac{B_L \times BaseWB_B}{G_L \times BaseWB_G}\right) \quad \text{[Expression 1]}$$

In a case in which the color balance ($R_B/G_B$, $B_B/G_B$) of the base image is (1, 1), the R, G, and B values of the base image are equal to each other and the base image is an achromatic image. Appropriate white balance processing is applied to the base image. That is, the color balance ($R_B/G_B$, $B_B/G_B$) of the base image obtained by white balance processing using an appropriate base image white balance gain is (1, 1) and the base image becomes an achromatic image. Therefore, in general, the color balance ($R_B/G_B$, $B_B/G_B$) of the base image obtained in the auto white balance mode is (1, 1) and the base image becomes an achromatic image.

However, in a case in which the base image white balance gain which is stored in advance is not appropriately set in the preset white balance mode or the custom white balance mode, the color balance ($R_B/G_B$, $B_B/G_B$) of the base image is not (1, 1). Therefore, the distance between the color balance ($R_B/G_B$, $B_B/G_B$) of the base image which is calculated on the basis of the above-mentioned expression and (1, 1) indicates chroma relative to an achromatic color.

In this embodiment, chroma information indicating the "chroma of the base image relative to an achromatic color" is specified by the chroma specifying unit 62 and is then transmitted to the bracket WB gain setting unit 52. The bracket WB gain setting unit 52 calculates the absolute value of the amount of bracket on the basis of the chroma information. An example of a method for determining the absolute value of the amount of bracket will be described in a seventh embodiment which will be described below.

Figure 17:
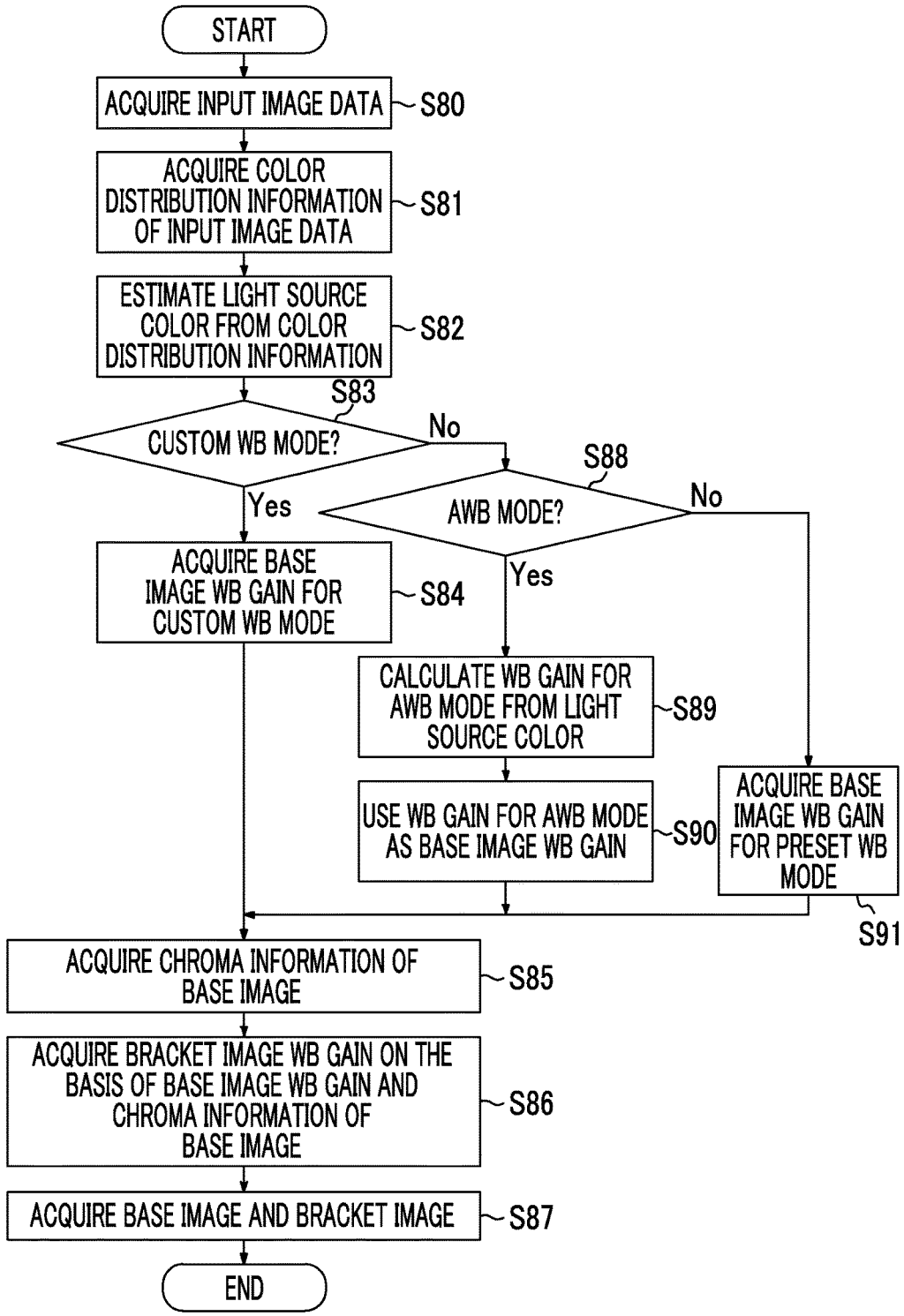
FIG. 17 is a flowchart illustrating white balance processing according to the sixth embodiment.

FIG. 17 is a flowchart illustrating white balance processing according to the sixth embodiment.

In this embodiment, a base image white balance gain is acquired by the same process as that in the second embodiment (S20 to S24 and S27 to S30 in FIG. 8) (S80 to S84 and S88 to S91 in FIG. 17).

Then, the chroma specifying unit 62 acquires the chroma information of the base image (S85) and the bracket WB gain setting unit 52 acquires a bracket image white balance gain from the chroma information of the base image and the base image white balance gain (S86).

Then, the WB processing unit 54 acquires the base image on the basis of the base image white balance gain and the input image data and acquires a bracket image on the basis of the bracket image white balance gain and the input image data (S87).

As described above, according to this embodiment, the bracket image white balance gain is adjusted on the basis of the "chroma information of the base image". Therefore, it is possible to obtain a bracket image having the amount of bracket that is visually substantially uniform, regardless of the white balance setting mode and the light source color of the input image data.

Seventh Embodiment

In this embodiment, the detailed description of the same or similar structures and operations as those in the sixth embodiment will not be repeated.

In this embodiment, the configuration of the process according to the sixth embodiment is embodied and a bracket image white balance gain in which human visual characteristics are reflected is acquired.

The human visual impression varies depending on the chroma of an image, particularly, the chroma of a white object. In addition, according to MacAdam's law, the human eye is sensitive to a difference in chroma (white balance) in a case in which the chroma of an image is close to perfect gray (achromatic color) and is insensitive to a difference in chroma (white balance) in a case in which the chroma of an image is far away from perfect gray.

Therefore, in a case in which the chroma of the base image is low and the human eye is sensitive to a change in chroma, it is preferable to set the amount of bracket to a relatively small value. In a case in which the chroma of the base image is high and the human eye is insensitive to a change in chroma, it is preferable to set the amount of bracket to a relatively large value.

In this embodiment, the visual characteristics are considered and a bracket image is created such that, as the chroma of the base image becomes higher and is farther away from perfect gray, the amount of deviation of the white balance from the base image increase. Specifically, the bracket WB gain setting unit 52 (second gain acquisition unit 42) increases the absolute value of the amount of bracket as the difference in chroma between an achromatic color and the base image increases, on the basis of the chroma information of the base image, and acquires a bracket image white balance gain. The bracket image white balance gain is adjusted according to the chroma of the base image. Therefore, it is possible to remove a visual difference in the white balance between the base image and the bracket image, regardless of the chroma of the base image.

Here, the "achromatic color" may be an absolutely achromatic color or a color (hereinafter, referred to as a "display achromatic color") for reproducing an achromatic color on the display unit 8, considering the display characteristics of the display unit 8. That is, the achromatic color which is visually recognized by the user varies depending on the display characteristics of a device that displays images. For example, a color which is displayed on a liquid crystal display (LCD) having a color temperature of 6500 K is closer to blue than a color which is displayed on a liquid crystal display having a color temperature of 5000 K as a whole.

Therefore, the bracket WB gain setting unit 52 (second gain acquisition unit 42) may acquire display characteristic information indicating the display characteristics of the display unit 8 from a display characteristic acquisition unit and acquire display achromatic color information on the basis of the display characteristic information. In this case, the bracket WB gain setting unit 52 may estimate the display achromatic color from the display achromatic color information and acquire chroma information on the basis of the chroma of the base image relative to the display achromatic color. Then, the bracket WB gain setting unit 52 may determine the absolute value of the amount of bracket on the basis of the chroma information and acquire the bracket image white balance gain on the basis of the absolute value of the amount of bracket and the base image white balance gain.

In this embodiment, the functional structure of the white balance image processing unit 40 is basically the same as that in the sixth embodiment (FIG. 16).

The "display characteristic acquisition unit" which acquires the display characteristic information of the display unit and supplies the display characteristic information to the bracket WB gain setting unit 52 is not particularly limited. For example, in the example illustrated in FIG. 16, the chroma specifying unit 62 may function as the display characteristic acquisition unit or an independent display characteristic acquisition unit (not illustrated) may be provided.

Figure 18:
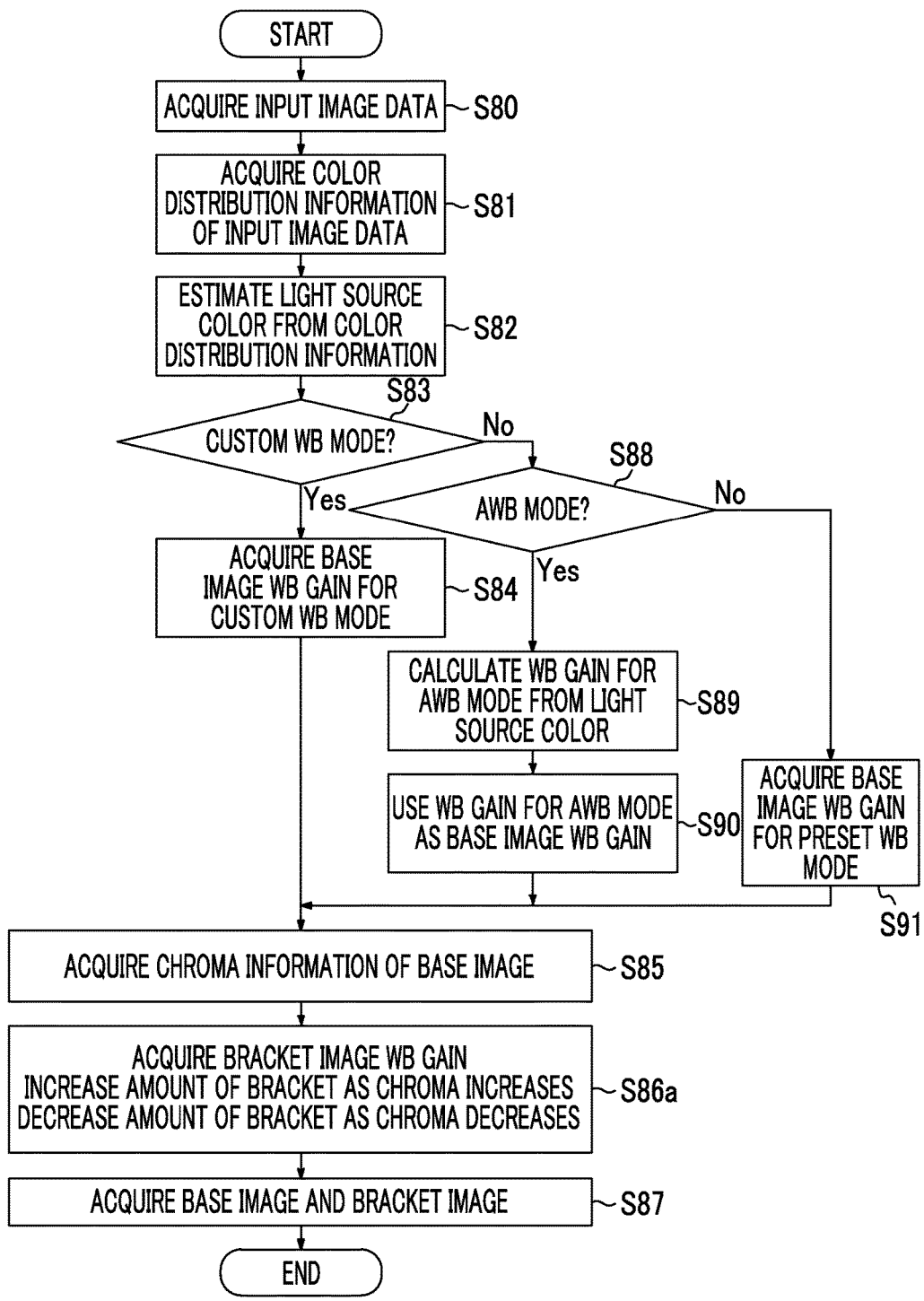
FIG. 18 is a flowchart illustrating white balance processing according to a seventh embodiment.

FIG. 18 is a flowchart illustrating white balance processing according to the seventh embodiment.

In this embodiment, the "base image white balance gain" and the "chroma information of the base image" are acquired by the same process as that in the sixth embodiment (S80 to S85 and S88 to S91 in FIG. 17) (S80 to S85 and S88 to S91 in FIG. 18).

The bracket WB gain setting unit 52 acquires the base image white balance gain in which the amount of bracket (absolute value) has been adjusted according to the chroma of the base image indicated by the "chroma information of the base image" transmitted from the chroma specifying unit 62 (S86a). Specifically, the base image white balance gain in which the amount of bracket is reduced in a case in which the chroma of the base image is low and is increased in a case in which the chroma of the base image is high is acquired. The bracket WB gain setting unit 52 can acquire the bracket image white balance gain, using any method, on the basis of the "chroma of the base image". For example, a membership function or a reference table may be used.

Then, the WB processing unit 54 acquires a base image on the basis of the base image white balance gain and the input image data and acquires a bracket image on the basis of the bracket image white balance gain and the input image data (S87).

As described above, according to this embodiment, the "amount of bracket" is adjusted on the basis of the "chroma of the base image", considering visual characteristics. Therefore, it is possible to remove a visual difference in white balance between the base image and the bracket image, regardless of the chroma of the base image.

Eighth Embodiment

In this embodiment, the detailed description of the same or similar structures and operations as those in the first embodiment will not be repeated.

In this embodiment, in white balance processing for input image data which is captured and acquired by the emission of flash light in the auto white balance mode, a base image white balance gain and a bracket image white balance gain are acquired on the basis of different degrees of influence of the flash.

In a case in which imaging is performed while flash light is emitted, an object is affected by the flash in addition to environmental light. Therefore, it is preferable to perform white balance processing, considering the influence of the flash. However, the emission of flash light is not stably performed and, in some cases, there is a variation in the amount of flash light (the amount of flash light reached) during each imaging operation. In addition, the degree of influence of the flash in a captured image varies depending on the optical characteristics of the object. Therefore, in some cases, the "estimated degree of influence of the flash" is not equal to the "actual degree of influence of the flash in input image data", which makes it difficult to perform appropriate white balance processing.

In this embodiment, in order to compensate for a variation in the degree of influence of the flash in a captured image, a base image white balance gain and a bracket image white balance gain are acquired on the basis of different degrees of influence of the flash in white balance bracketing.

Figure 19:
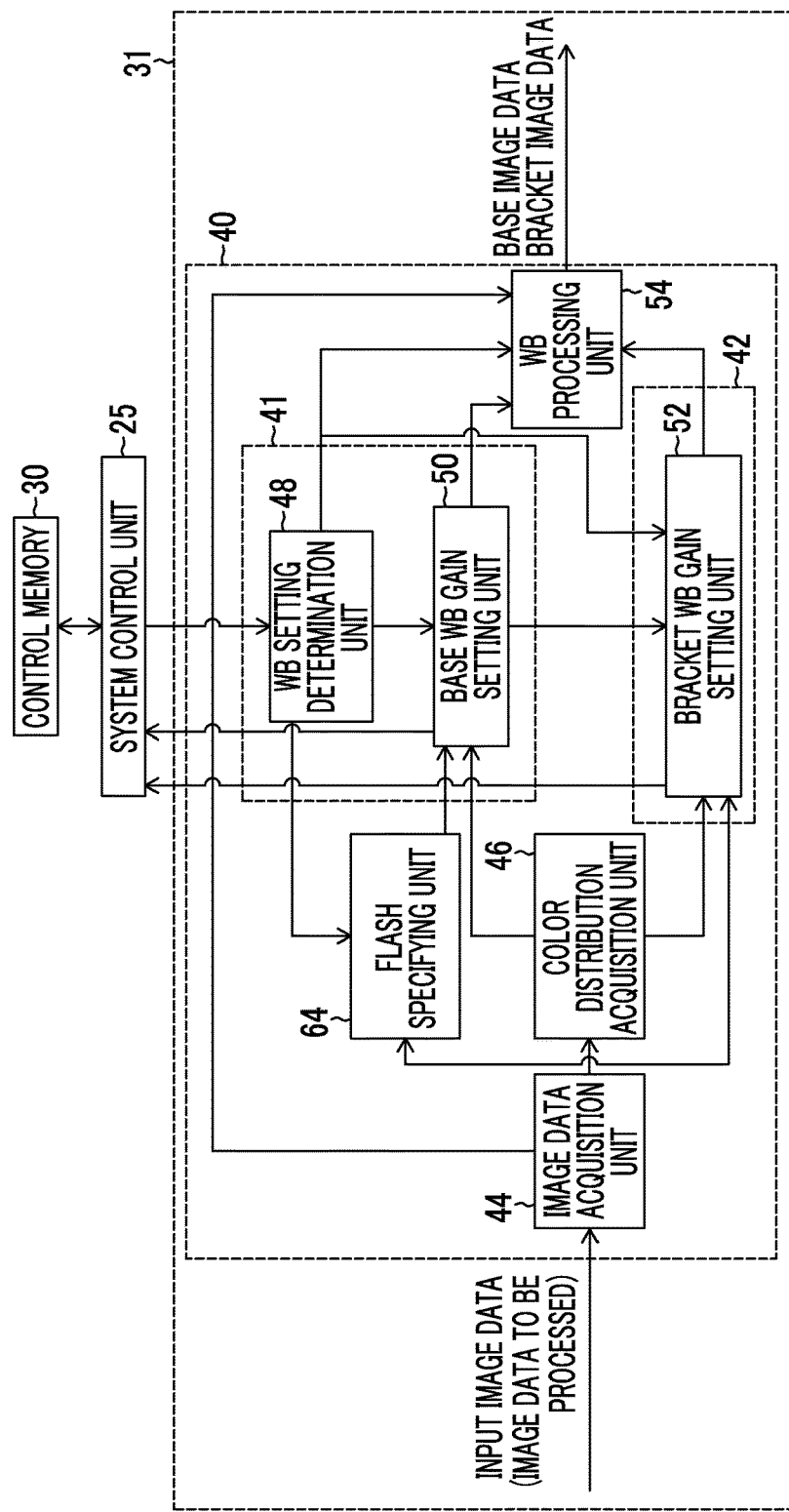
FIG. 19 is a functional block diagram illustrating an example of the structure of a white balance image processing unit according to an eighth embodiment.

FIG. 19 is a functional block diagram illustrating an example of the structure of a white balance image processing unit 40 according to an eighth embodiment.

In this embodiment, the white balance image processing unit 40 (image processing device) further includes a flash specifying unit 64 that is connected to the image data acquisition unit 44, the base WB gain setting unit 50 (first gain acquisition unit 41), and the bracket WB gain setting unit 52 (second gain acquisition unit 42). The flash specifying unit 64 receives input image data from the image data acquisition unit 44 and acquires the degree of influence of the flash which indicates the degree of influence of the flash in the input image data. The acquired degree of influence of the flash is transmitted from the flash specifying unit 64 to the base WB gain setting unit 50 and the bracket WB gain setting unit 52.

A method for acquiring the degree of influence of the flash in the flash specifying unit 64 is not particularly limited and the flash specifying unit 64 can acquire the degree of influence of the flash using any method. For example, in a case in which flash light is emitted to capture input image data, the flash specifying unit 64 can calculate the degree of influence of the flash from the input image data (flash light emission image) and reference image data (flash light non-emission image) which is captured without emitting flash light. The flash specifying unit 64 calculates difference data between the input image data (flash light emission image) and the reference image data (flash light non-emission image). The difference data is "image data affected by only flash light" from which the influence of environmental light has been removed. Therefore, the flash specifying unit 64 can acquire the degree of influence of the flash on the basis of the "image data affected by only flash light".

The base WB gain setting unit 50 (first gain acquisition unit 41) acquires the base image white balance gain on the basis of the degree of influence of the flash. Then, the bracket WB gain setting unit 52 (second gain acquisition unit 42) acquires the bracket image white balance gain on the basis of the degree of influence of the flash which is different from the degree of influence of the flash used to acquire the base image white balance gain. In particular, in this embodiment, in a case in which the set mode is the auto white balance mode, the base image white balance gain and the bracket image white balance gain are calculated on the basis of different degrees of influence of the flash.

The "acquisition of the base image white balance gain and the bracket image white balance gain on the basis of the degree of influence of the flash" by the base WB gain setting unit 50 and the bracket WB gain setting unit 52 can be performed by any method. For example, the ratio of the influences of flash light and environmental light in the input image data may be calculated on the basis of the degree of influence of the flash. The weighted average of a "white balance gain (a white balance gain for cancelling the influence of environmental light) corresponding to the color temperature of environmental light" and a "white balance gain (a white balance gain for cancelling the influence of flash light) corresponding to the color temperature of flash light" can be calculated on the basis of the ratio to "acquire the base image white balance gain and the bracket image white balance gain based on the degree of influence of the flash".

The bracket WB gain setting unit 52, the WB processing unit 54, and the flash specifying unit 64 receive information data related to the white balance setting mode from the WB setting determination unit 48, determine the white balance setting mode on the basis of the information data, and perform a process.

The system control unit 25 can control the flash light emitting unit 5 such that switching between the emission of flash light and the non-emission of flash light is performed when an image is captured. The system control unit 25 may perform the switching between the emission of flash light and the non-emission of flash light in response to an instruction from the user through the user interface 36 or the switching between the emission of flash light and the non-emission of flash light may be automatically performed according to the brightness of the object measured by a photometric sensor (not illustrated).

Figure 20:
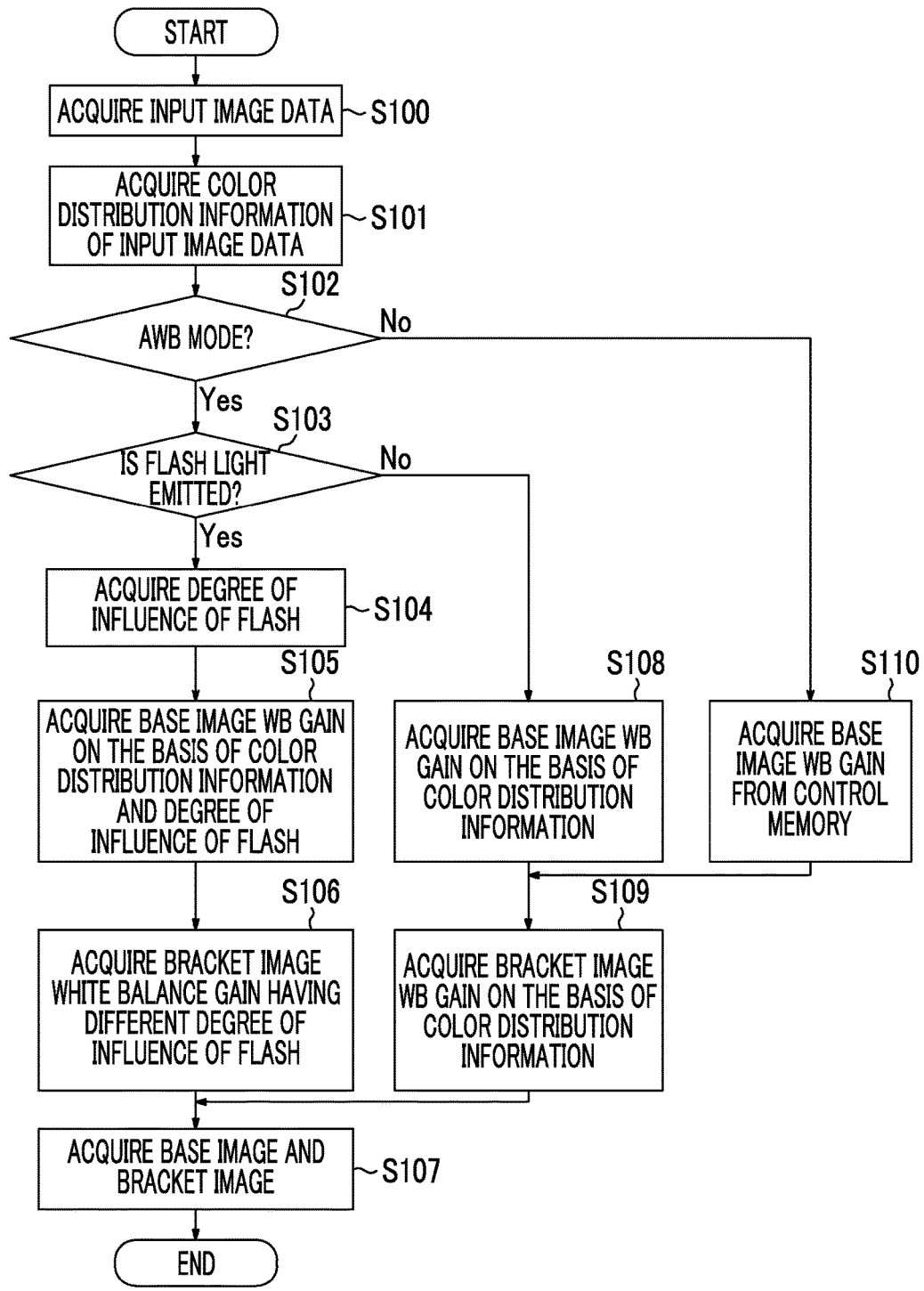
FIG. 20 is a flowchart illustrating white balance processing according to the eighth embodiment.

FIG. 20 is a flowchart illustrating white balance processing according to the eighth embodiment.

In this embodiment, input image data is acquired (S100 in FIG. 20) and the color distribution information of the input image data is acquired (S101) by the same process as that in the first embodiment (S10 and S11 in FIG. 6).

Then, the system control unit 25 and the WB setting determination unit 48 determine the white balance setting mode and whether flash light is emitted. In a case in which it is determined that the white balance setting mode is the auto white balance mode (Yes in S102) and that flash light is emitted (Yes in S103), the flash specifying unit 64 acquires the degree of influence of the flash in the input image data which is controlled by the system control unit 25 (S104). Then, the base WB gain setting unit 50 acquires the base image white balance gain on the basis of the color distribution information and the degree of influence of the flash (S105). The bracket WB gain setting unit 52 acquires the bracket image white balance gain having the degree of influence different from that of the base image white balance gain (S106).

In contrast, in a case in which it is determined that the white balance setting mode is the auto white balance mode (Yes in S102) and that flash light is not emitted (No in S103), the base WB gain setting unit 50 acquires the base image white balance gain on the basis of the color distribution information of the input image data (S108). The bracket WB gain setting unit 52 acquires the bracket image white balance gain on the basis of the color distribution information of the input image data (S109).

In contrast, in a case in which the white balance setting mode is not the auto white balance mode (No in S102), the base WB gain setting unit 50 acquires the base image white balance gain stored in the control memory 30 through the system control unit 25 and the WB setting determination unit 48. The bracket WB gain setting unit 52 acquires the bracket image white balance gain on the basis of the color distribution information of the input image data (S109).

The base WB gain setting unit 50 and the bracket WB gain setting unit 52 can acquire the base image white balance gain and the bracket image white balance gain, respectively, on the basis of the color distribution information of the input image data, using the same method as that in the white balance image processing unit 40 according to each of the above-described embodiments.

Then, the WB processing unit 54 acquires a base image on the basis of the base image white balance gain and the input image data and acquires a bracket image on the basis of the bracket image white balance gain and the input image data (S107).

As described above, according to this embodiment, in a case in which input image data is captured, with flash light emitted, in the auto white balance mode, the base image and the bracket image are created on the basis of the white balance gains having different degrees of influence of the flash. Therefore, even if the degree of influence of the flash which is considered when the base image white balance gain is acquired is not appropriate, the bracket image white balance gain is likely to be based on the appropriate degree of influence of the flash. As a result, the user can reliably obtain an image which has been subjected to white balance processing on the basis of the appropriate degree of influence of the flash.

In the above description, the base image white balance gain and the bracket image white balance gain are acquired on the basis of the color distribution information of the input image data. However, the invention is not limited thereto. That is, the base image white balance gain and the bracket image white balance gain may be acquired by any method. The base image white balance gain and the bracket image white balance gain may be based on different degrees of influence of the flash or may not be necessarily based on the color distribution information of the input image data.

Ninth Embodiment

In this embodiment, the detailed description of the same or similar structures and operations as those in the first embodiment will not be repeated.

In this embodiment, whether a bracket image is created is not determined on the basis of the settings set by the user, but is automatically determined. That is, it is determined whether white balance processing is likely to be inappropriate in the auto white balance mode on the basis of color distribution information of input image data. In white balance processing for input image data for which white balance processing is likely to be inappropriate, a bracket image is automatically created.

Figure 21:
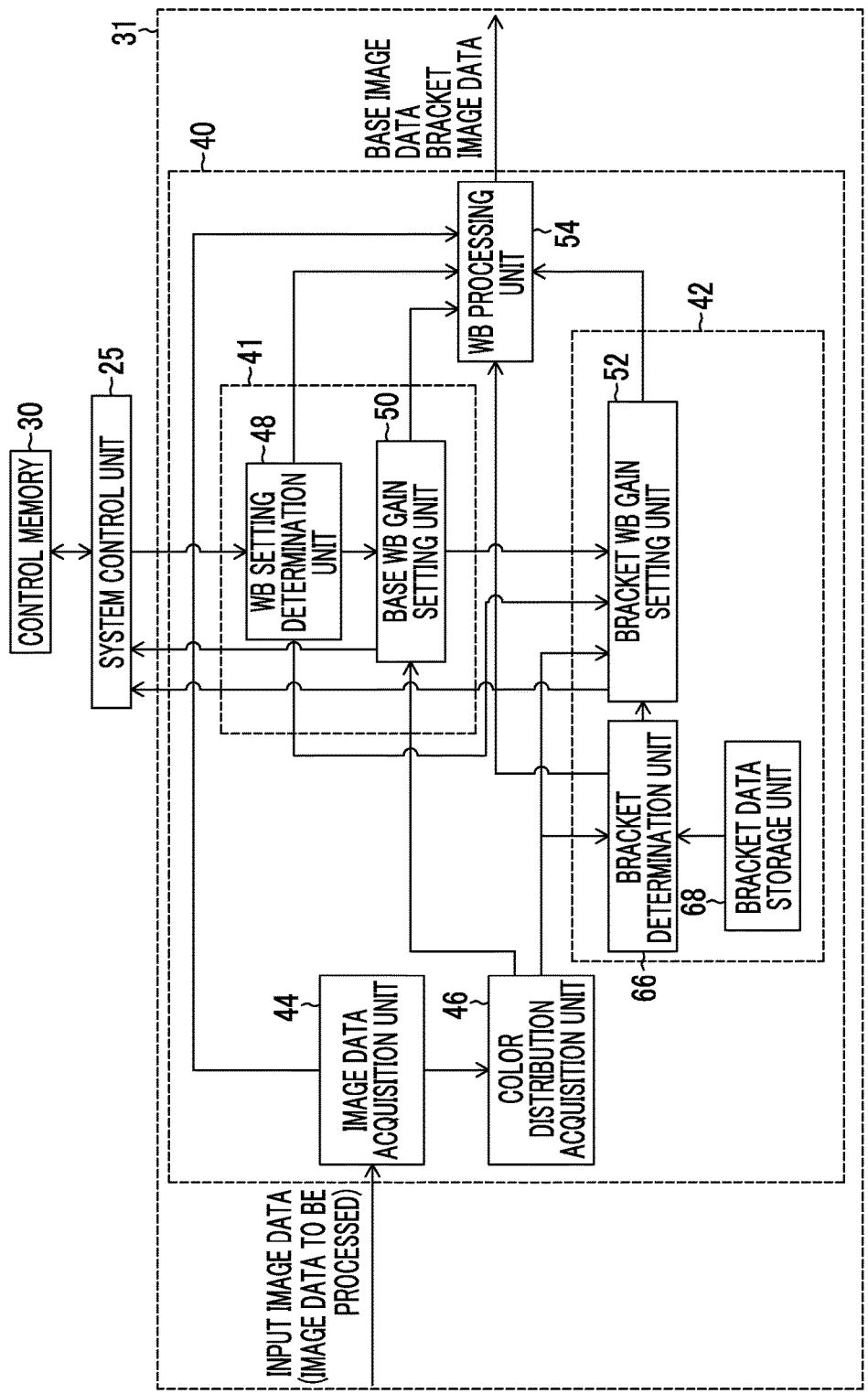
FIG. 21 is a functional block diagram illustrating an example of the structure of a white balance image processing unit according to a ninth embodiment.

FIG. 21 is a functional block diagram illustrating an example of the structure of a white balance image processing unit 40 according to a ninth embodiment.

In this embodiment, a second gain acquisition unit 42 further includes a bracket determination unit 66 and a bracket data storage unit 68. The bracket data storage unit 68 stores data indicating whether bracketing is required which defines the relationship between color distribution information and whether a bracket image needs to be created.

Figure 22:
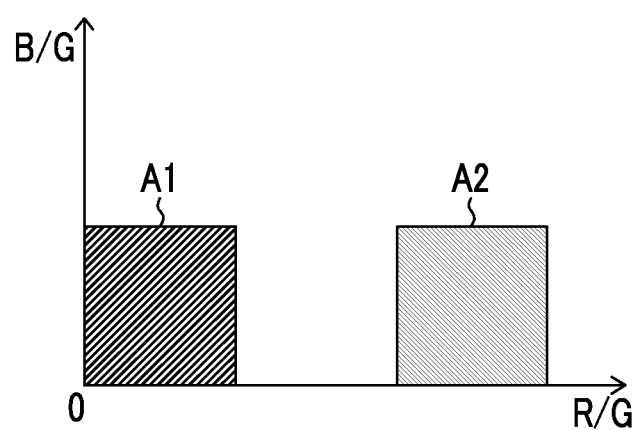
FIG. 22 is a diagram illustrating an example of the relationship between color distribution information and whether a bracket image needs to be created.

FIG. 22 is a diagram illustrating an example of the relationship between color distribution information and whether a bracket image needs to be created. In FIG. 22, the origin is "0", the vertical axis indicates "blue/green (B/G)", and the horizontal axis indicates "red/green (R/G)".

The data indicating whether bracketing is required indicates that a "bracket image needs to be created" for input image data having color distribution information in which a base image white balance gain is likely to be inappropriate.

In general, the proportion of a green component is high in both image data which includes a large amount of data for, for example, the green of a tree and image data which is captured under an artificial light source (for example, a fluorescent light) that emits light having a high proportion of green components. Therefore, in many cases, the image data items are arranged at the same position or adjacent positions in the color space (reference numeral "A1" in FIG. 22). Similarly, the proportion of a red component is high in both image data which has sunset as a captured scene and image data which is captured under an artificial light source (for example, a bulb and an LED) that emits light having a high proportion of red components. Therefore, in many cases, the image data items are arranged at the same position or adjacent positions in the color space (reference numeral "A2" in FIG. 22). As such, white balance processing for image data that is located in regions (hereinafter, also referred to as "white balance error regions"; "A1" and "A2" in FIG. 22) of the color space in which image data items of different scenes are likely to be arranged at the same position or adjacent positions is likely to be inappropriate.

Therefore, the data indicating whether bracketing is required indicates that the "creation of a bracket image is required" for image data (color distribution information) which is in the white balance error regions (A1 and A2). In addition, the data indicating whether bracketing is required indicates that the "creation of a bracket image is not required" for image data (color distribution information) which is in a region other than the white balance error regions (A1 and A2). In particular, preferably, the data indicating whether bracketing is required indicates that a bracket image needs to be created for input image data having the color distribution information of at least green and red.

The bracket determination unit 66 (second gain acquisition unit 42) determines whether a bracket image needs to be created, on the basis of the color distribution information of input image data acquired by a color distribution acquisition unit 46, with reference to the data indicating whether bracketing is required which is read from the bracket data storage unit 68. Information about whether a bracket image needs to be created which is determined by the bracket determination unit 66 is transmitted to a bracket WB gain setting unit 52 and a WB processing unit 54.

In a case in which it is determined that a bracket image needs to be created, the bracket WB gain setting unit 52 (second gain acquisition unit 42) acquires a bracket image white balance gain on the basis of the color distribution information and the base image white balance gain. Then, the WB processing unit 54 creates a bracket image on the basis of the bracket image white balance gain.

In particular, in this embodiment, in a case in which the white balance setting mode is the auto white balance mode and the bracket determination unit 66 determines that a bracket image needs to be created, the bracket image white balance gain is acquired and the bracket image is created.

In a case in which the bracket determination unit 66 determines that a bracket image needs to be created, it is preferable that the bracket image white balance gain is acquired and the bracket image is created, according to a light source color which is assumed to be possible. For example, in a case in which the color distribution information of the input image data is biased to green (A1 in FIG. 22), it is preferable that the bracket WB gain setting unit 52 acquires a first bracket image white balance gain on the assumption that the light source color is natural light (sunlight) and a second bracket image white balance gain on the assumption that the light source color is an artificial light source (for example, a fluorescent lamp). It is preferable that the WB processing unit 54 creates a first bracket image based on the first bracket image white balance gain and a second bracket image based on the second bracket image white balance gain. In this case, the user can reliably obtain an image subjected to appropriate white balance processing from a base image and a bracket image.

In contrast, in a case in which the bracket determination unit 66 determines that a bracket image does not need to be created, the bracket WB gain setting unit 52 does not acquire the bracket image white balance gain and the WB processing unit 54 does not create the bracket image and creates only the base image.

The bracket WB gain setting unit 52 and the WB processing unit 54 acquire the bracket image white balance gain and the bracket image only in a case in which the information transmitted from the WB setting determination unit 48 indicates that the white balance setting mode is the auto white balance mode and the information about whether a bracket image needs to be created, which is transmitted from the bracket determination unit 66, indicates that a bracket image needs to be created. In contrast, the bracket WB gain setting unit 52 and the WB processing unit 54 do not acquire the bracket image white balance gain and the bracket image in a case in which the information transmitted from the WB setting determination unit 48 indicates that the white balance setting mode is not the auto white balance mode or in a case in which the information about whether a bracket image needs to be created, which is transmitted from the bracket determination unit 66, indicates that a bracket image does not need to be created.

The other structures are the same as those of the white balance image processing unit 40 (FIG. 5) according to the first embodiment.

Figure 23:
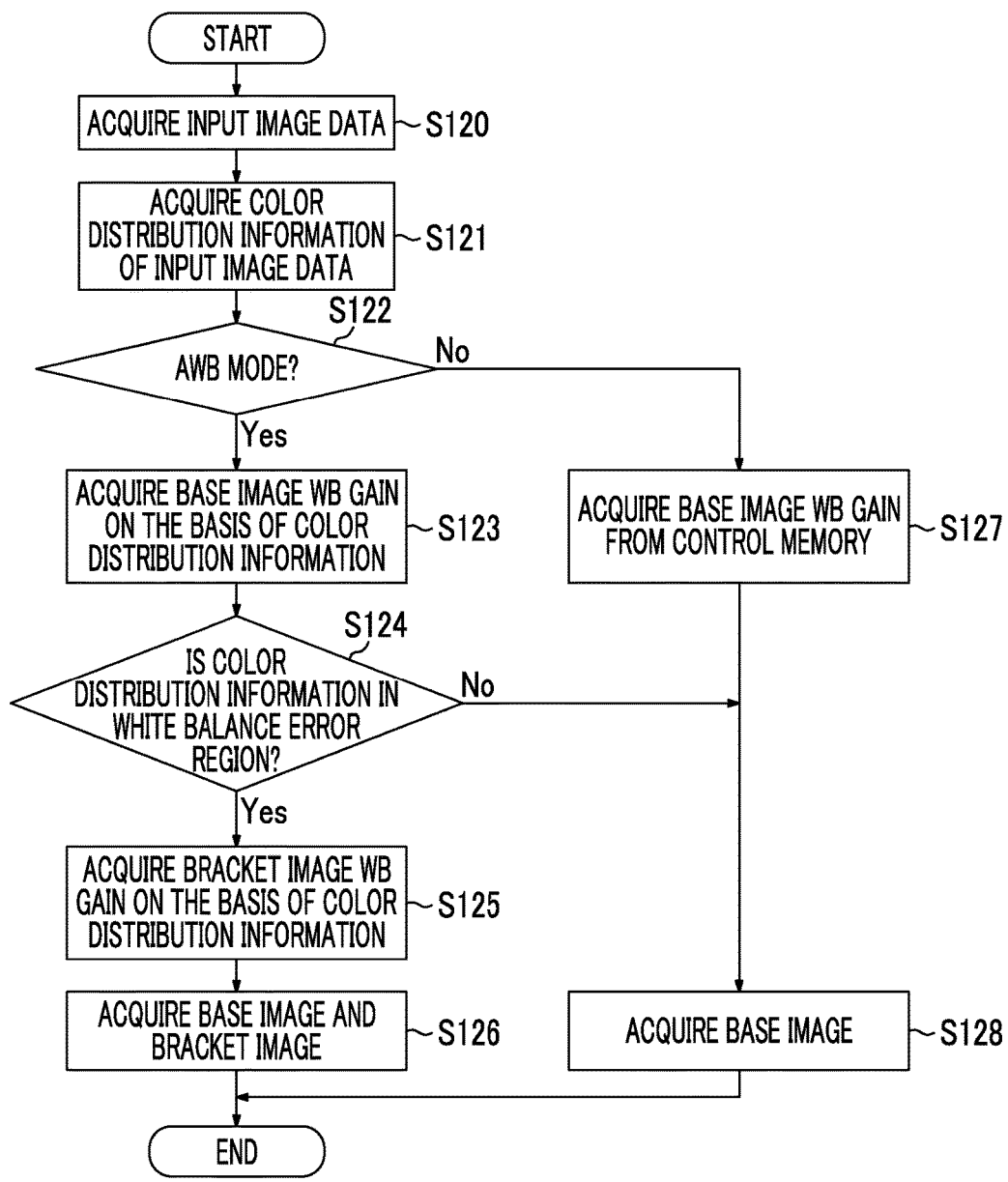
FIG. 23 is a flowchart illustrating white balance processing according to the ninth embodiment.

FIG. 23 is a flowchart illustrating white balance processing according to the ninth embodiment.

In this embodiment, input image data is acquired (S120 in FIG. 23) and the color distribution information of the input image data is acquired (S121) by the same process as that in the first embodiment (S10 and S11 in FIG. 6).

Then, the WB setting determination unit 48 determines the white balance setting mode.

In a case in which the white balance setting mode is the auto white balance mode (Yes in S122), the base WB gain setting unit 50 acquires a base image white balance gain on the basis of the color distribution information from the color distribution acquisition unit 46 (S123). Then, the bracket determination unit 66 determines whether the color distribution information of the input image data is present in the white balance error region (A1 and A2 in FIG. 22) (S124). In a case in which the color distribution information of the input image data is present in the white balance error region (Yes in S124), the bracket WB gain setting unit 52 acquires a bracket image white balance gain on the basis of the color distribution information (S125). Then, the WB processing unit 54 creates a base image and a bracket image (S126). In contrast, in a case in which the color distribution information of the input image data is not present in the white balance error region (No in S124), the bracket image white balance gain and the bracket image are not acquired and the WB processing unit 54 creates only the base image (S128).

In a case in which the white balance setting mode is not the auto white balance mode (No in S122), the base WB gain setting unit 50 acquires the base image white balance gain stored in the control memory 30 through the system control unit 25 and the WB setting determination unit 48 (S127). Then, the bracket image white balance gain and the bracket image are not acquired and the WB processing unit 54 creates only the base image (S128).

As described above, according to this embodiment, in addition to the base image, the bracket image is automatically created on the basis of input image data having color distribution information in which white balance processing is likely to be inappropriate in the auto white balance mode. Therefore, even if the color distribution information of the input image data is likely to cause an error in the determination of the light source color and a color failure occurs due to white balance processing, the user can acquire an image subjected to appropriate white balance processing from the bracket image, without a retake.

Tenth Embodiment

In this embodiment, the detailed description of the same or similar structures and operations as those in the above-described embodiments will not be repeated.

This embodiment relates to a method for recording a base image and a bracket image which are created on the basis of one input image data item using white balance bracketing and a method for displaying the base image and the bracket image. The recording method and the display method which will be described below can be applied to the base images and the bracket images which are created in the above-described embodiments and base images and bracket images which are created on the basis of other white balance bracketing methods.

In this embodiment, classification information indicating a main image or a sub-image is added to each of the base image and the bracket images. The classification information can be rewritten in response to an instruction from the user. In this embodiment, a color space is displayed on a display unit 8 and the correspondence between the base image and the bracket image is displayed in the color space. Therefore, the user can easily check the relationship between the base image and the bracket image in the color space.

Figure 24:
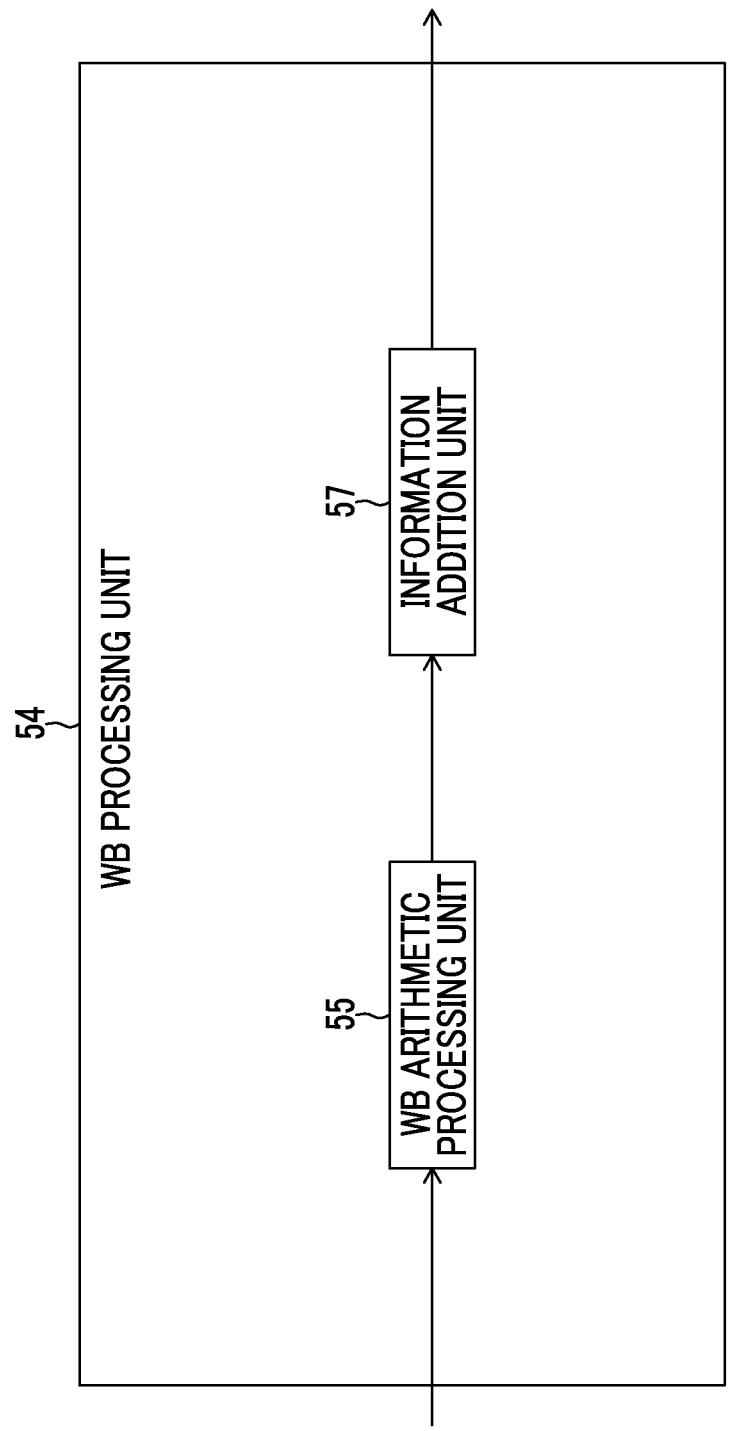
FIG. 24 is a functional block diagram illustrating an example of the structure of a WB processing unit according to a tenth embodiment.

FIG. 24 is a functional block diagram illustrating an example of the structure of a WB processing unit 54 according to a tenth embodiment. In this embodiment, the WB processing unit 54 includes a white balance arithmetic processing unit (hereinafter, referred to as a "WB arithmetic processing unit") 55 and an information addition unit 57.

The WB arithmetic processing unit 55 applies a base image white balance gain to input image data to calculate base image data and applies a bracket image white balance gain to the input image data to calculate bracket image data. The information addition unit 57 adds classification information to the base image and the bracket image created by the WB arithmetic processing unit 55.

Figure 25:
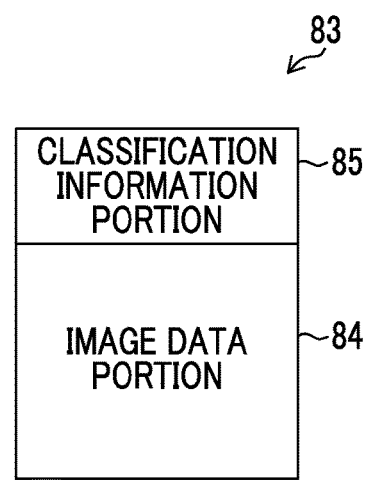
FIG. 25 is a diagram illustrating an example of a data structure related to each of a base image and a bracket image.

FIG. 25 is a diagram illustrating an example of the data structure related to each of the base image and the bracket image.

Image information data 83 related to each of the base image and the bracket image includes an image data portion 84 related to an image subjected to white balance processing which is created by the WB arithmetic processing unit 55 and a classification information portion 85 related to the classification information added by the information addition unit 57.

The classification information added by the information addition unit 57 is information related to a main image and a sub-image. Main image classification information is allocated to one of the base image and the bracket images created for one input image data item and sub-image classification information is allocated to the other images. In this example, the information addition unit 57 (WB processing unit 54) adds classification information indicating a main image to the base image and adds classification information indicating a sub-image to the bracket images. The information addition unit 57 may add the classification information indicating a main image to one bracket image and add the classification information indicating a sub-image to the base image and the other bracket image.

The file formats of the base image and the bracket images created on the basis of one input image data item are as follows: the base image and the bracket images are stored in different files; and the base image and the bracket image are stored in one file.

Figure 26:
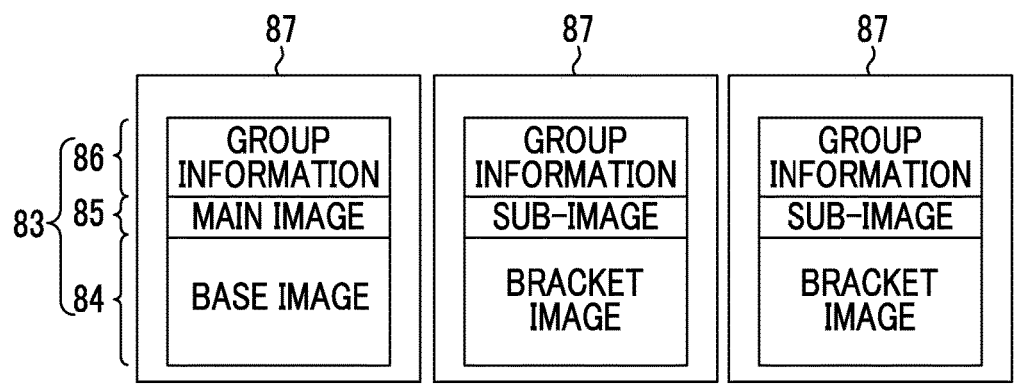
FIG. 26 is a diagram illustrating an example of a data structure in a case in which a base image and a bracket image created on the basis of one input image data item are stored as different file data items.

FIG. 26 illustrates an example of a data structure in a case in which the base image and the bracket images created on the basis of one input image data item are used as different file data items. In a case in which the base image and the bracket images are used as different file data items 87, each file data item 87 includes the image data portion 84, the classification information portion 85, and a group information portion 86.

The group information portion 86 indicates group information data indicating to which input image data the base image and the bracket image are related. The group information data groups the base image and the bracket image created on the basis of the same input image data so as to be associated with each other. Therefore, a group formed by the base image and the bracket image is formed for each input image data item and the base image and the bracket image created on the basis of the same input image data form the same group. In this example, the information addition unit 57 adds the group information portion 86 to the image data portion 84 and the classification information portion 85. However, the addition may be performed by other processing units. For example, the addition may be performed by the storage control unit 33.

Figure 27:
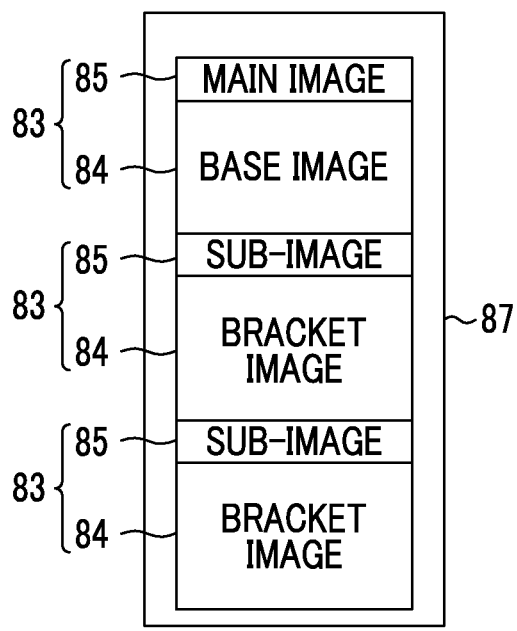
FIG. 27 is a diagram illustrating an example of a data structure in a case in which the base image and the bracket image created on the basis of one input image data item are stored in one file.

FIG. 27 illustrates an example of a data structure in a case in which the base image and the bracket images that are created on the basis of one input image data item are stored in one file. In a case in which the base image and the bracket images are stored in one file, one file data item 87 including the images (image data portion 84) and classification information (classification information portion 85) is created. Therefore, one file data item 87 includes image information data 83 related to the base image and image information data 83 related to the bracket image. In this case, a group information portion 86 (FIG. 26) may not be added.

The file data 87 may be created by the information addition unit 57 illustrated in FIG. 24 or the storage control unit 33 illustrated in FIG. 3. In a case in which the information addition unit 57 creates the file data 87, the created file data 87 is compressed by the compression and decompression unit 32 and is then stored in the main memory 10 under the control of the storage control unit 33. In contrast, in a case in which the storage control unit 33 creates the file data 87, a data set forming the classification information portion 85 and the group information portion 86 is transmitted from the system control unit 25 to the storage control unit 33 and the compressed image data (the base image and the bracket image) is transmitted from the compression and decompression unit 32 to the storage control unit 33. The storage control unit 33 creates the file data 87 on the basis of the data set transmitted from the system control unit 25 and the image data transmitted from the compression and decompression unit 32 and stores the file data 87 in the main memory 10.

The storage control unit 33 further adds metadata, such as information about the imaging date and time or information about the editing date and time, to the data (file data 87) of the base image and the bracket image and stores the base image and the bracket image in the main memory 10 so as to be associated with each other. The storage control unit 33 performs the metadata addition process in, for example, an Exif format.

The storage control unit 33 stores the image information data 83 including the image data portion 84 and the classification information portion 85 (and the group information portion 86) in the main memory 10 and the base image and the bracket image are stored in the main memory 10 so as to be associated with each other.

Figure 28:
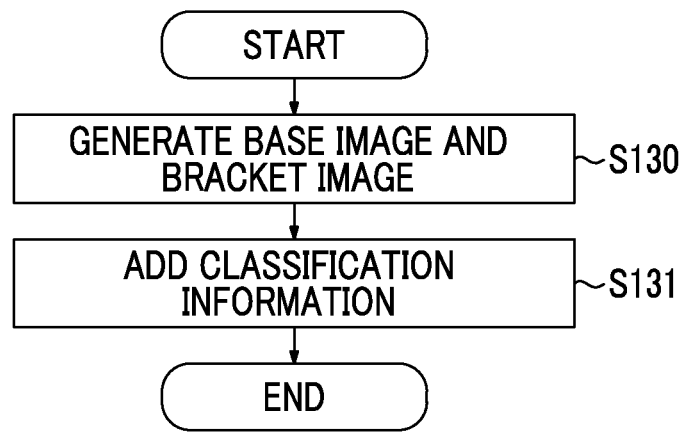
FIG. 28 is a flowchart illustrating white balance processing according to the tenth embodiment.

FIG. 28 is a flowchart illustrating white balance processing according to the tenth embodiment. In this embodiment, the WB arithmetic processing unit 55 creates a base image and a bracket image (S130 in FIG. 28) and the information addition unit 57 adds classification information to each of the base image and the bracket images created by the WB arithmetic processing unit 55 (S131).

Next, the rewriting of the classification information will be described.

Figure 29:
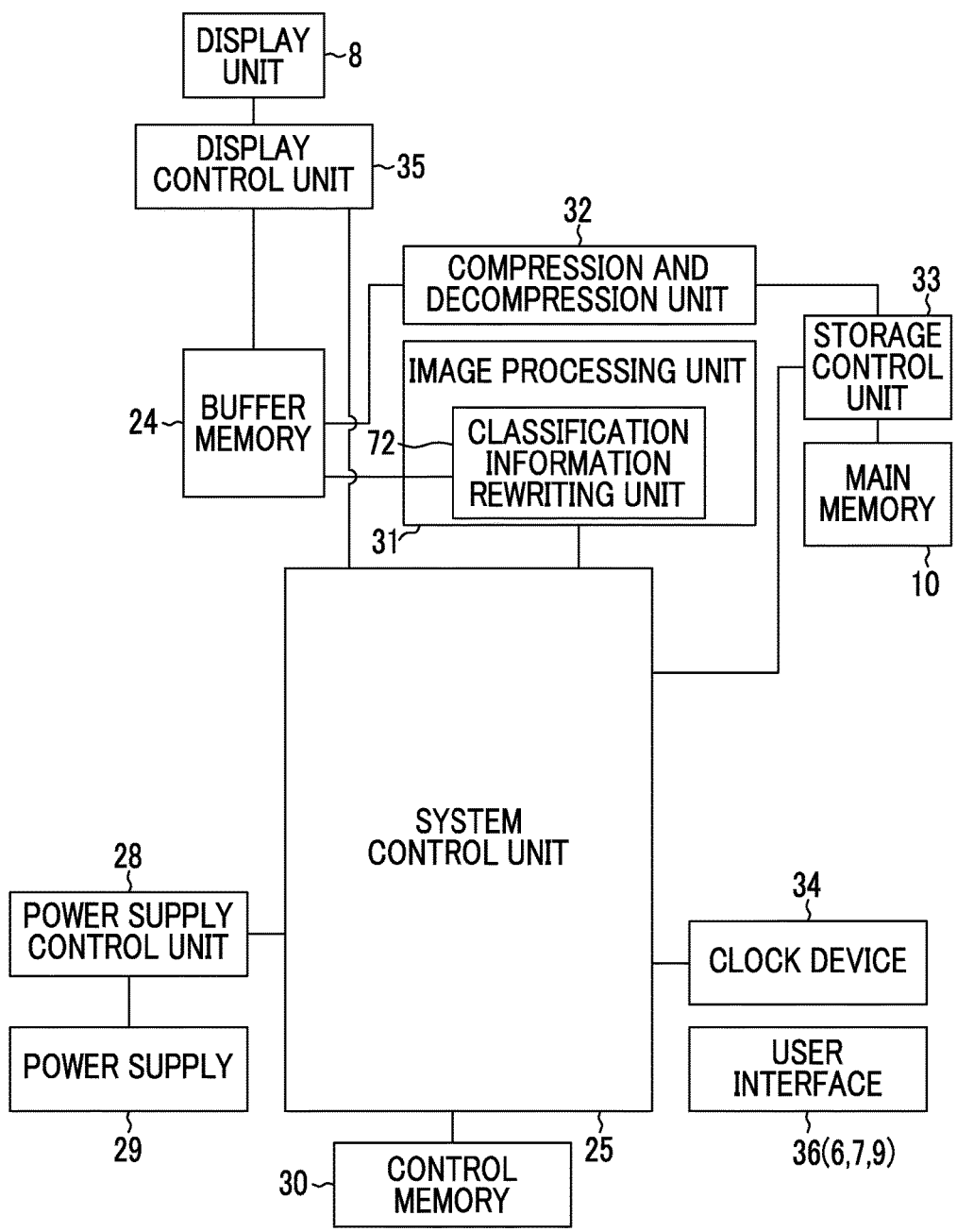
FIG. 29 is a diagram mainly illustrating a processing unit related to an image display process among the functional blocks of the digital camera illustrated in FIG. 3.

FIG. 29 illustrates a processing unit which is mainly related to an image display process among the functional blocks of the digital camera 2.

A display control unit 35 controls the display unit 8 such that at least one of the base image or the bracket image is displayed on the display unit 8. In particular, in this embodiment, the display control unit 35 controls the display unit 8 such that at least one of the base image or the bracket image to which the main image classification information is added is displayed on the display unit 8.

In this embodiment, an image processing unit 31 includes a classification information rewriting unit 72. The classification information rewriting unit 72 acquires image data stored in a buffer memory 24 and rewrites the classification information under the control of the system control unit 25.

That is, the user inputs an instruction to decide the classification information added to the base image and the bracket image to a user interface 36 (an operating unit 9: an instruction receiving unit). The classification information rewriting unit 72 rewrites the classification information added to the base image and the bracket images on the basis of the classification information decision instruction input to the user interface 36. Specifically, when the classification information decision instruction is input through the user interface 36, the system control unit 25 controls the classification information rewriting unit 72 such that the classification information rewriting unit 72 rewrites the classification information of the base image and the bracket images.

In this embodiment, the main image classification information is added to one of the base image and the bracket images which are created on the basis of one input image data item. Therefore, when the user inputs a decision instruction to "change the main image" to the user interface 36, the classification information rewriting unit 72 changes the classification information added to an image which is newly selected and decided as the main image among the base image and the bracket images created on the basis of one input image data item from the sub-image to the main image and changes the classification information of the image, to which the main image classification information has been added before the determination instruction is input, from the main image to the sub-image.

Next, an example of the display of an image will be described.

In a case in which image playback for checking a captured image is performed immediately after the image is captured, image data which has been output from the imaging element 21 and then processed by a process processing unit 22, an AD conversion unit 23, and an image processing unit 31 is temporarily stored in a buffer memory 24. The display control unit 35 reads the image data stored in the buffer memory 24 and directs the display unit 8 to display the image data. In contrast, in a case in which a recorded image is played back, image is read from the main memory 10 by the storage control unit 33, is decompressed by the compression and decompression unit 32, and is temporarily stored in the buffer memory 24. The display control unit 35 reads the image data stored in the buffer memory 24 and directs the display unit 8 to display the image data.

Figure 30:
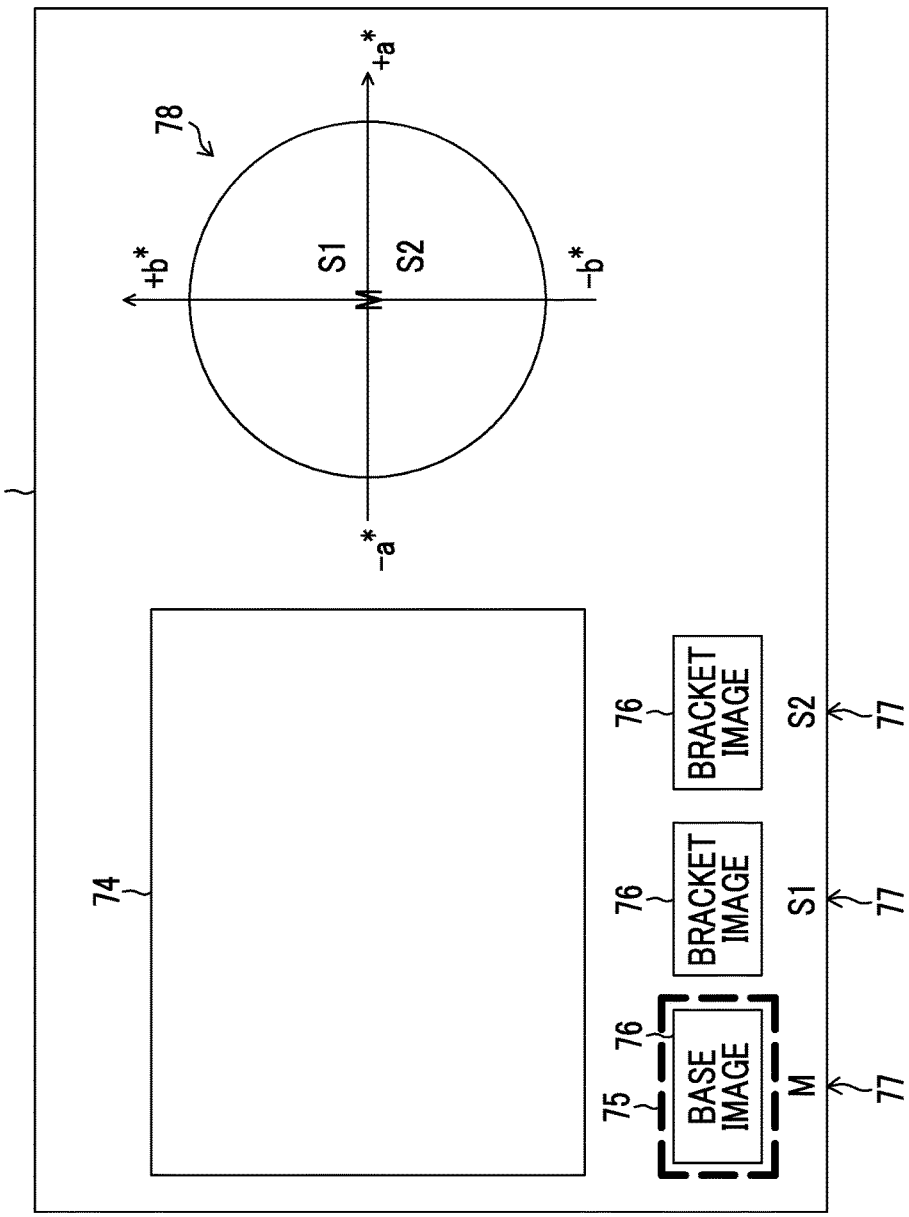
FIG. 30 is a diagram illustrating an example of the playback and display of images in a display unit.

FIG. 30 is a diagram illustrating an example of the playback and display of an image on the display unit 8. The example illustrated in FIG. 30 is illustrative and the size or arrangement of each portion displayed on the display unit 8 is not particularly limited. The "image playback" may be captured image playback for checking a captured image immediately after the image is captured or recorded image playback for checking an image recorded in the main memory 10.

In this example, when an image is played back, a selected image display portion 74, a selection cursor 75, a minified image 76, a classification display portion 77, and a color space display portion 78 are displayed on the display unit 8. The selection cursor 75 is used to select any one of the minified images 76 of the base image and the bracket images. The user can operate the user interface 36 (operating unit 9) to switch the minified image 76 selected by the selection cursor 75.

The minified images 76 are the minified images of the base image and the bracket images. The classification information (the main image or the sub-image) of each minified image 76 is displayed in the classification display portion 77. In the classification display portion 77 illustrated in FIG. 30, "M" is displayed for the minified image 76 of the main image (base image) and "S1" or "S2" is displayed for the minified image 76 of the sub-image (bracket image).

In addition, the display of any one of the minified image 76 and the classification display portion 77 may be omitted. In a case in which the minified image 76 is omitted, the display of any one of the classification display portions 77 may be selected by the selection cursor 75 and the selected image may be displayed in the selected image display portion 74.

Only one image which is selected by the selection cursor 75 among the base image and the bracket images is displayed in the selected image display portion 74 and an image in which the user is interested is displayed in the selected image display portion 74. In particular, after the mode is switched to a playback mode, one of the base image and the bracket images, to which the main image classification information is added, is displayed first in the selected image display portion 74.

The display control unit 35 displays a color coordinate system (a chromaticity diagram of an L*a*b* color system in the example illustrated in FIG. 30) in the color space display portion 78 of the display unit 8 and displays the color distribution information of at least one of the base image or the bracket image, which is to be displayed on the display unit 8, on the color coordinate system displayed on the display unit 8. In this example, the display control unit 35 displays the positions of both the color distribution information of the image to which the main image classification information is added among the base image and the bracket images and the color distribution information of the other images to which the sub-image classification information is added on the color coordinate system displayed on the display unit 8. In the example illustrated in FIG. 30, in the color space display portion 78, the color distribution information (representative color) of the image to which the main image classification information is added is represented by "M" and the color distribution information (representative color) of the images to which the sub-image classification information is added is represented by "S1" and "S2".

In the example illustrated in FIG. 30, the color distribution information of the base image (main image) is displayed at the origin of the color coordinate system. However, the color distribution information of the base image (main image) may be displayed at a position other than the origin of the color coordinate system according to the color distribution information of the base image.

In a state in which the main image classification information is added to the base image (FIG. 30), the user can move the selection cursor 75 to change the selection of the minified image 76 by the selection cursor 75, using the user interface 36 (operating unit 9). In this case, the display control unit 35 controls the display unit 8 such that an image that is newly selected by the selection cursor 75 is displayed in the selected image display portion 74. As such, the user interface 36 (operating unit 9) also functions as an image switching receiving unit to which an instruction to switch the image displayed on the display unit 8 is input from the user. The display control unit 35 switches the image that is displayed in the selected image display portion 74, which is the same region of the display unit 8, among the base image and the bracket images, in response to the image switching instruction input to the user interface 36.

Figure 31:
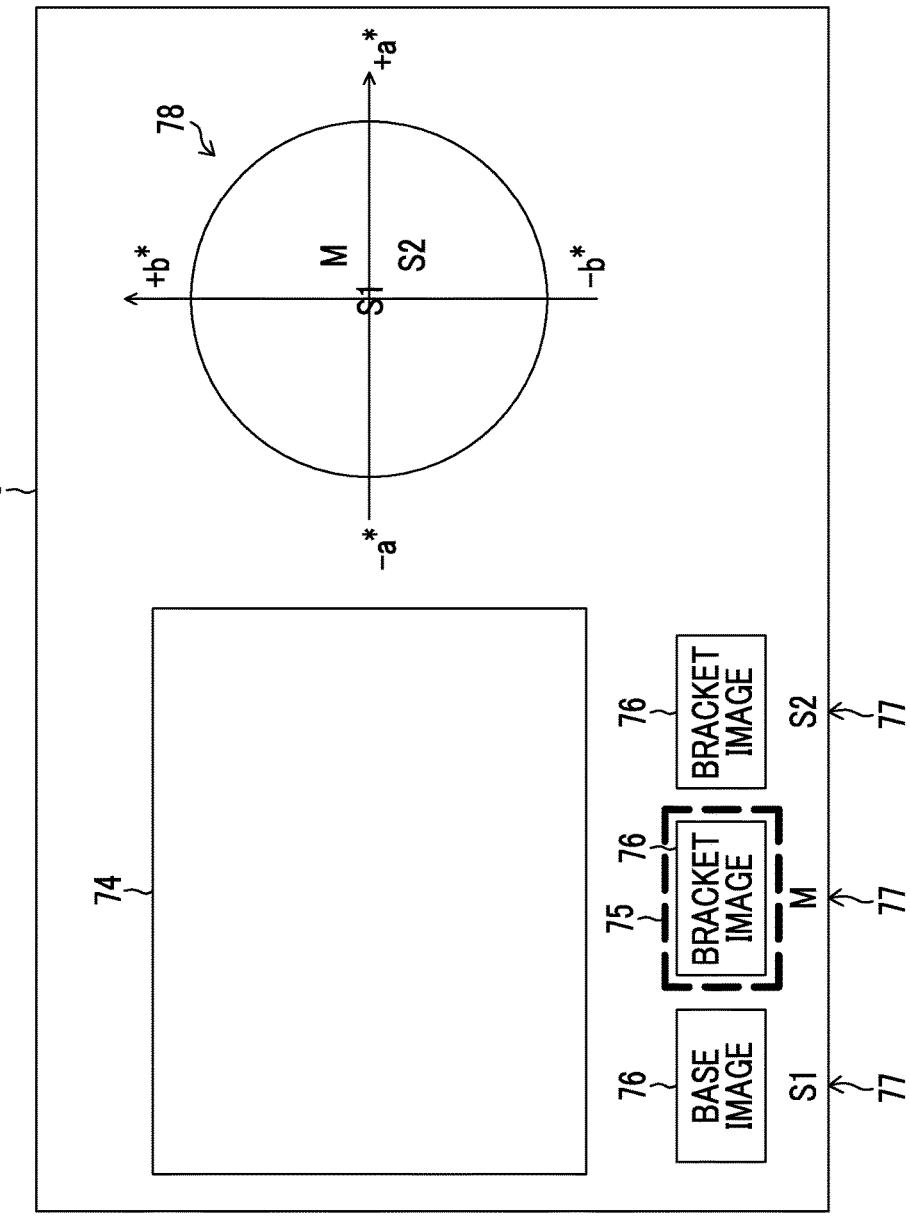
FIG. 31 is a diagram illustrating an example of the display of the display unit in a case in which a bracket image is selected and determined as a main image.

FIG. 31 is a diagram illustrating an example of the display of the display unit 8 in a case in which the bracket image is selected and decided as the main image.

In a state in which main image classification information is added to the base image (FIG. 30), when the user operates the user interface 36 (operating unit 9) to move the selection cursor 75 and operates the user interface 36 to select and decide the bracket image as the main image, the display unit 8 is, for example, in the display state illustrated in FIG. 31. In FIG. 31, when the user uses the selection cursor 75 to select the bracket image as the main image, "M" indicating the main image is displayed in the classification display portion 77 corresponding to the selected minified image 76 and "S1" or "S2" indicating the sub-image is displayed in the classification display portion 77 corresponding to another minified image 76. Then, in the color space display portion 78, the color distribution information of the base image and the bracket image are displayed on the color coordinate system, according to the classification of the main image and the sub-image which are selected and decided by the user.

As such, the user can select one image as an image of interest from a plurality of images (the base image and the bracket image) displayed on the display unit 8, using the user interface 36 (operating unit 9). In this case, a decision instruction indicating that the user has selected the image of interest is input to the user interface 36 (operating unit 9). When the decision instruction related to the selection of the image of interest is input to the user interface 36, the system control unit 25 controls the classification information rewriting unit 72 such that the classification information of the image of interest indicates the main image. That is, the classification information rewriting unit 72 rewrites the classification information such that the classification information of the image of interest, which is designated by the decision instruction input to the user interface 36 (operating unit 9), among the base image and the bracket images created on the basis of one input image data item indicates the main image and the classification information of the other images indicates the sub-image.

In a case in which the classification information rewriting unit 72 has rewritten the classification information, the display control unit 35 controls the display unit 8 such that one or a plurality of images among the base image and the bracket images are displayed on the display unit 8 according to the rewritten classification information.

Figure 32:
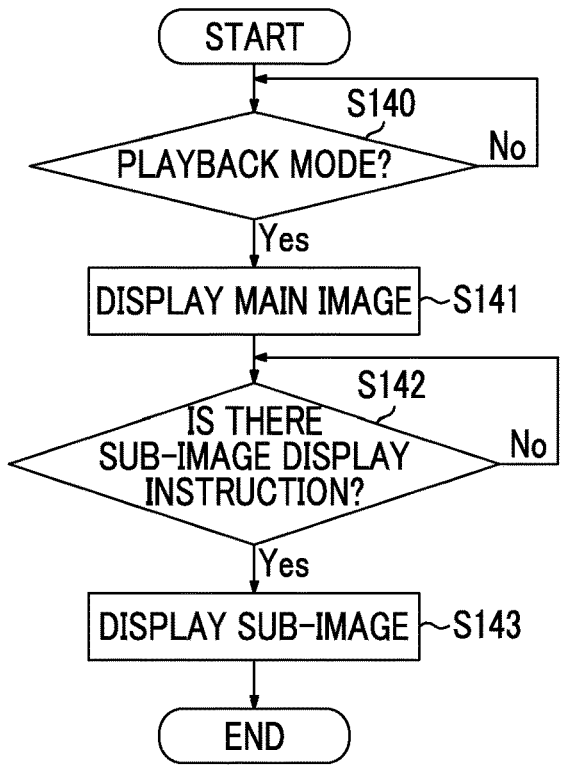
FIG. 32 is a flowchart illustrating the switching of images in the display unit (selected image display unit).

FIG. 32 is a flowchart illustrating the switching of images in the display unit 8 (selected image display portion 74).

First, the system control unit 25 determines whether the mode is the playback mode (S140 in FIG. 32) and continuously performs the determination until the mode changes to the playback mode (No in S140). The "determination of whether the mode is the playback mode" can be performed by any method. For example, the system control unit 25 determines whether the user has selected the playback mode through the user interface 36 (operating unit 9) or whether the user has set a mode for playing back a captured image in order to check the captured image. In this way, it is possible to "determine whether the mode is the playback mode".

In a case in which it is determined that the mode is the playback mode (Yes in S140), the display control unit 35 controls the display unit 8 under the control of the system control unit 25 such that an image to which the main image classification information is added is displayed in the selected image display portion 74 of the display unit 8 (S141; FIG. 30).

After the image to which the main image classification information is added among the base image and the bracket images is displayed in the selected image display portion 74, the system control unit 25 determines whether the user inputs an instruction to display an image to which the sub-image classification information is added and performs the determination until the user inputs the display instruction (No in S142). In this example, in a case in which the user moves the selection cursor 75 from the main image, using the user interface 36, it is determined that "an instruction to display the image to which the sub-image classification information is added is input". In a case in which "the instruction to display the image to which the sub-image classification information is added is input" (Yes in S142), the display control unit 35 controls the display unit 8 under the control of the system control unit 25 such that the image which has been newly selected by the selection cursor 75 is displayed in the selected image display portion 74 of the display unit 8 (S143).

Figure 33:
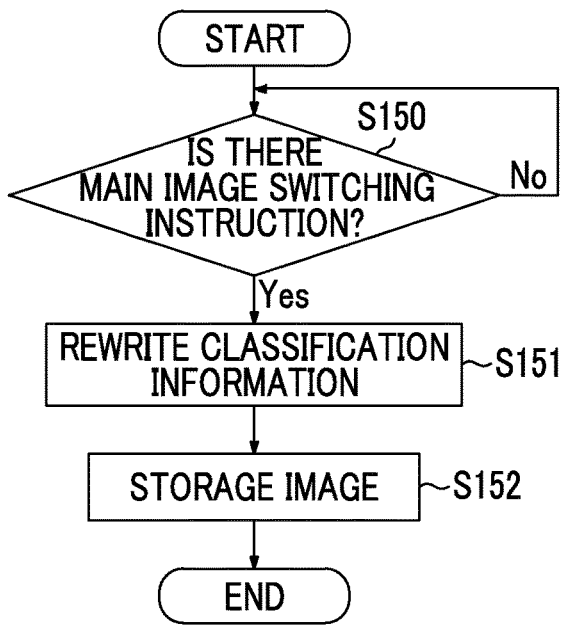
FIG. 33 is a flowchart illustrating a classification information rewriting process.

FIG. 33 is a flowchart illustrating a classification information rewriting process.

First, the system control unit 25 determines whether a main image switching instruction is input (S150 in FIG. 33) and performs the determination until the main image switching instruction is input (No in S150). In this example, a case in which the user moves the selection cursor 75, using the user interface 36 (operating unit 9), and inputs an instruction to decide the minified image 76, to which the sub-image classification information is added, as a new main image to the user interface 36 (operating unit 9) is the case in which "the main image switching instruction is input".

In a case in which it is determined that the main image switching instruction is input (Yes in S150), the classification information rewriting unit 72 rewrites the classification information of the base image and the bracket image in the group corresponding to the switching instruction under the control of the system control unit 25 (S151). In this way, the process of rewriting the classification information (the "classification information portion 85" in FIG. 25) is performed such that the classification information added to the image which is decided as the main image by the user among the base image and the bracket images indicates the "main image" and the classification information added to the other images indicates the "sub-image".

In a case in which the classification information rewriting unit 72 has rewritten the classification information, the base image and the bracket images are transmitted to the storage control unit 33 through the compression and decompression unit 32 and the storage control unit 33 stores the base image, the bracket images, and the rewritten classification information in the main memory 10 (S152).

As described above, according to this embodiment, only one of the base image and the bracket images is displayed in the selected image display portion 74 of the display unit 8 and the image displayed in the selected image display portion 74 can be switched in response to a display instruction from the user through the user interface 36. Therefore, even if the number of base images and bracket images created on the basis of the same input image data increases, the user can check the image displayed in the selected image display portion 74 while switching the images. Therefore, it is possible to simply check the base image and the bracket images and thus to reduce the user's time and effort to manage the images.

In a case in which the base image and the bracket images are displayed on the display unit 8 (selected image display portion 74) at the same time and each image is displayed at different positions on the display unit 8, it is difficult to compare the displayed images due to, for example, the influence of the color unevenness of the display unit 8, which makes it difficult for the user to recognize a difference in white balance between the displayed images. However, in this embodiment, the base image and the bracket images are displayed in the selected image display portion 74, which is the same region of the display unit 8, by the user's selection through the selection cursor 75. The display of the base image and the bracket images is switched at the same position. Therefore, it is easy to compare the images and it is easy for the user to recognize a difference in white balance between the images.

The corresponding positions of the base image and the bracket images on the color coordinate system are displayed in the color space display portion 78 of the display unit 8. Therefore, the user can intuitively check the bracket direction and the amount of bracket at a glance.

In the above-described embodiment, the user operates the user interface 36 to switch the image displayed in the selected image display portion 74. However, the invention is not limited thereto. For example, the display control unit 35 may sequentially display each of the base image and the bracket images in the selected image display portion 74, which is the same region of the display unit 8, automatically and over time. That is, the display control unit 35 switches the image displayed in the selected image display portion 74 and the image displayed in the selected image display portion 74 is automatically switched over time, regardless of the user's operation. It is preferable that the switching time of the image displayed in the selected image display portion 74 is set such that the user can recognize a difference in white balance between the base image and the bracket image.

Figure 34A:
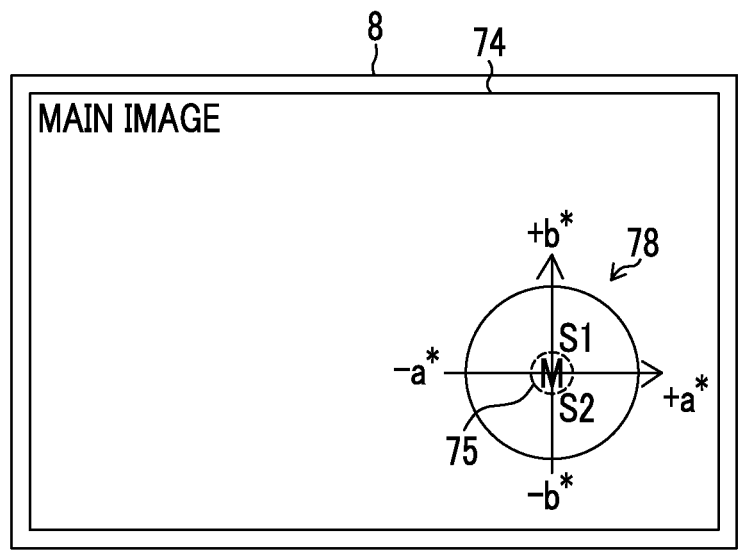
FIG. 34A illustrates another example of the display of the display unit.
Figure 34B:
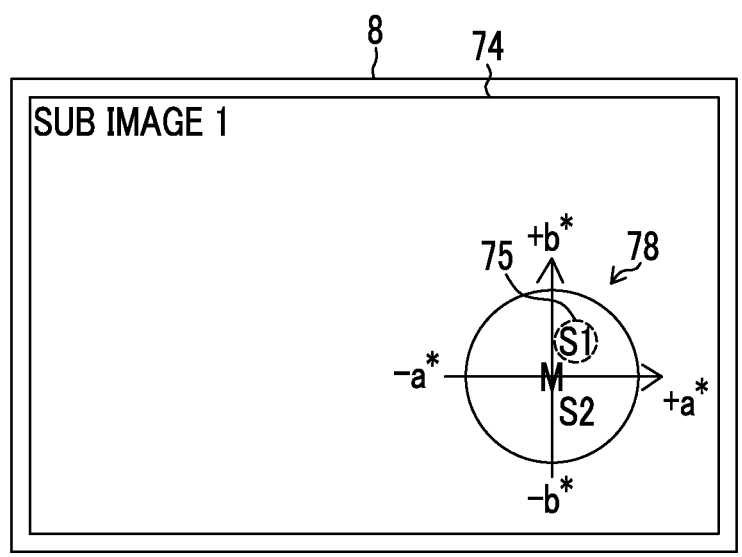
FIG. 34B illustrates still another example of the display of the display unit.
Figure 34C:
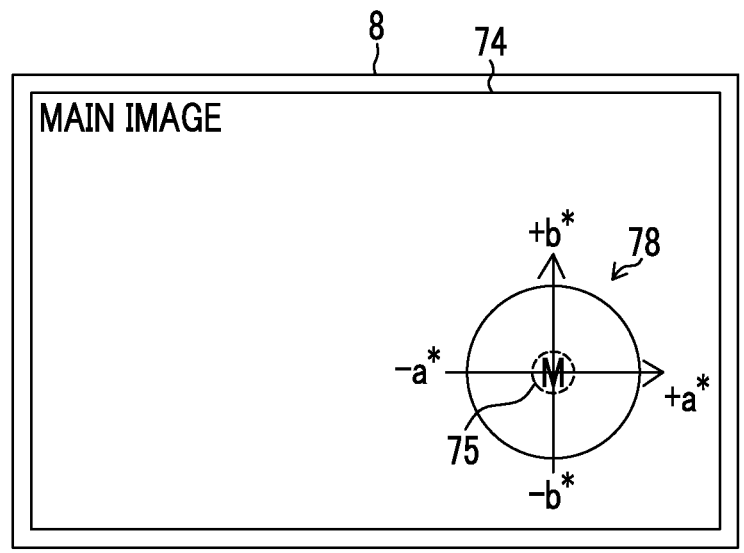
FIG. 34C illustrates yet another example of the display of the display unit.
Figure 34D:
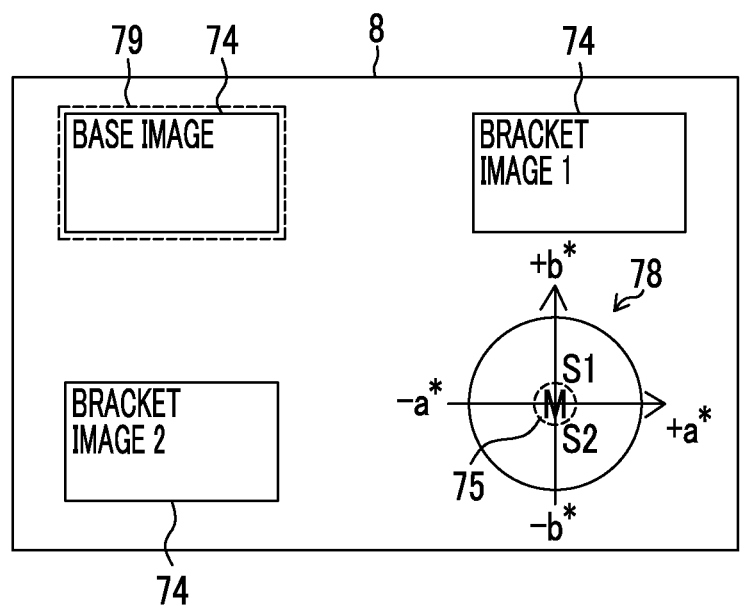
FIG. 34D illustrates still yet another example of the display of the display unit.

The display of the display unit 8 is not limited to the examples illustrated in FIGS. 30 and 31. For example, the minified image 76 and the classification display portion 77 may not be displayed on the display unit 8. FIGS. 34A to 34D illustrate other examples of the display of the display unit 8. As illustrated in FIGS. 34A to 34D, the selected image display portion 74 and the color space display portion 78 are displayed on the display unit 8 and the minified image 76 and the classification display portion 77 (FIG. 30 and FIG. 31) may not be displayed. In addition, as illustrated in FIGS. 34A to 34C, the color space display portion 78 may be provided in a portion of the selected image display portion 74. As illustrated in FIGS. 34A to 34C, only the image (the base image or the bracket image), of which the corresponding position is selected by the selection cursor 75 displayed on the color space display portion 78, may be displayed in the selected image display portion 74. As illustrated in FIGS. 34A and 34B, the color distribution information of all of the base image and the bracket images, to which the main image classification information or the sub-image classification information is added, may be displayed in the color space display portion 78. As illustrated in FIG. 34C, only the color distribution information of an image which is displayed in the selected image display portion 74 among the base image and the bracket images may be displayed in the color space display portion 78. As illustrated in FIG. 34D, a plurality of selected image display portions 74 may be provided in the display unit 8 and a plurality of images (all images) among the base image and the bracket images may be provided in the plurality of selected image display portions 74. In this case, an image in the selected image display portion 74 corresponding to the image ("M" in FIG. 34D) selected by the selection cursor 75 may be displayed so as to be highlighted by, for example, a highlighted cursor 79.

The display control unit 35 which is controlled by the system control unit 25 controls the display unit 8 such that content displayed on the display unit 8 is appropriately switched. Therefore, the system control unit 25 may control the display control unit 35 according to a preset mode such that content displayed on the display unit 8 is appropriately switched. In addition, the system control unit 25 may control the display control unit 35 according to an operation signal which is input from the user through the user interface 36 such that an item (for example, the selection cursor 75) displayed on the display unit 8 is moved or switched.

Eleventh Embodiment

In this embodiment, the detailed description of the same or similar structures and operations as those in the above-described embodiments will not be repeated.

This embodiment relates to a method for storing data of a base image and a bracket image and a method for deleting data. The data storage method and data deletion method according to this embodiment, which will be described below, are applied to a case in which main image or sub-image classification information is added to the base image and the bracket image and the base image and the bracket image are stored in a main memory (image storage unit) 10 so as to be associated with each other. The data storage method and the data deletion method, which will be described below, can be applied to a case in which the main image classification information and the sub-image classification information are allocated to the base image and the bracket image on the basis of other white balance bracketing methods, in addition to the case in which the main image classification information and the sub-image classification information are allocated to the base image and the bracket image by the method according to the above-described embodiments.

In this embodiment, the image data to which the sub-image classification information is added among the base image and the bracket images is automatically deleted from a recording medium (main memory 10) after a predetermined period of time (for example, a week) or more has elapsed since imaging has been performed or classification information has been changed.

A system according to this embodiment has substantially the same structure as that according to the tenth embodiment (FIG. 29). However, a storage control unit 33 according to this embodiment deletes the image to which the sub-image classification information is added among the base image and the bracket images from the main memory (image storage unit) 10 in a case in which the time elapsed since the creation of the base image and/or the bracket image is longer than a first time. In addition, the storage control unit 33 deletes the image to which the sub-image classification information is added among the base image and the bracket images from the main memory 10 in a case in which the classification information of at least one of the base image or the bracket image is rewritten by a classification information rewriting unit 72 and the time elapsed since the rewriting of the classification information is longer than a second time.

In this embodiment, the storage control unit 33 deletes the image to which the sub-image classification information is added from the main memory 10, on the basis of date and time information obtained from a clock device 34 and editing date and time information (update date and time information) of the image to which the main image classification information is added among the base image and the bracket images stored in the main memory 10. A system control unit 25 acquires the date and time information obtained from the clock device 34 and the editing date and time information of the image to which the main image classification information is added among the base image and the bracket images stored in the main memory 10. Here, the editing date and time information indicates the date and time when the base image and the bracket image were created in a case in which classification information is not rewritten and indicates the latest date and time when the classification information was written in a case in which the classification information was rewritten.

In addition, "date and time information about when the base image and the bracket image are created" and "date and time information about when classification information is rewritten" may be store as different data items or may be stored as a single data item, such as "update date and time information data". Furthermore, the "first time" and the "second time" may are any time. The first time and the second time may be equal to each other or may be different from each other.

In this embodiment, the system control unit 25 and the storage control unit 33 perform a series of processes related to the deletion of the image in a case in which the user operates a power switch 7 to turn on power.

Figure 35:
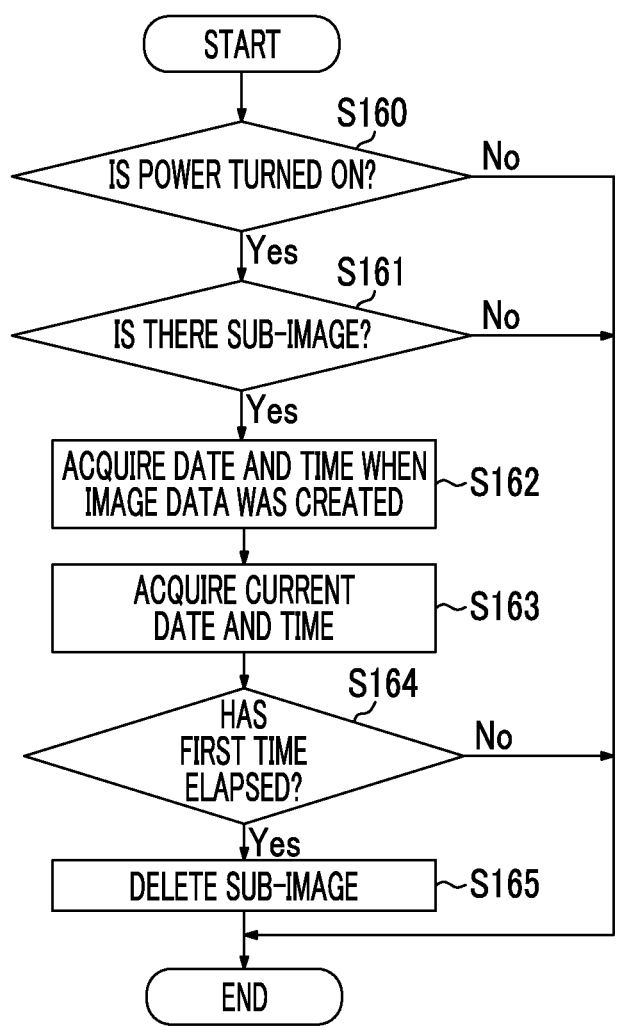
FIG. 35 is a flowchart illustrating an example of a process which deletes an image on the basis of the time elapsed since the creation of a base image and a bracket image.

FIG. 35 is a flowchart illustrating an example of a process of deleting an image on the basis of the time elapsed since the creation of the base image and the bracket images.

In this example, first, the system control unit 25 determines whether power is turned on through the power switch 7 (user interface 36) (S160 in FIG. 35).

In a case in which power is turned on (Yes in S160), the system control unit 25 determines whether image data (image information data 83; FIGS. 25 to 27) having sub-image classification information added thereto has been stored in the main memory 10 through the storage control unit 33 (S161). This determination is performed by any method. For example, the storage control unit 33 may read only metadata of the image data stored in the main memory 10 and the system control unit 25 may determine whether image data having sub-image classification information added thereto has been stored in the main memory 10.

In a case in which it is determined that the image data having sub-image classification information added thereto has been stored in the main memory 10 (Yes in S161), the system control unit 25 acquires date and time information about the creation date and time of the image data having sub-image classification information added thereto through the storage control unit 33 (S162) and acquires date and time information about the current date and time from the clock device 34 (S163).

Then, the system control unit 25 determines whether the difference between the current date and time and the creation date and time of the image data having sub-image classification information added thereto is equal to or greater than the first time (S164). In a case in which it is determined that the difference between the current date and time and the creation date and time is equal to or greater than the first time (Yes in S164), the storage control unit 33 deletes the image data having sub-image classification information added thereto from the main memory 10 under the control of the system control unit 25 (S165).

In a case in which power is turned off (No in S160), the image data having sub-image classification information added thereto has not been stored in the main memory 10 (No in S161), and the difference between the current date and time and the creation date and time is not equal to or greater than the first time (No in S164), the process of deleting the image stored in the main memory 10 is not performed.

Figure 36:
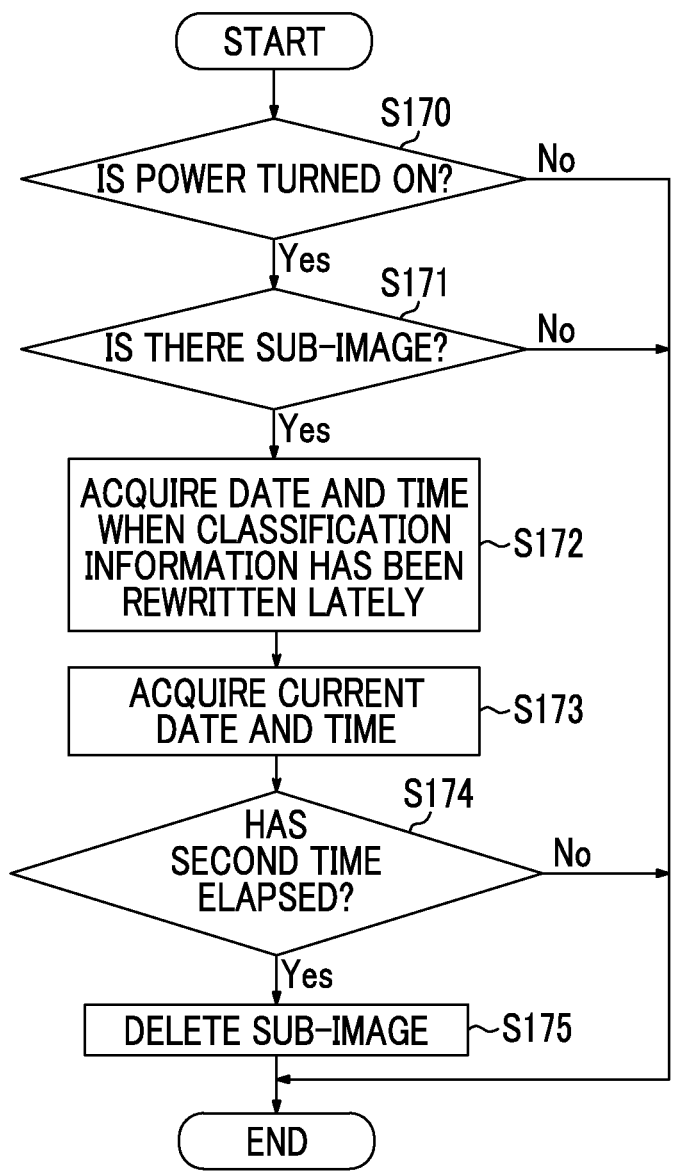
FIG. 36 is a flowchart illustrating an example of a process which deletes an image on the basis of the time elapsed since the rewriting of classification information.

FIG. 36 is a flowchart illustrating an example of a process of deleting an image on the basis of the time elapsed since the rewriting of classification information.

In the example illustrated in FIG. 36, whether power is turned on or off (S170 in FIG. 36) and whether an image having sub-image classification information added to has been stored in the main memory 10 are determined by the same process as that in the example illustrated in FIG. 35 (S160 and S161 in FIG. 35) (S171).

In a case in which it is determined that power is turned on (Yes in S170) and that the image having sub-image classification information added thereto has been stored in the main memory 10 (Yes in S171), the system control unit 25 acquires date and time information about the latest date and time when the classification information of the image data having sub-image classification information added thereto was rewritten through the storage control unit 33 (S172) and acquires date and time information about the current date and time from the clock device 34 (S173).

Then, the system control unit 25 determines whether the difference between the current date and time and the "latest date and time when the classification information of the image data having sub-image classification information added thereto was rewritten" is equal to or greater than the second time (S174). In a case in which it is determined that the difference between the current date and time and the latest date and time of the rewriting is equal to or greater than the second time (Yes in S174), the storage control unit 33 deletes the image data having sub-image classification information added thereto from the main memory 10 under the control of the system control unit 25 (S175).

In a case in which power is turned off (No in S170), the image having sub-image classification information added thereto has not been stored in the main memory 10 (No in S171), and the difference between the current date and time and the latest date and time of the rewriting is not equal to or greater than the second time (No in S174), the process of deleting the image stored in the main memory 10 is not performed.

Figure 37:
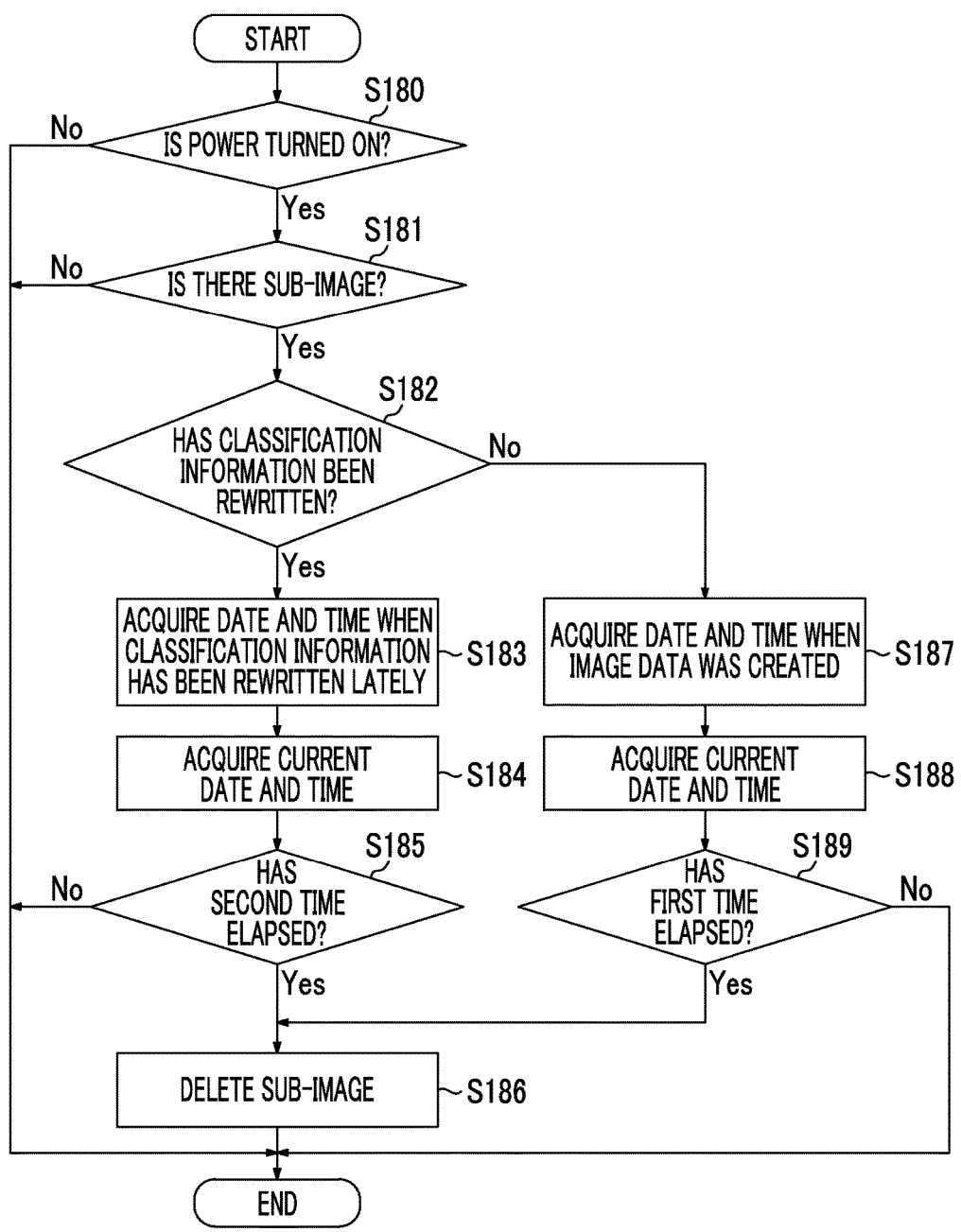
FIG. 37 is a flowchart illustrating an example of a process which deletes an image on the basis of the "time elapsed since the creation of the base image and the bracket image" and the "time elapsed from the rewriting of the classification information".

FIG. 37 is a flowchart illustrating an example of a process of deleting an image on the basis of the "time elapsed since the creation of the base image and the bracket images" and the "time elapsed since the rewriting of the classification information".

In this example, whether power is turned on or off (S180 in FIG. 37) and whether an image having sub-image classification information added thereto has been stored in the main memory 10 are determined by the same process as that in the example illustrated in FIGS. 35 and 36 (S181).

In a case in which it is determined that power is turned on (Yes in S180) and that the image having sub-image classification information added thereto has been stored in the main memory 10 (Yes in S181), the system control unit 25 determines whether the sub-image classification information has been rewritten through the storage control unit 33 (S182).

In a case in which it is determined that the sub-image classification information has been rewritten (Yes in S182), the same process as that (S172 to S175 in FIG. 36) in the example illustrated in FIG. 36 is performed. That is, the latest date and time when the classification information was rewritten is acquired (S183) and the current date and time is acquired (S184). In a case in which the difference between the current date and the latest date and time when the classification information was rewritten is equal to or greater than the second time (Yes in S185), the storage control unit 33 deletes the image data having sub-image classification information added thereto under the control of the system control unit 25 (S186).

In contrast, in a case in which it is determined that the sub-image classification information has not been rewritten (No in S182), the same process as that (S162 to S165 in FIG. 35) in the example illustrated in FIG. 35 is performed. That is, date and time information about the creation date and time of the image data having sub-image classification information added thereto is acquired (S187) and the current date and time is acquired (S188). In a case in which it is determined that the difference between the current date and time and the creation date and time is equal to or greater than the first time (Yes in S189), the storage control unit 33 deletes the image data having sub-image classification information added thereto under the control of the system control unit 25 (S186).

In a case in which power is turned off (No in S180), the image having sub-image classification information added thereto has not been stored in the main memory 10 (No in S181), the difference between the current date and time and the date and time when the image data was created is not equal to or greater than the first time (No in S189), and the difference between the current date and time and the latest date and time when the image data was rewritten is not equal to or greater than the second time (No in S185), the process of deleting the image stored in the main memory 10 is not performed.

As described above, according to this embodiment, it is possible to effectively prevent the waste of the memory capacity of the main memory 10.

For example, when all of "a plurality of images (the base image and the bracket image) created on the basis of the same input image data" in each of the above-described embodiments are stored in the main memory 10, the number of images recorded for each captured scene and the amount of data recorded increase, which results in the waste of the memory capacity of a recording medium.

However, according to this embodiment, when a predetermined period of time (the first time or the second time) has elapsed since the date and time when an image was created or the date and time when classification information was rewritten, image data having sub-image classification information added thereto is deleted from the main memory 10. That is, among the base image and the bracket images created on the basis of one input image data item, images other than one image having main image classification information allocated thereto are deleted over time. Therefore, the waste of the memory capacity of the main memory 10 is prevented and it is possible to increase the number of images of captured scenes to be stored in the main memory 10.

OTHER MODIFICATION EXAMPLES

Any of the above-described embodiments and modification examples may be combined with each other. In addition, the above-described embodiments are illustrative and the invention can be applied to other structures.

<Custom White Balance Mode>

For example, in the above-described embodiments, in the custom white balance mode, only the base image white balance gain is acquired in advance and is then stored in the control memory 30. However, the bracket image white balance gain may also be acquired in advance and then stored in the control memory 30.

Figure 38:
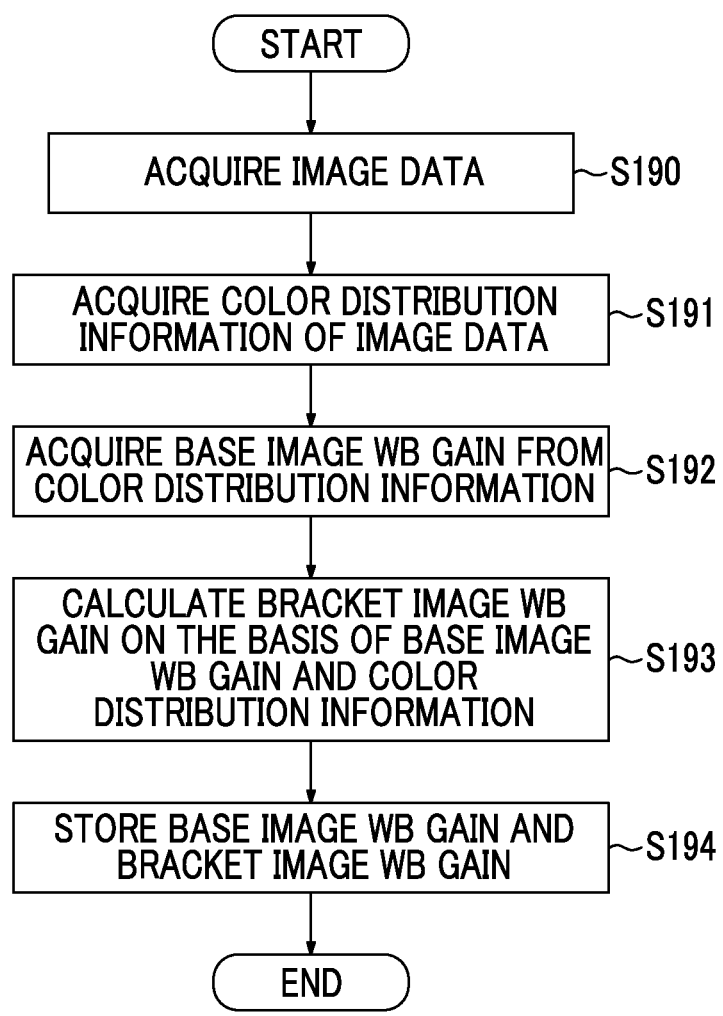
FIG. 38 is a flowchart illustrating an example of the acquisition of a base image white balance gain and a bracket image white balance gain in a custom white balance mode.

FIG. 38 is a flowchart illustrating an example of the acquisition of the base image white balance gain and the bracket image white balance gain in the custom white balance mode.

In a case in which the custom white balance mode is set as the white balance setting mode, the white balance image processing unit 40 (FIG. 5) may perform preprocessing for acquiring the base image white balance gain and the bracket image white balance gain before a desired image is captured.

In the preprocessing, when the user photographs an achromatic (white or gray) object, the image data acquisition unit 44 acquires image data which is output from the imaging element 21 as input image data (S190 in FIG. 38). The color distribution acquisition unit 46 acquires color distribution information of the input image data (S191) and the base WB gain setting unit 50 acquires a base image white balance gain on the basis of the color distribution information (S192). Then, the bracket WB gain setting unit 52 acquires a bracket image white balance gain on the basis of the base image white balance gain and the color distribution information (S193). The acquired base image white balance gain and the acquired bracket image white balance gain are transmitted from the base WB gain setting unit 50 and the bracket WB gain setting unit 52 to the system control unit 25 and the system control unit 25 stores the base image white balance gain and the bracket image white balance gain in the control memory 30 (S194).

In this example, the "acquisition of the bracket image white balance gain by the bracket WB gain setting unit 52" is performed by the same process as that performed by the bracket WB gain setting unit 52 in each of the above-described embodiments. In addition, similarly to the eighth embodiment, the base image white balance gain and the bracket image white balance gain which are stored in the control memory 30 in advance may be acquired on the basis of the "degree of influence of the flash".

<White Balance Processing in Server or Computer>

In the above-described embodiments, the white balance processing is performed in the digital camera 2. However, the same processes as those in each of the above-described embodiments may be performed in a server or a computer.

Figure 39:
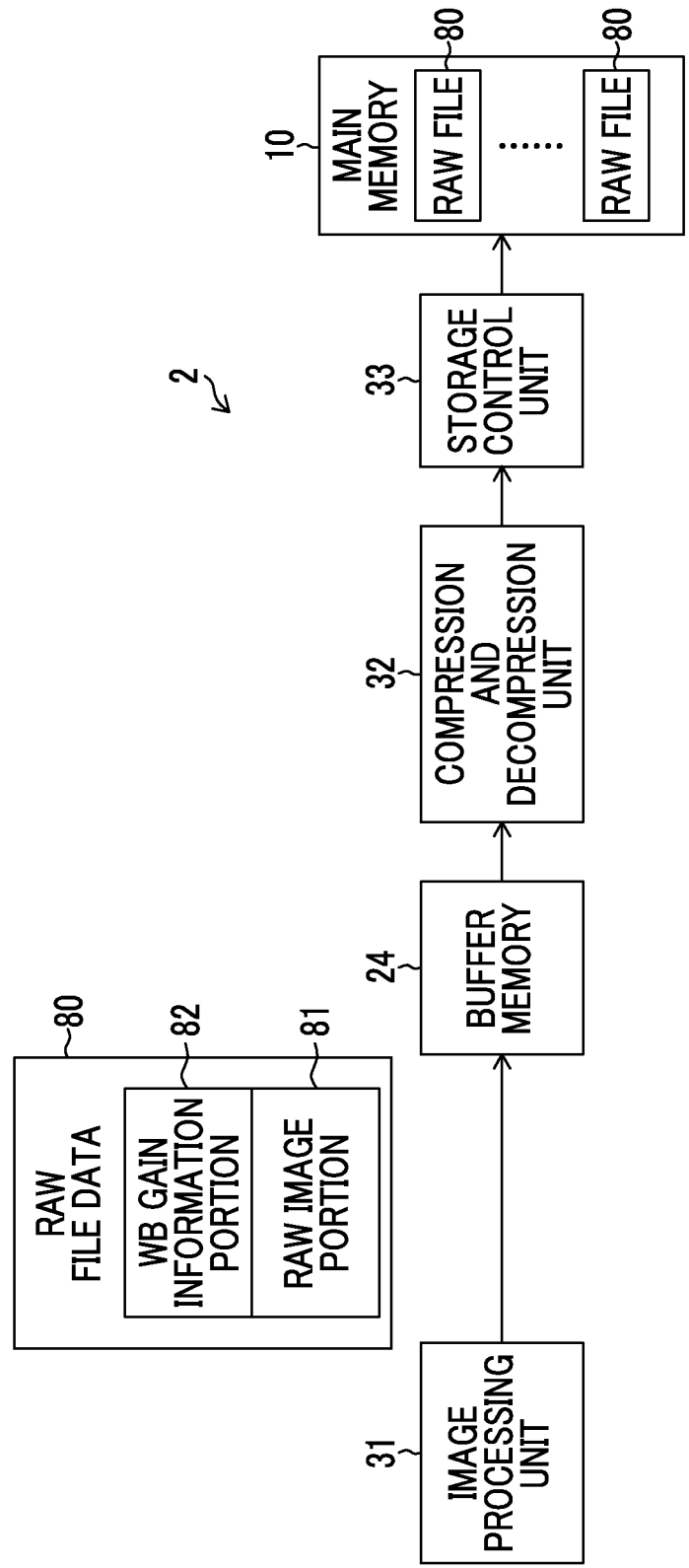
FIG. 39 is a functional block diagram illustrating an example of the structure of a digital camera that outputs image data in a RAW format.

FIG. 39 is a functional block diagram illustrating an example of the structure of a digital camera 2 that outputs image data in a RAW format. For example, in the digital camera 2 having the system structure illustrated in FIG. 3, the white balance image processing unit 40 of the image processing unit 31 acquires the white balance gain of the input image data (RAW data) which has been output from the imaging element 21 and then processed by the process processing unit 22 and the AD conversion unit 23. However, in this example, the acquired white balance gain is added to the input image data, without being applied to the input image data (RAW data).

That is, the base WB gain setting unit 50 and the bracket WB gain setting unit 52 perform the same processes as those in each of the above-described embodiments and acquire the base image white balance gain and the bracket image white balance gain on the basis of the color distribution information of the input image data and/or the degree of influence of the flash in the input image data. However, the WB processing unit 54 does not perform the white balance processing which applies the white balance gain to the input image data and adds the acquired "base image white balance gain and bracket image white balance gain" to the "input image data (RAW data)" to create RAW file data 80. The RAW file data 80 includes a RAW image portion 81 related to the input image data (RAW data) and a WB gain information portion 82 related to the base image white balance gain and the bracket image white balance gain.

The RAW file data 80 which is output from the image processing unit 31 is stored in the buffer memory 24. The RAW file data 80 stored in the buffer memory 24 is compressed by the compression and decompression unit 32 and is then stored in the main memory 10 by the storage control unit 33.

In the above-mentioned example, the WB processing unit 54 creates the RAW file data 80. However, the RAW file data 80 may be created by other processing units. For example, the storage control unit 33 controlled by the system control unit 25 may create the RAW file data 80. In this case, the RAW image data forming the RAW image portion 81 is transmitted from the compression and decompression unit 32 to the storage control unit 33. In addition, the base image white balance gain and the bracket image white balance gain forming the WB gain information portion 82 are stored in the control memory 30 and are transmitted from the system control unit 25 to the storage control unit 33.

Figure 40:
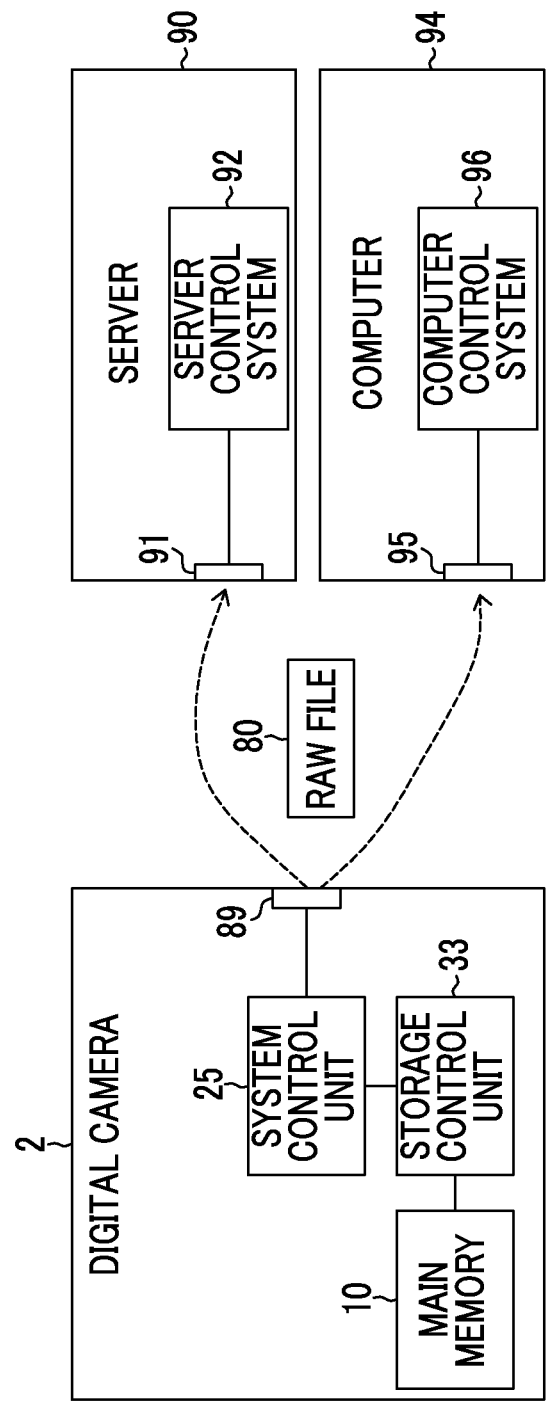
FIG. 40 is a block diagram illustrating a server and a computer connected to the digital camera.

FIG. 40 is a block diagram illustrating a server 90 and a computer 94 connected to the digital camera 2. The digital camera 2 may be connected to the server 90 through a digital camera connection unit 89 and a server connection unit 91 or may be connected to the computer 94 through the digital camera connection unit 89 and a computer connection unit 95. The connection aspects are not particularly limited. The connection may be wired connection or wireless connection.

The system control unit 25 reads the RAW file data 80 stored in the main memory 10 through the storage control unit 33 and outputs the RAW file data to the digital camera connection unit 89. The RAW file data 80 which is output from the digital camera connection unit 89 is received the server 90 through the server connection unit 91 and is then transmitted to a server control system 92, or it is received by the computer 94 through the computer connection unit 95 and is then transmitted to a computer control system 96. The server control system 92 and the computer control system 96 can apply the base image white balance gain and the bracket image white balance gain indicated by the WB gain information portion 82 of the RAW file data 80 to the image data indicated by the RAW image portion 81 to acquire a base image and a bracket image.

Each of the above-mentioned functional structures can be implemented by any hardware, software, or a combination thereof. For example, the invention can also be applied to a program that causes a computer to perform an image processing method (image processing procedure) in each of the above-mentioned devices and processing units (for example, the white balance image processing unit 40), a computer-readable recording medium (non-transitory recording medium) that has the program recorded thereon, or a computer in which the program can be installed.

The aspects to which the invention can be applied are not limited to the digital camera and the computer (server). The invention can also be applied to cameras having an imaging function as a main function and mobile devices having functions (a calling function, a communication function, and other computer functions) other than the imaging function in addition to the imaging function. Other aspects to which the invention can be applied are, for example, mobile phones with a camera function, smart phones, personal digital assistants (PDAs), and portable game machines. Hereinafter, an example of the smart phone to which the invention can be applied will be described.

<Structure of Smart Phone>

Figure 41:
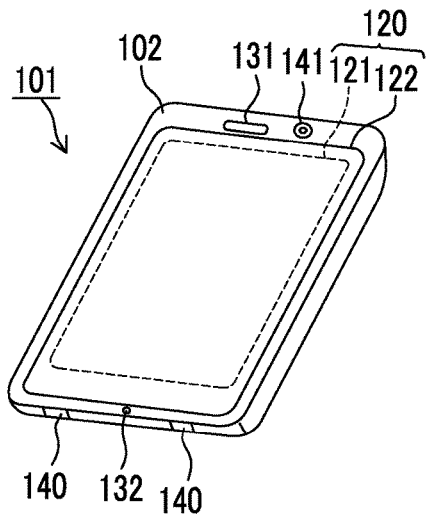
FIG. 41 is a diagram illustrating the outward appearance of a smart phone.

FIG. 41 is a diagram illustrating the outward appearance of a smart phone 101. The smart phone 101 illustrated in FIG. 41 comprises a housing 102 with a flat panel shape and a display input unit 120 having a display panel 121 as a display unit and an operation panel 122 as an input unit which are integrally formed on one surface of the housing 102. The housing 102 comprises a speaker 131, a microphone 132, an operating unit 140, and a camera unit 141. However, the configuration of the housing 102 is not limited thereto. For example, the display unit and the input unit may be independently provided, or the housing 102 may have a folding structure or a sliding structure.

Figure 42:
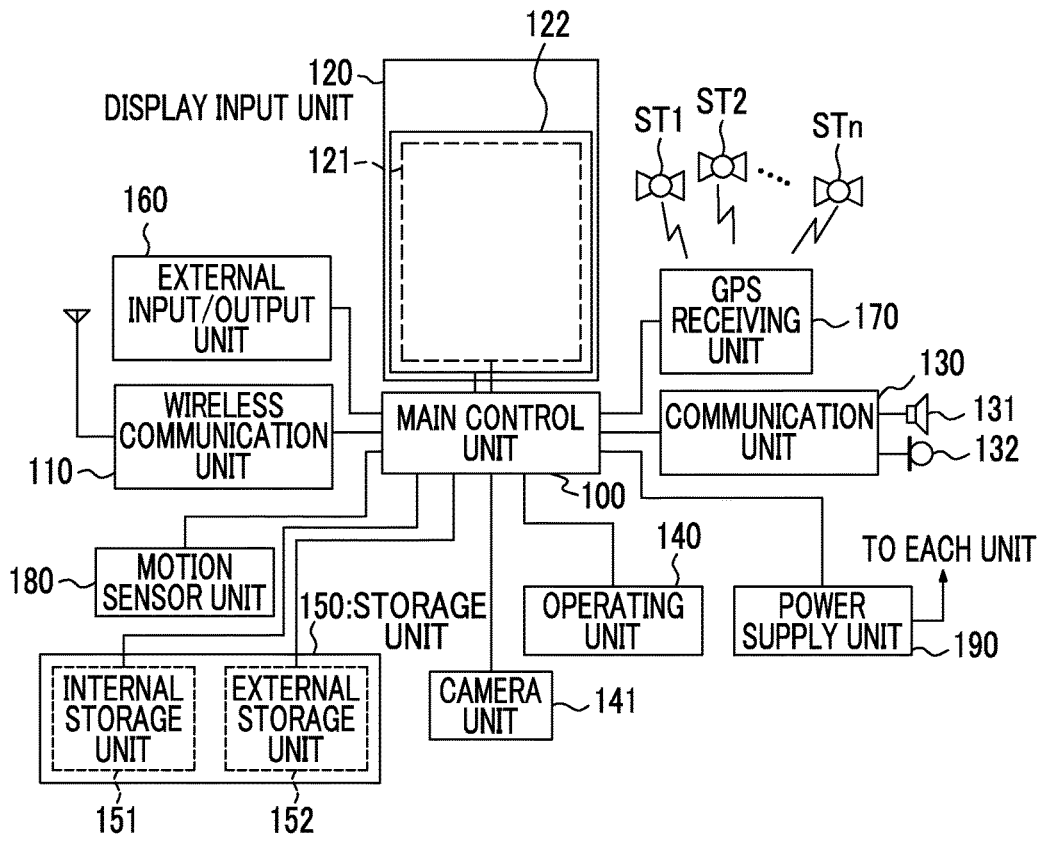
FIG. 42 is a block diagram illustrating the structure of the smart phone illustrated in FIG. 41.

FIG. 42 is a block diagram illustrating an example of the structure of the smart phone 101 illustrated in FIG. 41. As illustrated in FIG. 42, the smart phone 101 comprises, as main components, a wireless communication unit 110, the display input unit 120, a calling unit 130, the operating unit 140, the camera unit 141, a storage unit 150, an external input/output unit 160, a global positioning system (GPS) receiving unit 170, a motion sensor unit 180, a power supply unit 190, and a main control unit 100. The smart phone 101 has, as a main function, a wireless communication function which performs mobile wireless communication through a base station apparatus and a mobile communication network.

The wireless communication unit 110 performs wireless communication with the base station apparatus which is accommodated in the mobile communication network in response to an instruction from the main control unit 100. The wireless communication is used to transmit and receive various types of file data, such as voice data and image data, and electronic mail data or to receive, for example, web data and streaming data.

The display input unit 120 is a so-called touch panel that displays, for example, images (still images and moving images) or text information to visually transmit information to the user and detects the user's operation for the displayed information under the control of the main control unit 100 and comprises the display panel 121 and the operation panel 122.

The display panel 121 uses, for example, a liquid crystal display (LCD) or an organic electro-luminescence display (OELD) as a display device. The operation panel 122 is a device that is provided such that an image displayed on a display surface of the display panel 121 is visually recognized and detects coordinates operated by a finger of the user or a stylus. When the device is operated by a finger of the user or a stylus, a detection signal which is generated by the operation is output to the main control unit 100. Then, the main control unit 100 detects an operation position (coordinates) on the display panel 121 on the basis of the received detection signal.

As illustrated in FIG. 41, the display panel 121 and the operation panel 122 of the smart phone 101 which is an embodiment of the imaging device according to the invention are integrated to form the display input unit 120 and the operation panel 122 is arranged so as to completely cover the display panel 121. In a case in which this arrangement is used, the operation panel 122 may have a function of detecting the user's operation even in a region other than the display panel 121. In other words, the operation panel 122 may comprise a detection region (hereinafter, referred to as a display region) for an overlap portion which overlaps the display panel 121 and a detection region (hereinafter, referred to as a non-display region) for an outer edge portion which does not overlap the display panel 121.

The size of the display region may be exactly equal to the size of the display panel 121. However, the sizes are not necessarily equal to each other. The operation panel 122 may comprise two sensitive regions, that is, an outer edge portion and an inner portion other than the outer edge portion. The width of the outer edge portion is appropriately designed according to, for example, the size of the housing 102. Examples of a position detecting method which is used in the operation panel 122 include a matrix switching method, a resistive film method, a surface elastic wave method, an infrared method, an electromagnetic induction method, and a capacitive sensing method. Any of the methods may be used.

The calling unit 130 comprises the speaker 131 and the microphone 132. The calling unit 130 converts the voice of the user which is input through the microphone 132 into voice data which can be processed by the main control unit 100 and outputs the converted voice data to the main control unit 100. In addition, the calling unit 130 decodes voice data received by the wireless communication unit 110 or the external input/output unit 160 and outputs the decoded voice data from the speaker 131. As illustrated in FIG. 41, for example, the speaker 131 can be mounted on the same surface as the display input unit 120 and the microphone 132 can be mounted on a side surface of the housing 102.

The operating unit 140 is a hardware key which uses, for example, a key switch and receives instructions from the user. For example, as illustrated in FIG. 41, the operating unit 140 is a push button switch which is mounted on the side surface of the housing 102 of the smart phone 101, is turned on when it is pressed by, for example, a finger, and is turned off by the restoring force of a spring when the finger is taken off.

The storage unit 150 stores a control program or control data of the main control unit 100, application software, address data which is associated with, for example, the names or phone numbers of communication partners, transmitted and received electronic mail data, web data which is downloaded by web browsing, or downloaded content data. In addition, the storage unit 150 temporarily stores, for example, streaming data. The storage unit 150 includes an internal storage unit 151 which is provided in the smart phone and an external storage unit 152 which has a detachable external memory slot. The internal storage unit 151 and the external storage unit 152 forming the storage unit 150 may be implemented by a storage medium, such as a flash memory, a hard disk, a multimedia-card-micro-type memory, a card-type memory (for example, a MicroSD (registered trademark) memory), a random access memory (RAM), and a read only memory (ROM).

The external input/output unit 160 functions as an interface with all of the external apparatuses connected to the smart phone 101 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB: registered trademark) network, or a ZigBee (registered trademark) network).

Examples of the external apparatus connected to the smart phone 101 include a wired/wireless headset, a wired/wireless external charger, a wired/wireless data port, and a memory card which is connected through a card socket, a subscriber identity module (SIM) card/user identity module (UIM) card, an external audio/video apparatus which is connected through audio/video input/output (I/O) terminals, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit can transmit data which is received from the external apparatus to each component of the smart phone 101 or can transmit data in the smart phone 101 to the external apparatus.

The GPS receiving unit 170 receives GPS signals transmitted from GPS satellites ST1 to STn and performs a position measurement process on the basis of the received GPS signals to detect a position including the latitude, longitude, and height of the smart phone 101, in response to an instruction from the main control unit 100. In a case in which the GPS receiving unit 170 can acquire positional information from the wireless communication unit 110 or the external input/output unit 160 (for example, the wireless LAN), the GPS receiving unit 170 can detect the position using the positional information.

The motion sensor unit 180 comprises, for example, a triaxial acceleration sensor and detects the physical movement of the smart phone 101 in response to an instruction from the main control unit 100. When the physical movement of the smart phone 101 is detected, the moving direction or acceleration of the smart phone 101 is detected. The detection result is output to the main control unit 100.

The power supply unit 190 supplies power which is stored in a battery (not illustrated) to each unit of the smart phone 101 in response to an instruction from the main control unit 100.

The main control unit 100 comprises a microprocessor, operates on the basis of the control program or control data stored in the storage unit 150, and controls the overall operation of each unit of the smart phone 101. The main control unit 100 has an application processing function and a mobile communication control function of controlling each unit of a communication system in order to perform voice communication or data communication through the wireless communication unit 110.

The application processing function is implemented by the operation of the main control unit 100 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The main control unit 100 has, for example, an image processing function which displays an image on the display input unit 120 on the basis of image data (still image or moving image data) such as received data or downloaded streaming data. The image processing function means the function of the main control unit 100 decoding the image data, performing image processing on the decoding result, and displaying the image on the display input unit 120.

The main control unit 100 performs display control for the display panel 121 and operation detection control for detecting the operation of the user through the operating unit 140 and the operation panel 122.

The main control unit 100 performs the display control to display a software key, such as an icon for starting application software or a scroll bar, or to display a window for writing electronic mail. The scroll bar means a software key for receiving an instruction to move a displayed portion of an image that is too large to fit into the display region of the display panel 121.

The main control unit 100 performs the operation detection control to detect the operation of the user input through the operating unit 140, to receive an operation for the icon or the input of a character string to an input field of the window through the operation panel 122, or to receive a request to scroll the displayed image through the scroll bar.

In addition, the main control unit 100 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 100 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which captures an image using an imaging element, such as a CMOS. In addition, the camera unit 141 can convert captured image data into image data which is compressed in, for example, a JPEG format, records the converted image data in the storage unit 150, and outputs the converted image data through the external input/output unit 160 or the wireless communication unit 110, under the control of the main control unit 100. As illustrated in FIG. 41, the camera unit 141 is mounted on the same surface as the display input unit 120 in the smart phone 101. However, the mounting position of the camera unit 141 is not limited thereto. For example, the camera unit 141 may be mounted on the rear surface of the display input unit 120 or a plurality of camera units 141 may be mounted. In a case in which a plurality of camera units 141 are mounted, the camera units 141 which are used to capture images may be switched such that a single camera unit captures images or the plurality of camera units 141 may be simultaneously used to capture images.

The camera unit 141 can be used for various functions of the smart phone 101. For example, the image captured by the camera unit 141 can be displayed on the display panel 121 or the image captured by the camera unit 141 can be used as one of the operation inputs of the operation panel 122. When the GPS receiving unit 170 detects the position, the position may be detected with reference to the image from the camera unit 141. In addition, the optical axis direction of the camera unit 141 in the smart phone 101 may be determined or the current usage environment may be determined, with reference to the image from the camera unit 141, using the triaxial acceleration sensor or without using the triaxial acceleration sensor. Of course, the image from the camera unit 141 may be used in the application software.

For example, the positional information which is acquired by the GPS receiving unit 170, the voice information which is acquired by the microphone 132 (for example, the main control unit may convert the voice information into text information), and the posture information which is acquired by the motion sensor unit 180 may be added to the image data of a still image or a moving image and the image data may be stored in the storage unit 150 and may be output through the external input/output unit 160 or the wireless communication unit 110.

The image processing unit 31 (white balance image processing unit 40; FIG. 3) may be implemented by, for example, the main control unit 100.

EXPLANATION OF REFERENCES

2: digital camera
    3: camera body
    4: lens barrel
    5: flash light emitting unit
    6: shutter button
    7: power switch
    8: display unit
    9: operating unit
    10: main memory
    12: lens unit
    20: mechanical shutter
    21: imaging element
    22: process processing unit
    23: AD conversion unit
    24: buffer memory
    25: system control unit
    26: shutter driving unit
    27: lens driving unit
    28: power control unit
    29: power
    30: control memory
    31: image processing unit
    32: compression and decompression unit
    33: storage control unit
    34: clock device
    35: display control unit
    36: user interface
    40: white balance image processing unit
    41: first gain acquisition unit
    42: second gain acquisition unit
    44: image data acquisition unit 46: color distribution acquisition unit
48: WB setting determination unit
50: base WB gain setting unit
52: bracket WB gain setting unit
54: WB processing unit
55: WB arithmetic processing unit
56: light source color estimation unit
57: information addition unit
58: light source color characteristic acquisition unit
60: black body characteristic storage unit
62: chroma specifying unit
64: flash specifying unit
66: bracket determination unit
68: bracket data storage unit
72: classification information rewriting unit
74: selected image display unit
75: selection cursor
76: minified image
77: classification display unit
78: color space display unit
79: highlighted cursor
80: RAW file data
81: RAW image portion
82: WB gain information portion
83: image information data
84: image data portion
85: classification information portion
86: group information portion
87: file data
89: digital camera connection unit
90: server
91: server connection unit
92: server control system
94: computer
95: computer connection unit
96: computer control system
100: main control unit
101: smart phone
102: housing
110: wireless communication unit
120: display input unit
121: display panel
122: operation panel
130: calling unit
131: speaker
132: microphone
140: operating unit
141: camera unit
150: storage unit
151: internal storage unit
152: external storage unit
160: external input/output unit
170: GPS receiving unit
180: motion sensor unit
190: power supply unit

What is claimed is:

1. An image processing device that acquires a white balance gain which is applied to original image data in order to obtain a base image and a bracket image, comprising:
a color distribution acquisition unit that acquires color distribution information of input image data;
a first gain acquisition unit that acquires a base image white balance gain for obtaining the base image; and
a second gain acquisition unit that acquires a bracket image white balance gain for obtaining the bracket image on the basis of the color distribution information and the base image white balance gain,
wherein the second gain acquisition unit determines a bracket direction in a color space on the basis of the color distribution information and acquires the bracket image white balance gain on the basis of the base image white balance gain and the bracket direction, and
wherein the bracket direction is determined by a ratio of colors in the bracket image white balance gain.

2. The image processing device according to claim 1, wherein the second gain acquisition unit determines an absolute value of an amount of bracket on the basis of the color distribution information and acquires the bracket image white balance gain on the basis of the base image white balance gain and the absolute value of the amount of bracket.

3. The image processing device according to claim 1, wherein the second gain acquisition unit estimates a light source color from the color distribution information and acquires the bracket image white balance gain on the basis of the light source color estimated from the color distribution information.

4. The image processing device according to claim 3, wherein the second gain acquisition unit acquires the bracket image white balance gain on the basis of a correlated color temperature of the light source color estimated from the color distribution information.

5. The image processing device according to claim 4, wherein the second gain acquisition unit determines the absolute value of the amount of bracket on the basis of the correlated color temperature of the light source color estimated from the color distribution information and acquires the bracket image white balance gain on the basis of the absolute value of the amount of bracket.

6. The image processing device according to claim 4, wherein the second gain acquisition unit acquires the bracket image white balance gain on the basis of a distance between black-body radiation characteristics in the color space and the light source color estimated from the color distribution information.

7. The image processing device according to claim 6, wherein the second gain acquisition unit adjusts the bracket direction in the color space such that it becomes closer to an umber-blue direction as the distance between the black-body radiation characteristics and the light source color estimated from the color distribution information decreases and it becomes closer to a green-magenta direction as the distance increases, thereby acquiring the bracket image white balance gain.

8. The image processing device according to claim 3, wherein the second gain acquisition unit acquires chroma information of the base image on the basis of the light source color estimated from the color distribution information and the base image white balance gain and acquires the bracket image white balance gain on the basis of the chroma information.

9. The image processing device according to claim 8, wherein the second gain acquisition unit acquires the chroma information on the basis of a chroma of the base image relative to an achromatic color, determines the absolute value of the amount of bracket on the basis of the chroma information, and acquires the bracket image white balance gain on the basis of the base image white balance gain and the absolute value of the amount of bracket.

10. The image processing device according to claim 8, further comprising:

a display characteristic acquisition unit that acquires display characteristic information of a display unit which displays at least one of the base image or the bracket image, wherein the second gain acquisition unit acquires display achromatic color information on the basis of the display characteristic information acquired from the display characteristic acquisition unit, the second gain acquisition unit acquires the chroma information on the basis of a chroma of the base image relative to a display achromatic color obtained from the display achromatic color information, and the second gain acquisition unit determines the absolute value of the amount of bracket on the basis of the chroma information and acquires the bracket image white balance gain on the basis of the base image white balance gain and the absolute value of the amount of bracket.

11. The image processing device according to claim 9, wherein the second gain acquisition unit increases the absolute value of the amount of bracket as a difference in chroma between the achromatic color and the base image increases, on the basis of the chroma information, thereby acquiring the bracket image white balance gain.

12. The image processing device according to claim 1, wherein the second gain acquisition unit determines whether the bracket image needs to be created on the basis of the color distribution information of the input image data, with reference to data indicating whether bracketing is required which defines a relationship between the color distribution information and whether the bracket image needs to be created, acquires the bracket image white balance gain in a case in which it is determined that the bracket image needs to be created, and does not acquire the bracket image white balance gain in a case in which it is determined that the bracket image does not need to be created.

13. The image processing device according to claim 1, further comprising:
a white balance processing unit that applies the base image white balance gain to the original image data to obtain the base image and applies the bracket image white balance gain to the original image data to obtain the bracket image.

14. The image processing device according to claim 13, wherein the white balance processing unit adds classification information indicating a main image to the base image and adds classification information indicating a sub-image to the bracket image.

15. The image processing device according to claim 14, further comprising:
an instruction receiving unit that receives an instruction to decide the classification information to be added to the base image and the bracket image from a user; and
a classification information rewriting unit that can rewrite the classification information added to the base image and the bracket image on the basis of the decision instruction input to the instruction receiving unit.

16. The image processing device according to claim 14, further comprising:
an image storage unit that stores the base image and the bracket image so as to be associated with each other; and
a storage control unit that deletes one of the base image and the bracket image, to which sub-image classification information is added, from the image storage unit in a case in which a time elapsed since the creation of the base image is longer than a first time.

17. The image processing device according to claim 15, further comprising:
an image storage unit that stores the base image and the bracket image so as to be associated with each other; and
a storage control unit that deletes one of the base image and the bracket image, to which the sub-image classification information is added, from the image storage unit in a case in which the classification information of at least one of the base image or the bracket image is rewritten by the classification information rewriting unit and a time elapsed since the rewriting of the classification information is longer than a second time.

18. The image processing device according to claim 14, further comprising:
a display unit; and
a display control unit that controls the display unit such that at least one of the base image or the bracket image is displayed on the display unit,
wherein the display control unit displays a color coordinate system on the display unit and displays the color distribution information of at least one of the base image or the bracket image, which is to be displayed on the display unit, on the color coordinate system displayed on the display unit.

19. The image processing device according to claim 18, wherein the display control unit displays the color distribution information of one of the base image and the bracket image, to which the main image classification information is added, on the color coordinate system displayed on the display unit.

20. An image processing method that acquires a white balance gain which is applied to original image data in order to obtain a base image and a bracket image, comprising:
acquiring color distribution information of input image data;
acquiring a base image white balance gain for obtaining the base image;
acquiring a bracket image white balance gain for obtaining the bracket image on the basis of the color distribution information and the base image white balance gain;
determining a bracket direction in a color space on the basis of the color distribution information and acquiring the bracket image white balance gain on the basis of the base image white balance gain and the bracket direction, and
wherein the bracket direction is determined by a ratio of colors in the bracket image white balance gain.

* * * * *